(12) United States Patent
Apostol, Jr. et al.

(10) Patent No.: US 6,247,084 B1
(45) Date of Patent: Jun. 12, 2001

(54) INTEGRATED CIRCUIT WITH UNIFIED MEMORY SYSTEM AND DUAL BUS ARCHITECTURE

(75) Inventors: George Apostol, Jr., Santa Clara; Peter R. Baran, Fremont; Roderick J. McInnis, Milpitas, all of CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/166,262

(22) Filed: Oct. 5, 1998

Related U.S. Application Data
(60) Provisional application No. 60/061,489, filed on Oct. 8, 1997.

(51) Int. Cl.[7] ........................................... G06F 13/00
(52) U.S. Cl. ..................... 710/108; 710/100; 710/240; 711/147; 711/149; 711/150

(58) Field of Search ............................ 711/149, 147, 711/150; 710/240, 100, 108

(56) References Cited

U.S. PATENT DOCUMENTS

| | | | |
|---|---|---|---|
| 5,561,777 | 10/1996 | Kao et al. ............................ | 395/405 |
| 5,805,905 | * 9/1998 | Biswas et al. ...................... | 710/244 |
| 5,822,768 | * 10/1998 | Shakkarwar ........................ | 711/149 |
| 5,854,638 | * 12/1998 | Tung ................................... | 345/512 |

* cited by examiner

*Primary Examiner*—Rupal D. Dharia

(57) ABSTRACT

A unified memory system includes a processor, a memory controller, a plurality of bus transactor circuits and a shared memory port. A processor bus is coupled between the processor and the memory controller. A first multiple-bit, bidirectional system bus is coupled between the shared memory port, the memory controller and the plurality of bus transactor circuits. A second multiple-bit, bidirectional system bus is coupled between the memory controller and the plurality of bus transactor circuits.

19 Claims, 36 Drawing Sheets

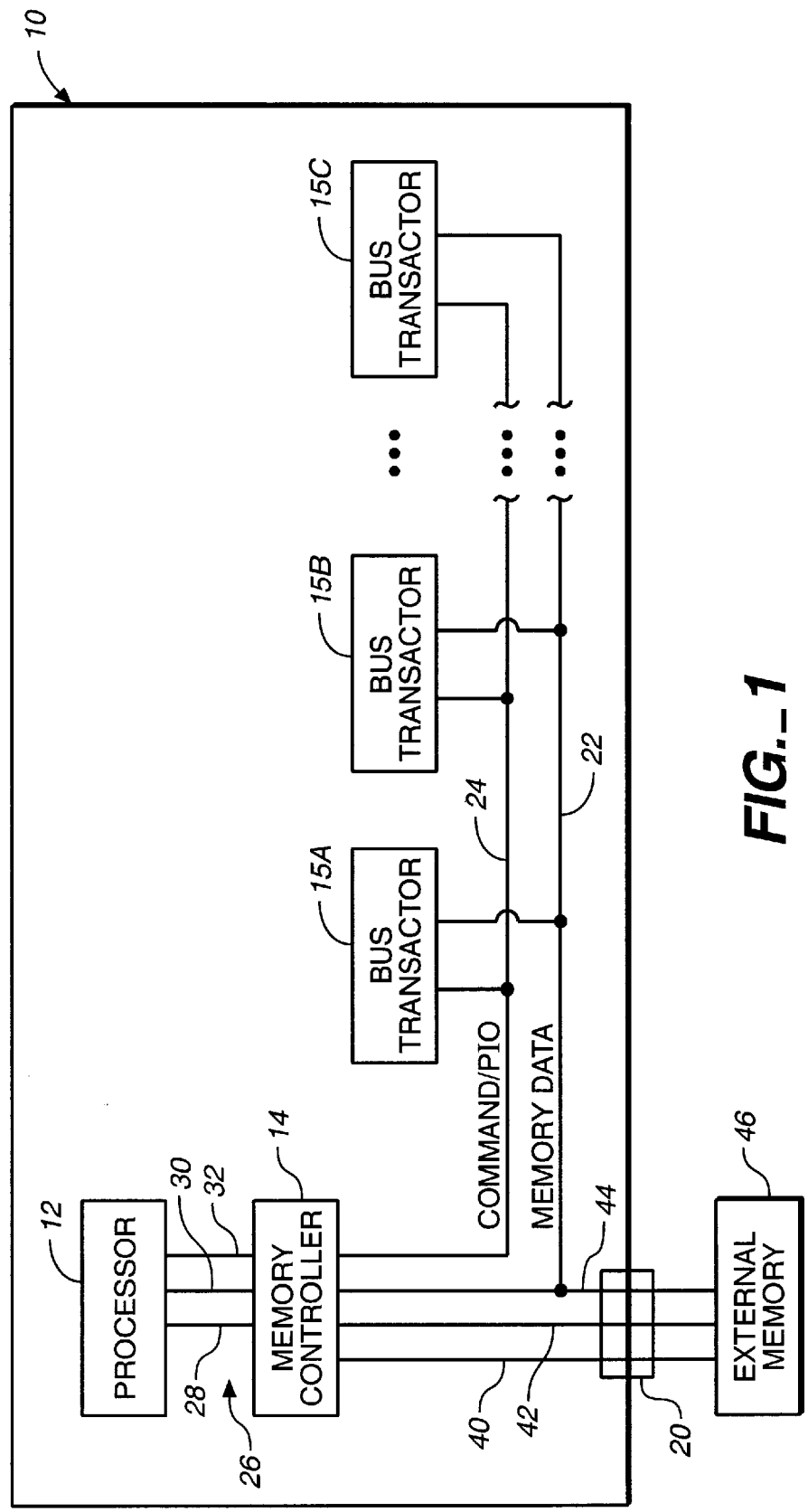
FIG._1

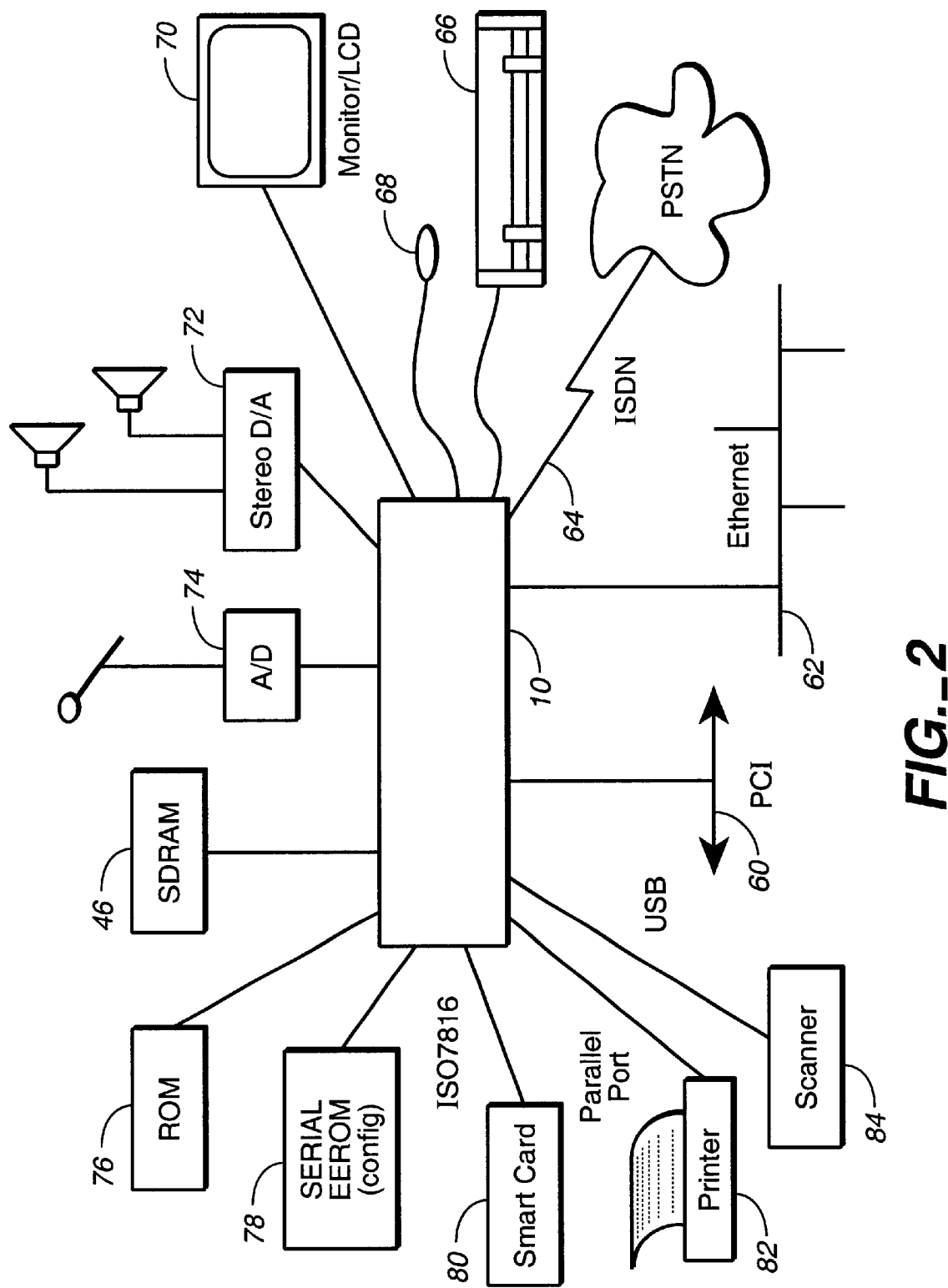
FIG._2

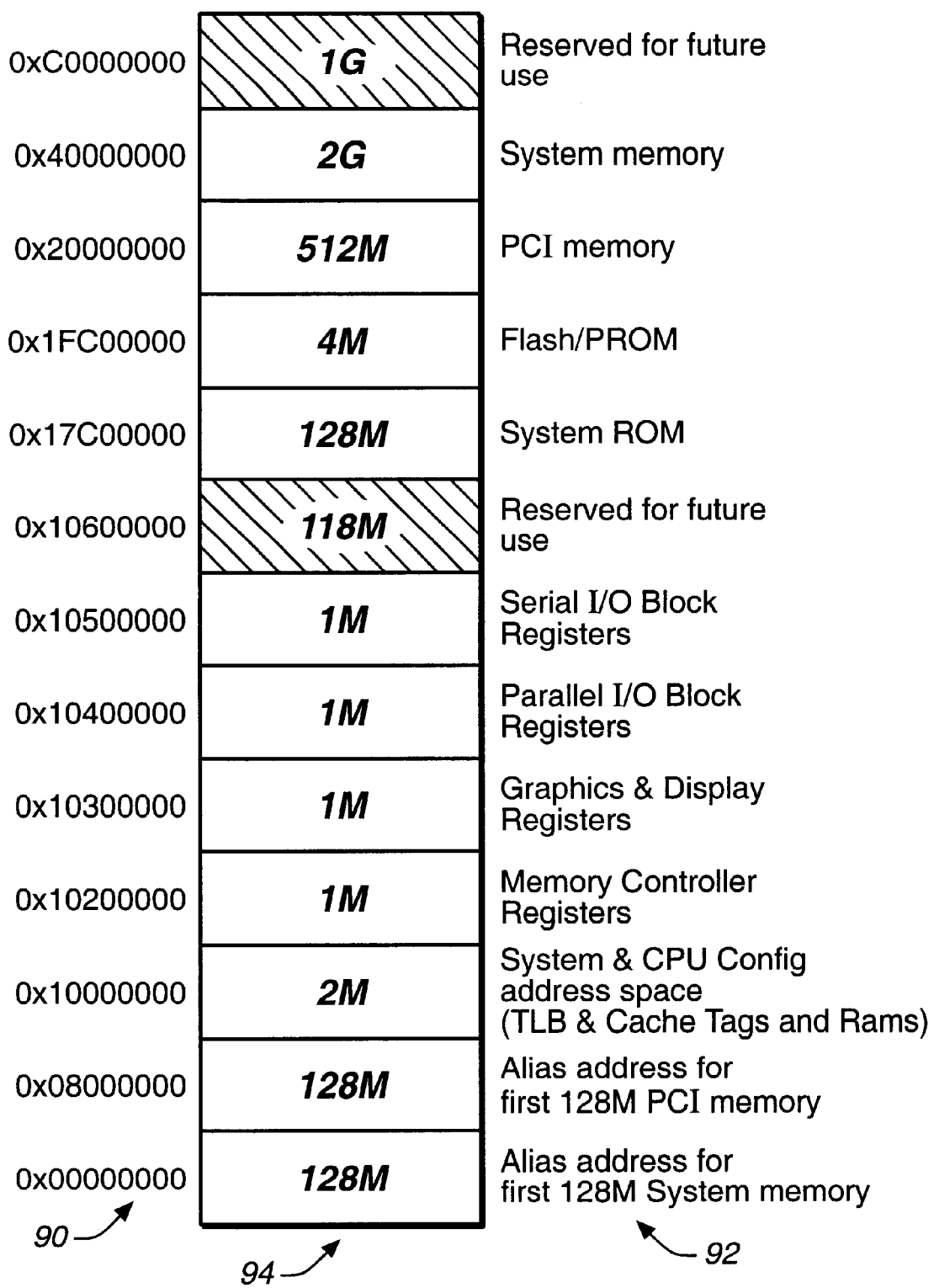
FIG._3

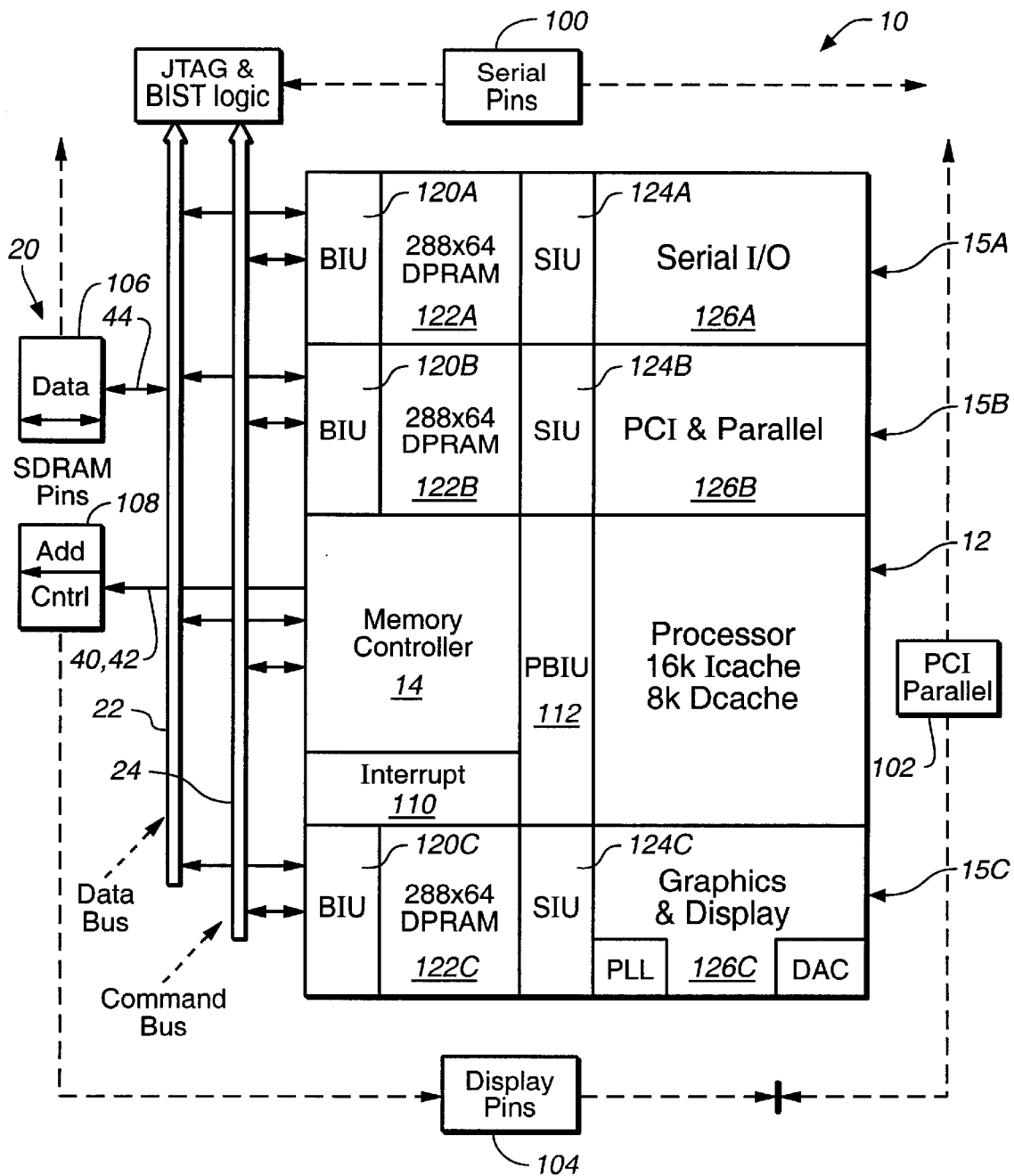
FIG._4

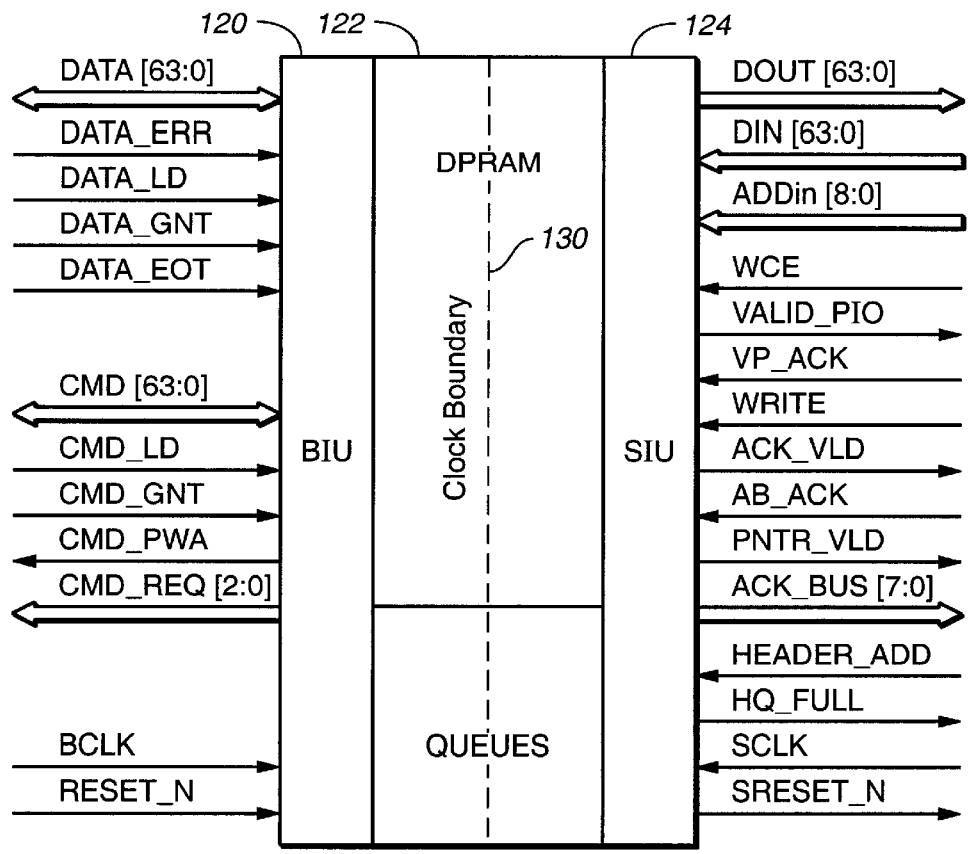
FIG._5
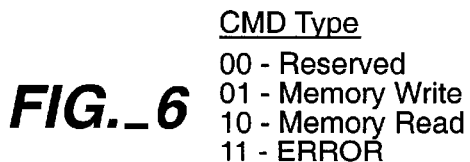
FIG._6
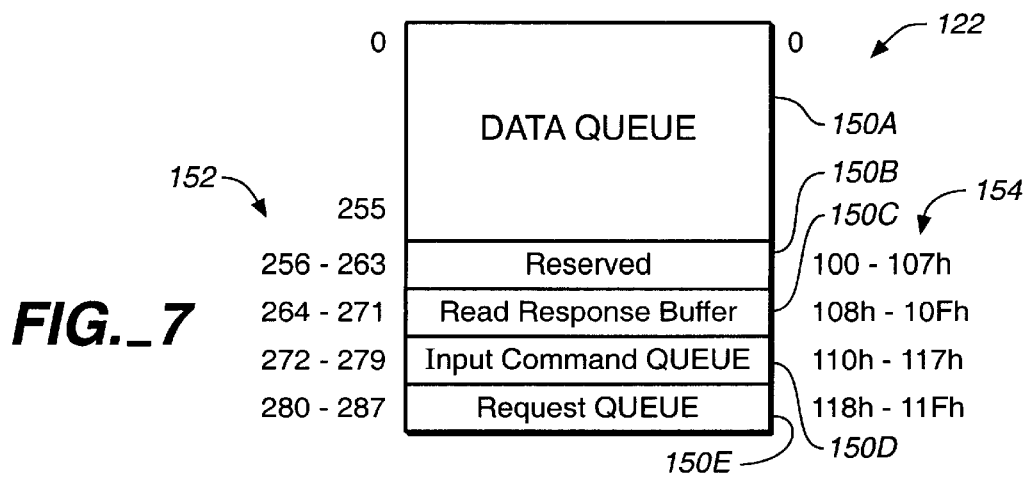
FIG._7

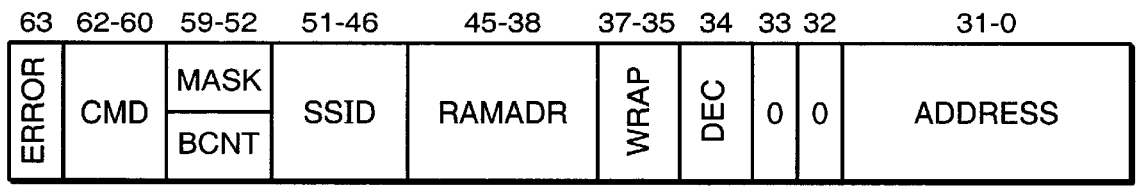
FIG._8
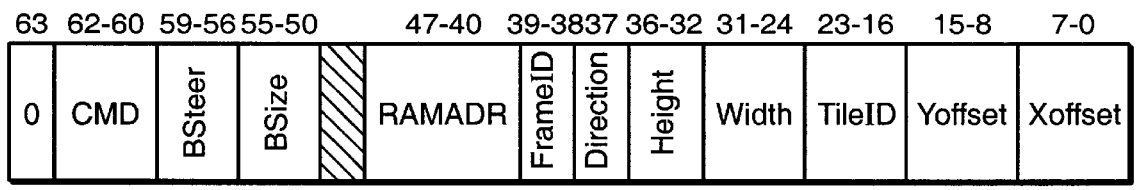
FIG._9
| TYPE | CMD | CYCLES | | Description |
|---|---|---|---|---|
| | | HEADER | DATA | |
| SBT | 000 | 1 | 1 - 32 | Screen Block Transfer |
| INT | 001 | 1 | 0 | Interrupt |
| WS | 010 | 1 | 1 | Write Single (uses MASK) |
| WBK | 011 | 1 | 1 - 16 | Write Block (uses BCNT) |
| RBK | 100 | 1 | 0 | Read Block |
| REP | 101 | 1 | 1 - 32 | Read Reply |
| CLF | 110 | 1 | 4 | Cache Line Fill |
| RSV | 111 | xxx | xxx | Reserved |
FIG._10

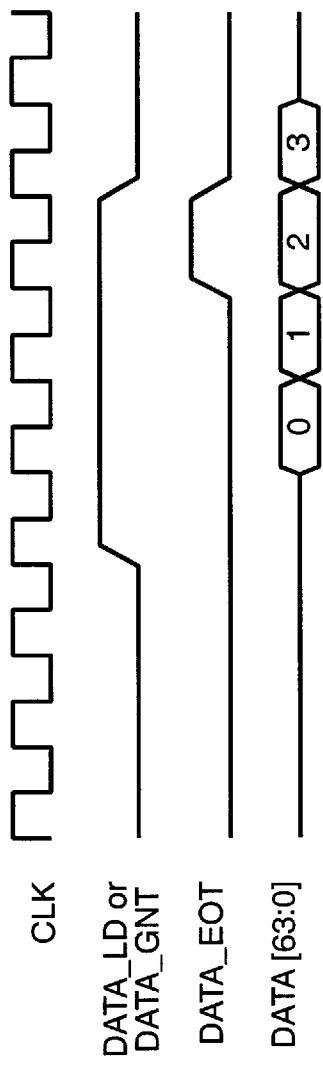
FIG._11
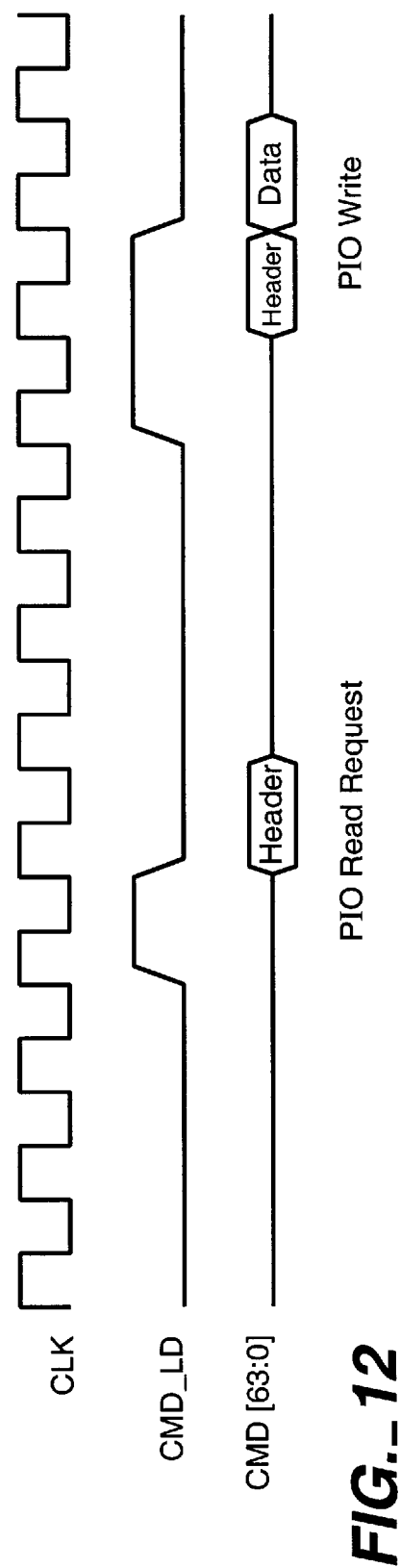
FIG._12

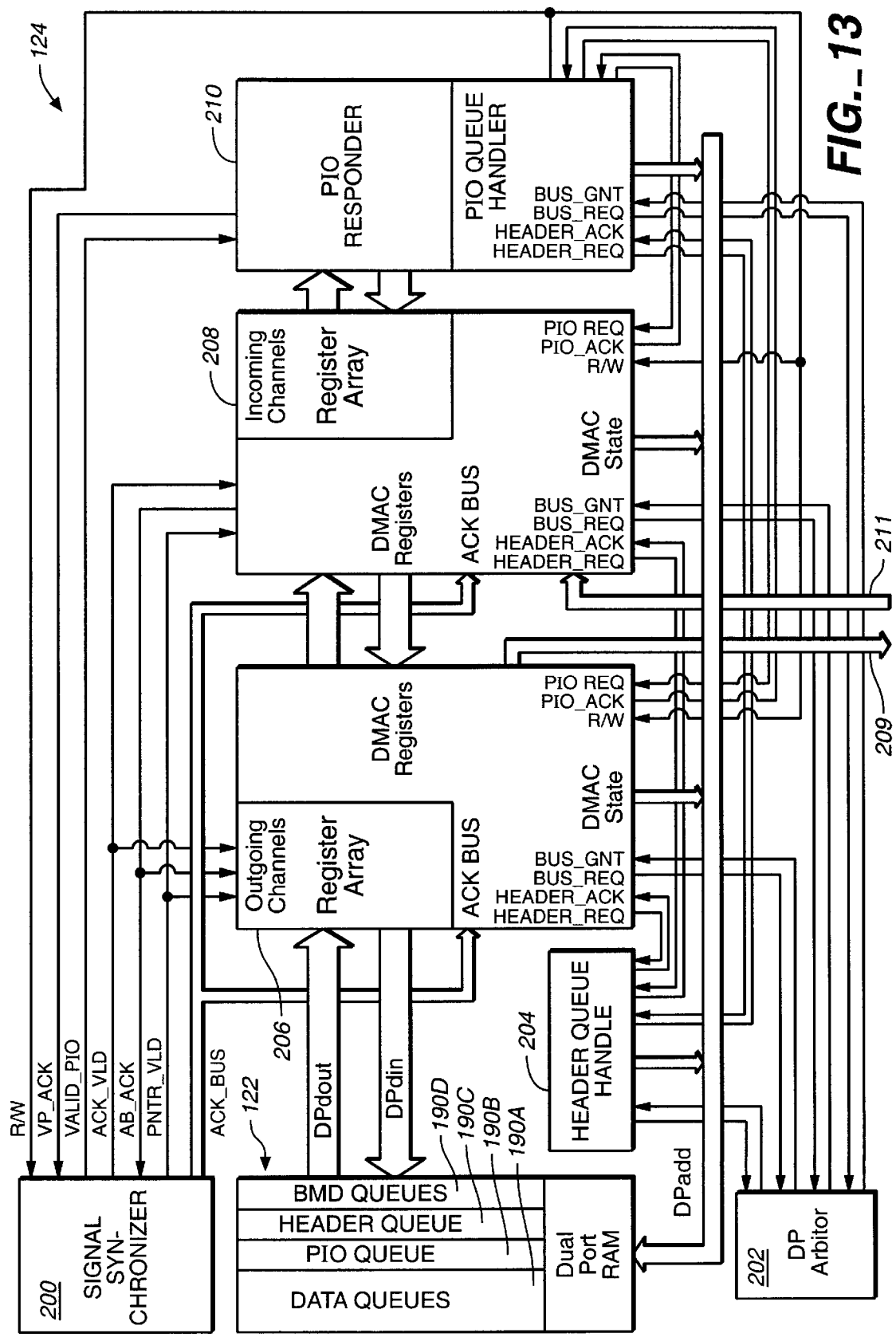

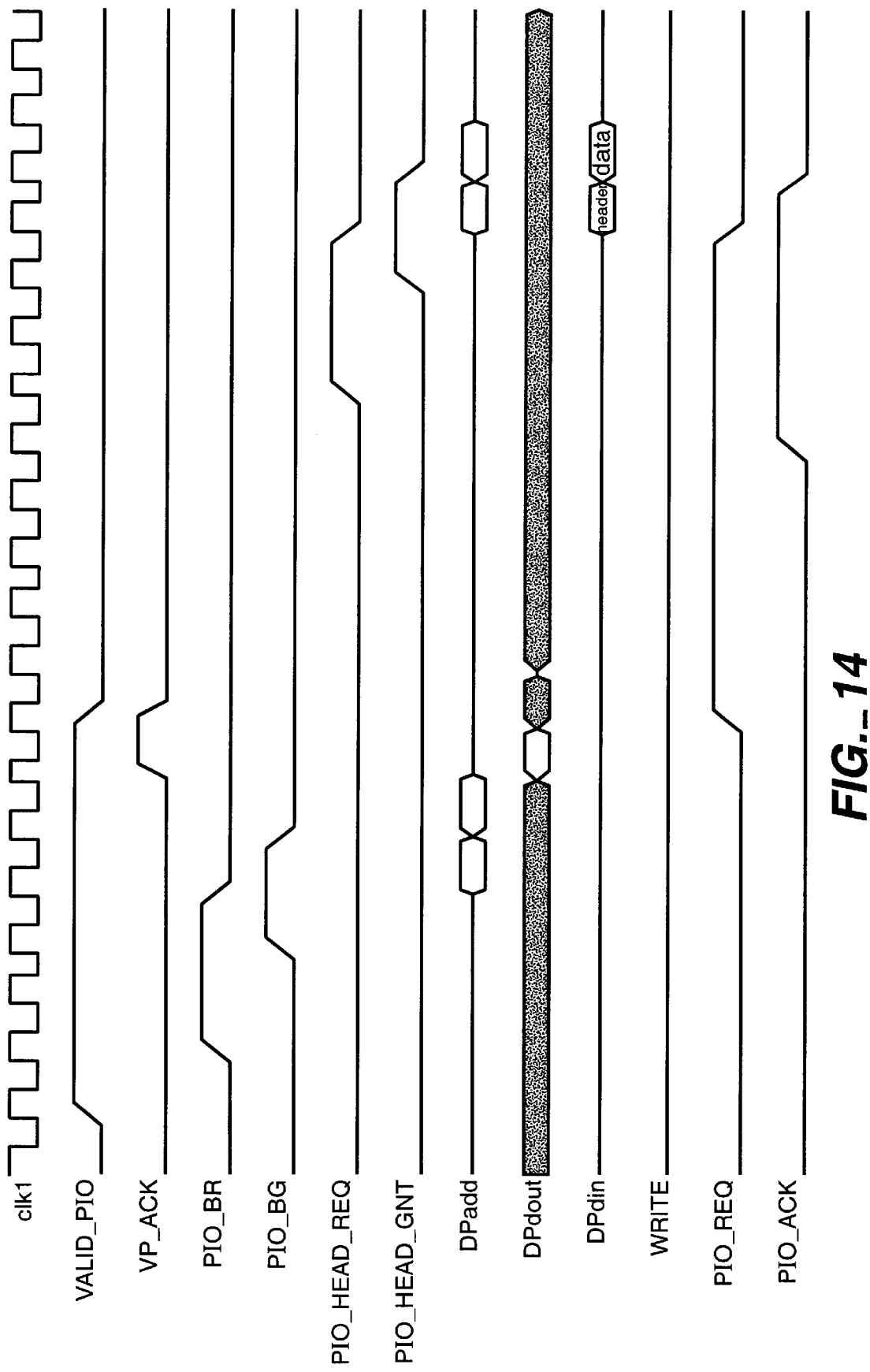
FIG._14

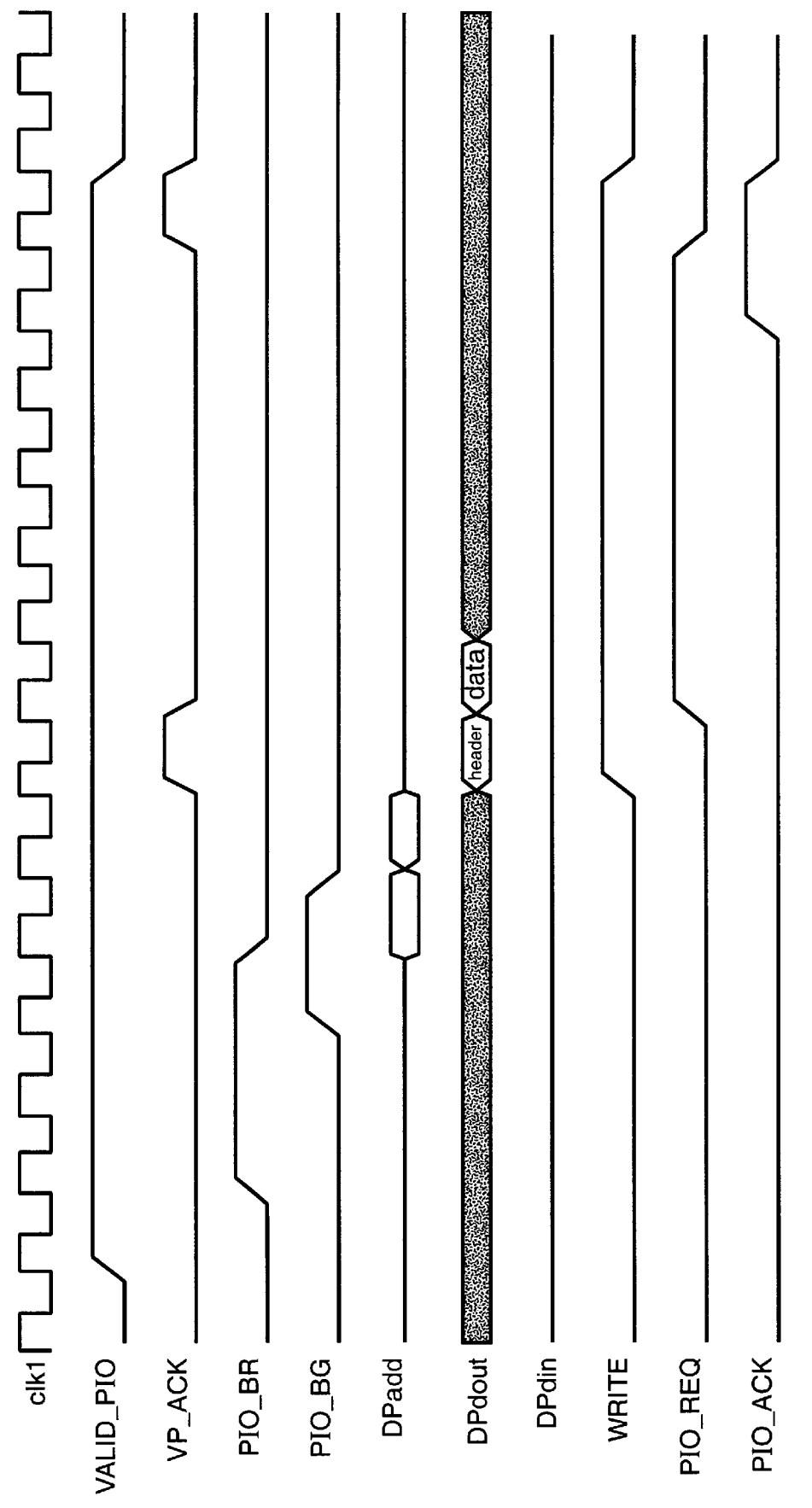
FIG._15

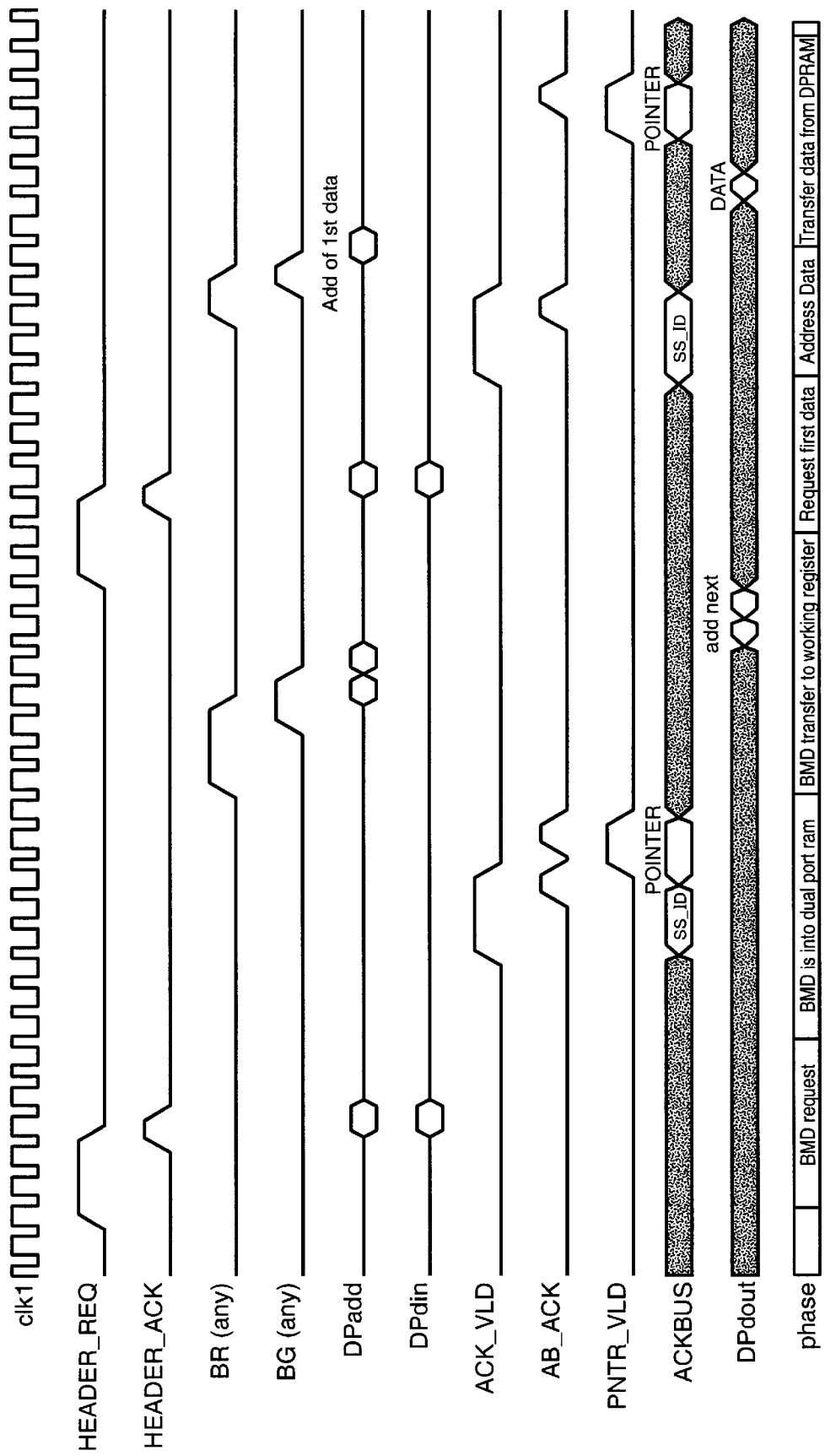
FIG._16

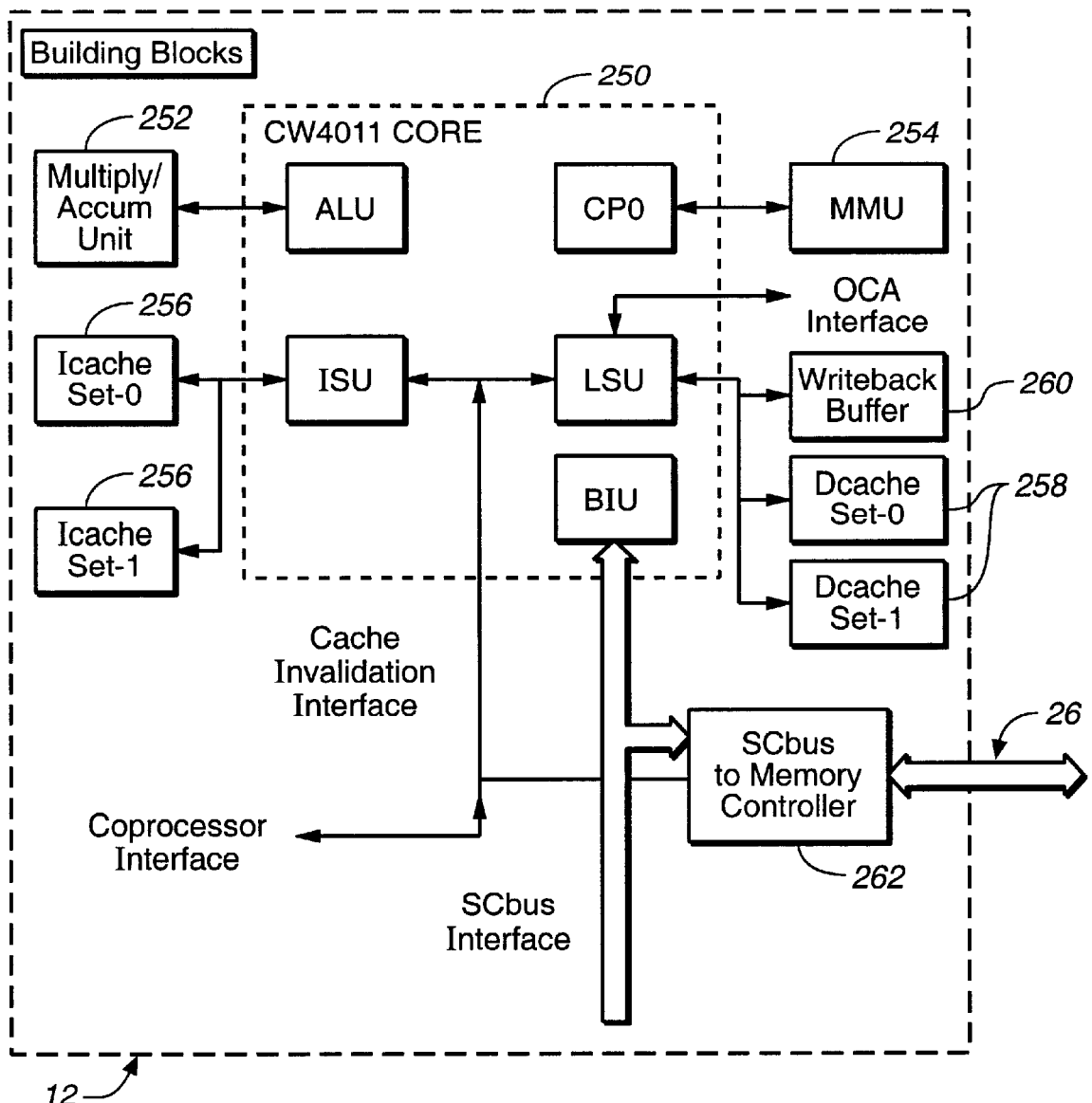
FIG._17

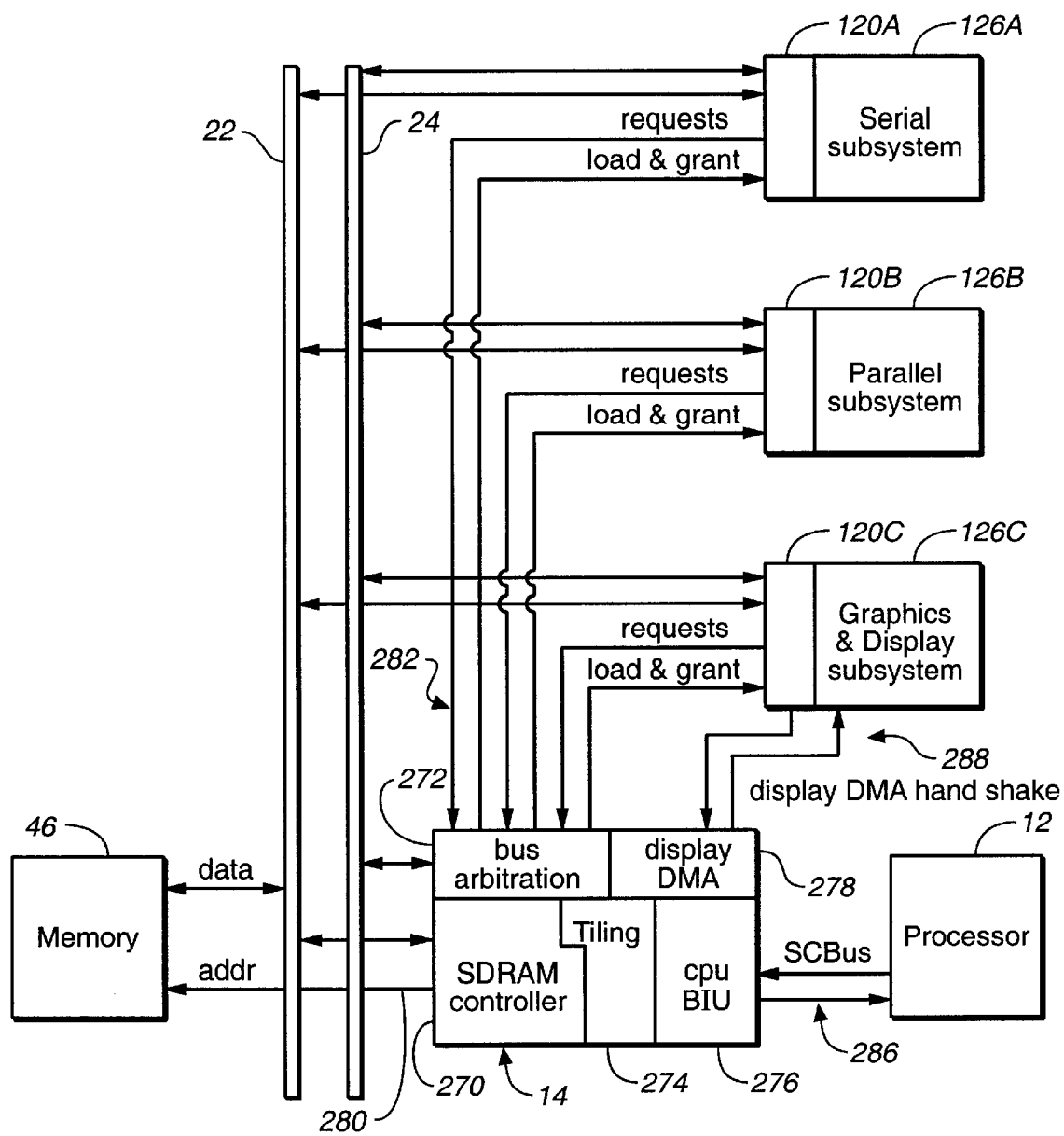
FIG._18

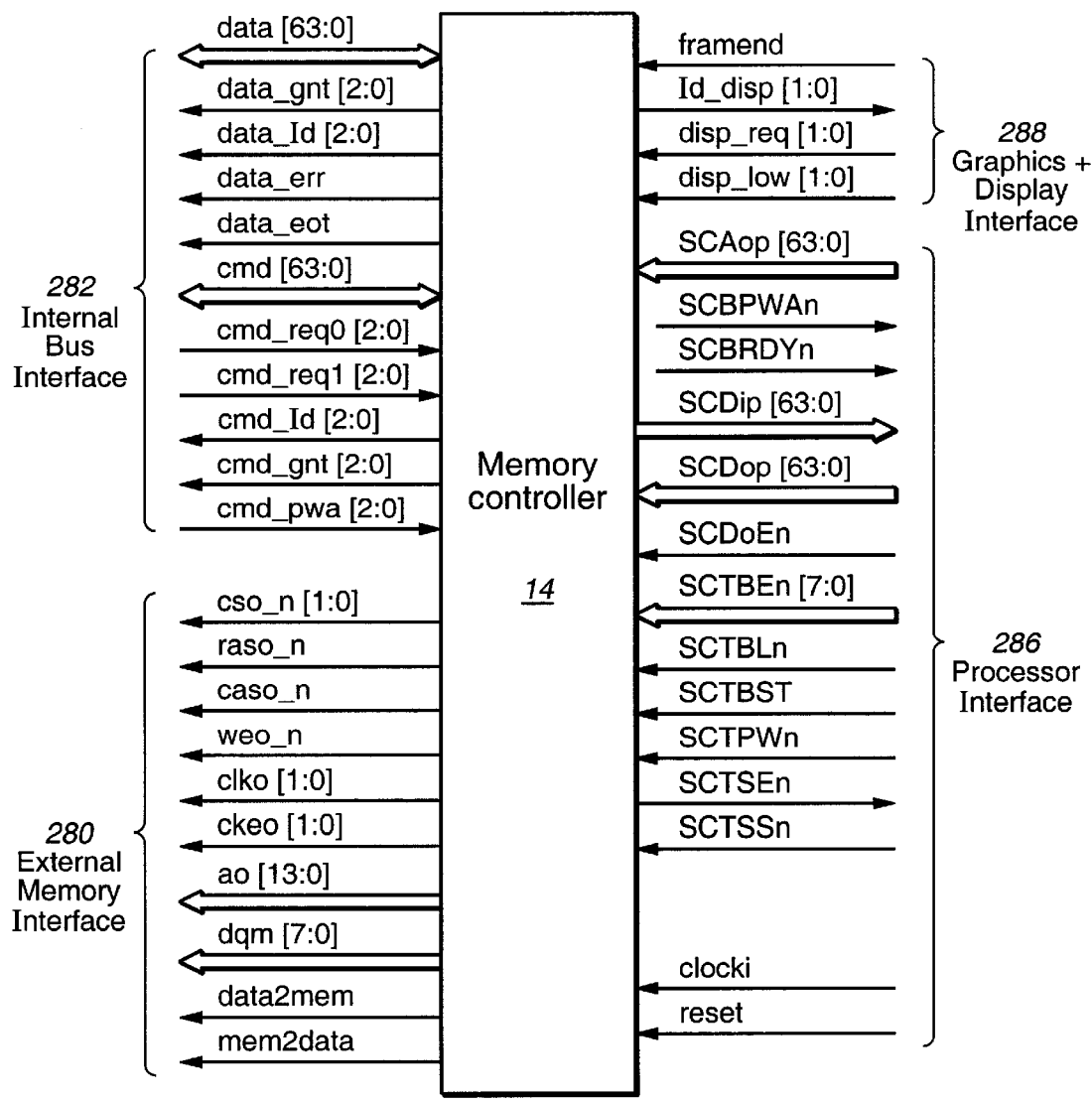
FIG._19

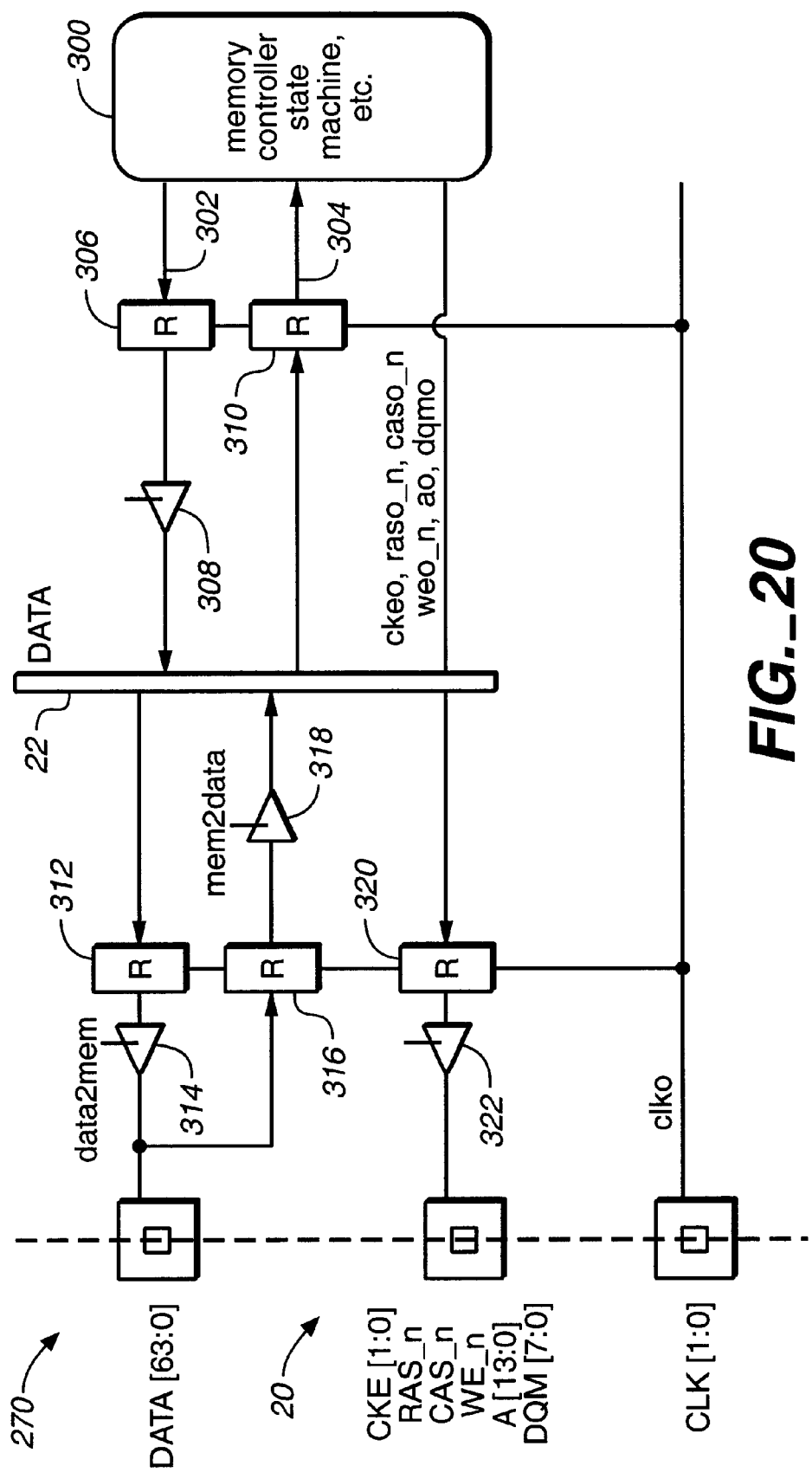
FIG._20

| address | name | access | Description |
|---|---|---|---|
| 0x10200000 | | | *memory controller base address* |
| +0x000 | | W | reset and status |
| +0x008 | | R/W | system configuration register |
| +0x010 | | R/W | memory configuration register |
| +0x018 | | R/W | memory initialization and refresh register |
| +0x020 | | R/W | Frame configuration: x width and y height |
| +0x100 | | R/W | starting tile address and tile configuration for frame 0 |
| +0x108 | | R/W | starting tile address and tile configuration for frame 1 |
| +0x110 | | R/W | starting tile address and tile configuration for frame 2 |
| +0x118 | | R/W | starting tile address and tile configuration for frame 3 |
| +0x140 - +0x178 | | R/W | dither LUT[7:0] |
| +0x280 | | R/W | display dma control register |

*FIG._21A*

| address | name | access | Description |
|---|---|---|---|
| +0x288 | | R/W | display dma ID register |
| +0x220 | | R/W | packer data register |
| +0x210 | | R/W | packer data starting address register |
| +0x218 | | R/W | packer data size register |
| +0x200 | | W | load window cache register |
| +0x208 | | W | flush window cache register |
| +0x300 | | R | window current address register 0 |
| +0x308 | | R | window remain register 0 |
| +0x310 | | R/W | window starting address register 0 |
| +0x318 | | R/W | window size register 0 |
| +0x320 | | R | window current address register 1 |
| +0x328 | | R | window remain register 1 |
| +0x330 | | R/W | window starting address register 1 |
| +0x338 | | R/W | window size register 1 |
| +0x340 | | R | window current address register 2 |
| +0x348 | | R | window remain register 2 |
| +0x350 | | R/W | window starting address register 2 |
| +0x358 | | R/W | window size register 2 |
| +0x360 | | R | window current address register 3 |
| +0x368 | | R | window remain register 3 |
| +0x370 | | R/W | window starting address register 3 |
| +0x378 | | R/W | window size register 3 |
| +0x380 | | R | display current offset register 0 |
| +0x388 | | R | display remain register 0 |
| +0x390 | | R/W | display starting offset register 0 |

*FIG._21B*

| address | name | access | Description |
|---|---|---|---|
| +0x398 | | R/W | display screen size register 0 |
| +0x3a0 | | R | display current offset register 1 |
| +0x3a8 | | R | display remain register 1 |
| +0x3b0 | | R/W | display starting offset register 1 |
| +0x3b8 | | R/W | display screen size register 1 |
| +0x3c0 | | R/W | window cache state register 0 |
| +0x3c8 | | R/W | window cache state register 1 |
| +0x3d0 | | R/W | window cache state register 2 |
| +0x3d8 | | R/W | window cache state register 3 |
| +0x400-+0x7ff | | R/W | window cache |
| +0x028 | | R/W | test configuration |
| +0x030 | | R | chip version number |

FIG._21C

| Bits | access | Description and default value |
|---|---|---|
| 0 | W | system software reset |
| 1 | W | software reset to memory controller |
| 63 - 2 | - | reserved |

FIG._22

| Bits | access | Description and default value |
|---|---|---|
| 0 | R/W | boot device<br>0 - parallel port (default)<br>1 - serial port |
| 1 | R/W | 0 - regular sdram (default)<br>1 - sdram with virtual channel |
| 3 - 2 | R/W | memory type<br>00 - 16Mbit x8 sdram (default)<br>01 - 16Mbit x16 sdram<br>10 - 64Mbit x8 sdram<br>11 - 64Mbit x16 sdram |
| 5 - 4 | R/W | refresh type<br>00 -burst of 1 (default)<br>01 -burst of 2<br>10 -burst of 3 |
| 6 | R/W | dither control<br>0: no dither<br>1: dither, 32 bits cpu data becomes 16 bits |
| 9 - 8 | R/W | color depth for frame 00,<br>00: 8 bits per pixel (default)<br>01: 16 bits per pixel |
| 11 - 10 | R/W | color depth for frame 1, default = 00 |
| 13 - 12 | R/W | color depth for frame 2, default = 00 |
| 15 - 14 | R/W | color depth for frame 3, default = 00 |
| 16 | R/W | 0 - big endian (default)<br>1 - small endian |
| 63 - 17 | - | reserverd |

FIG._23

| Bits | access | Description and default value |
|---|---|---|
| 1 - 0 | R/W | CAS_n latency, default = 3 |
| 3 - 2 | R/W | tRCD, delay time ACT to READ/WRITE command, default = 3 |
| 7 - 4 | R/W | tRC, REF to REF/ACT command period, default = 10 |
| 10 - 8 | R/W | tRAS, ACT to PRE command period, default = 7 |
| 12 - 11 | R/W | tRRD, ACT(0) to ACT(1) command period, default = 2 |
| 14 - 13 | R/W | tRP, PRE to ACT command period, default = 3 |
| 16 - 15 | R/W | tDPL, Data-In to PRE command period, default = 1 |
| 19 - 17 | R/W | tDAL, Data-In to ACT(REF) command period, default = 5 |
| 21 - 20 | R/W | tRSC, default = 2 |
| 63 - 22 | - | reserved |

*FIG._24*

| Bits | access | Description and default value |
|---|---|---|
| 15 - 0 | R/W | refresh period in number clock cycle default = 31250 assuming 100 MHz |
| 27 - 16 | R/W | wait cycles after power on default = 0x0400 |
| 31 - 28 | R/W | memory initialization |
| 63 - 10 | - | reserved |

*FIG._25*

| Bits | access | Description and default value |
|---|---|---|
| 11 - 0 | R/W | Fwidth, number of pixels in the horizontal direction, default = 1024 |
| 23 - 12 | R/W | Fheight, number of pixels in the vertical direction, default = 768 |
| 63 - 24 | - | reserved |

*FIG._26*

| Bits | access | Description and default value |
|---|---|---|
| 7 - 0 | R/W | Xtile: number of tiles in the horizontal direction<br>default = 4 |
| 15 - 8 | R/W | Ytile: number of tiles in the vertical direction<br>default = 3 |
| 31 - 16 | R/W | upper 16 bits of the Starting Tile address for Frame x<br>(note: lower 16 bits are always zero) |
| 63 - 32 | - | reserved |

FIG._27

| Resolution | Xtile<br>(8 bits/pixel) | Xtile<br>(16 bits/pixel) | Ytile |
|---|---|---|---|
| 1024x768 | 4 | 8 | 3 |
| 800x600 | 4 | 7 | 3 |
| 640x480 | 3 | 5 | 2 |

FIG._28

| Bits | access | Description and default value |
|---|---|---|
| 0 | W/R | 0: frame not ready to swap<br>1: frame ready to swap<br>reset after frame swap |
| 1 | W/R | Both primary and secondary dma start next display from frame:<br>0: as specified in display dma id bit 5-4 and bit 1-0<br>1: as specified in display dma id bit 7-6 and bit 3-2<br>This bit is toggled at vsync |
| 63 - 2 | - | reserved |

FIG._29

Display DMA ID Register

| Bits | access | Description and default value |
|---|---|---|
| 1 - 0 | R/W | primary display 0 ID (default = 00) |
| 3 - 2 | R/W | primary display 1 ID (default = 00) |
| 5 - 4 | R/W | secondary display 0 ID (default = 00) |
| 7 - 6 | R/W | secondary display 1 ID (default = 00) |
| 63 - 8 | - | reserved |

*FIG._30*

Display Starting Offset Register

| Bits | access | Description and default value |
|---|---|---|
| 11 - 0 | R/W | Xoffset, X offset location from frame origin |
| 23 - 12 | R/W | Yoffset, offset location from frame origin |
| 63 - 24 | - | reserved |

*FIG._31*

Display screen Size Register

| Bits | access | Description and default value |
|---|---|---|
| 11 - 0 | R/W | Dwidth, X width of display |
| 23 - 12 | R/W | Dheight, Y height of display |
| 63 - 24 | - | reserved |

*FIG._32*

Dither LUT

| Bits | access | Description and default value |
|---|---|---|
| 2 - 0 | R/W | Blue LUT for x[0] = 0 |
| 5 - 3 | R/W | Green LUT for x[0] = 0 |
| 8 - 6 | R/W | Red LUT for x[0] = 0 |
| 12 - 9 | R/W | Blue LUT for x[0] = 1 |
| 15 - 13 | R/W | Green LUT for x[0] = 1 |
| 18 - 16 | R/W | Red LUT for x[0] = 1 |
| 63 - 24 | - | reserved |

*FIG._33*

Window Starting Address Register

| Bits | access | Description and default value |
|---|---|---|
| 31 - 0 | R/W | starting memory address for linear access |
| 11 - 0 | R/W | xoffset from frame origin for tile access |
| 23 - 12 | R/W | yoffset from frame origin for tile access |
| 25 - 24 | R/W | Frame id, for tile access<br>0: use frame 0,<br>1: use frame 1<br>2: use frame 2,<br>3: use frame 3 |
| 63 - 27 | - | reserved |

*FIG._35*

Window size register

| Bits | access | Description and default value |
|---|---|---|
| 10 - 0 | R/W | byte count for linear access |
| 11 - 0 | R/W | Pwidth, X width of tile access |
| 23 - 12 | R/W | Pheight, Y height of tile access |
| 63 - 24 | - | reserved |

*FIG._36*

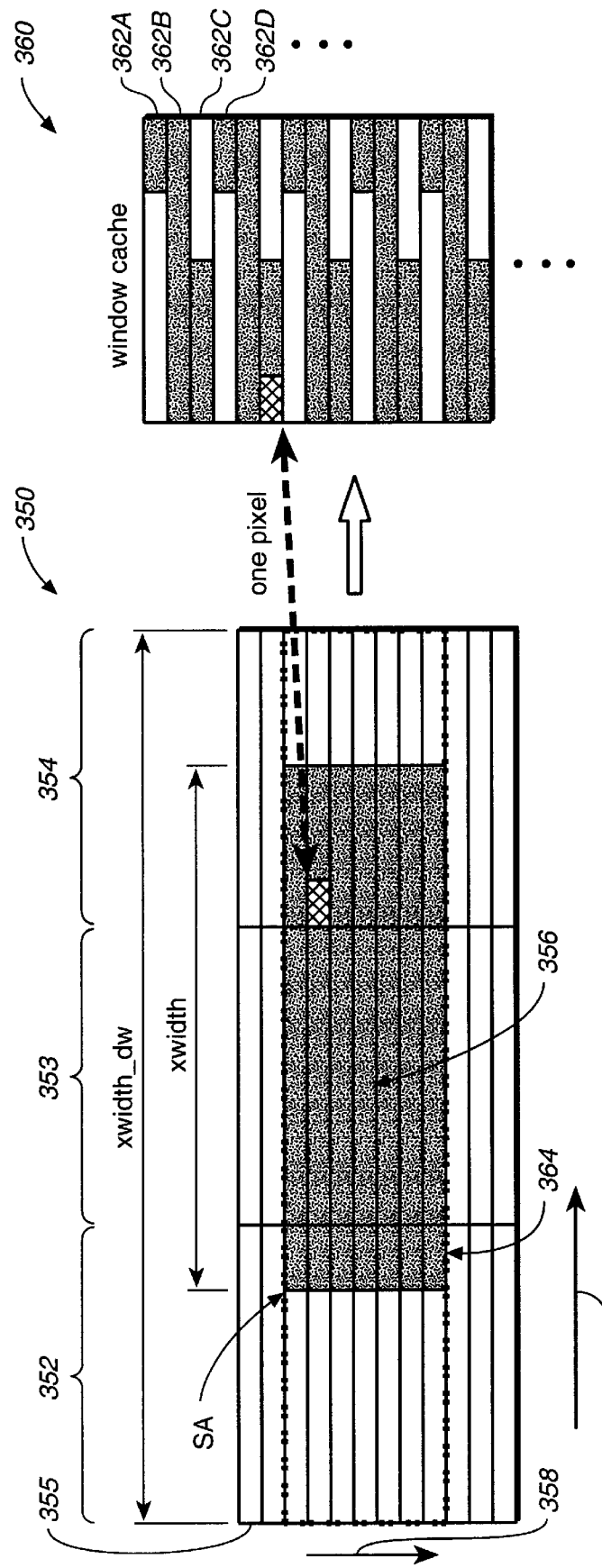
FIG._34

Load window cache register

| Bits | access | Description and default value |
|---|---|---|
| 3 - 0 | R/W | starting segment to load<br>0: start at +0x400 (default)<br>1: start at +0x480<br>2: start at +0x500<br>3: start at +0x580<br>4: start at +0x600<br>5: start at +0x680<br>6: start at +0x700<br>7: start at +0x780 |
| 5 - 4 | R/W | segment count<br>0: 4 segments (1024 bytes)<br>1: 1/2 segments (128 bytes)<br>2: 1 segments (256 bytes)<br>3: 1 and 1/2 segments (384 bytes)<br>4: 2 segments (512 bytes)<br>5: 2 and 1/2 segments (640 bytes)<br>6: 3 segments (768 bytes)<br>7: 3 and 1/2 segments (896 bytes) |
| 7 - 6 | R/W | window dma pointer<br>0: reference to window starting address and size regs 0 in +0x300 to +0x318<br>1: reference to window starting address and size regs 1 in +0x320 to +0x338<br>2: reference to window starting address and size regs 2 in +0x340 to +0x358<br>3: reference to window starting address and size regs 3 in +0x360 to +0x378 |
| 8 | W | 1: start new dma<br>0: continue dma |
| 9 | R/W | 1: tiling frame buffer load<br>0: linear memory load |
| 10 | R/W | 1: enable interrupt after complete loading<br>0: disable interrupt |
| 14 - 11 | - | reserved |
| 15 | R | 0: load complete<br>1: load dma in progress<br>This bit is set at load and reset at load completion. |
| 63 - 24 | - | reserved |

*FIG._37*

Flush window cache register

| Bits | access | Description and default value |
|---|---|---|
| 3 - 0 | R/W | starting segment to flush<br>0: start at +0x400 (default)<br>1: start at +0x480<br>2: start at +0x500<br>3: start at +0x580<br>4: start at +0x600<br>5: start at +0x680<br>6: start at +0x700<br>7: start at +0x780 |
| 5 - 4 | R/W | number of segment to flush<br>0: 4 segments (1024 bytes)<br>1: 1/2 segments (128 bytes)<br>2: 1 segments (256 bytes)<br>3: 1 and 1/2 segments (384 bytes)<br>4: 2 segments (512 bytes)<br>5: 2 and 1/2 segments (640 bytes)<br>6: 3 segments (768 bytes)<br>7: 3 and 1/2 segments (896 bytes) |
| 7 - 6 | R/W | pixel dma pointer<br>0: reference to pixel starting address and size regs 0<br>1: reference to pixel starting address and size regs 1<br>2: reference to pixel starting address and size regs 2<br>3: reference to pixel starting address and size regs 3 |
| 8 | W | 1: start new dma<br>0: continue dma |
| 9 | R/W | 1: tiling frame buffer flush<br>0: linear memory flush |
| 10 | R/W | 1: enable interrupt after complete flushing<br>0: disable interrupt |
| 11 | R/W | 1: opaque mode<br>0: overwrite mode |
| 14 - 12 | - | reserved |
| 15 | R | 0: flush complete<br>1: flush dma in progress<br>This bit is set at flush reset at flush completion. |
| 63 - 24 | - | reserved |

FIG._38

Window cache mode register

| Bits | access | Description and default value |
|---|---|---|
| 7 - 0 | R/W | processor ID |
| 9 - 8 | R/W | mode<br>00: idle<br>01: clean<br>10: dirty<br>11: reserved |
| 31 - 10 | R/W | don't care |
| 63 - 32 | - | reserved |

*FIG._39*

Packer data register

| Bits | access | Description and default value |
|---|---|---|
| 7 - 0 | W | write an 8 bit pixel |
| 15 - 0 | W | write a 16 bit pixel |
| 7 - 0 | R | read an 8 bit pixel |
| 15 - 0 | R | read a 16 bit pixel |
| 63 - 16 | - | reserved |

*FIG._40*

Packer data starting address register

| Bits | access | Description and default value |
|---|---|---|
| 9 - 0 | R/W | Starting packer location in window cache |
| 15 - 10 | R/W | xwidth_dw: number doubleword in x direction is cached |
| 17 - 16 | R/W | color depth<br>00: 8 bits per pixel<br>01: 16 bits per pixel |
| 63 - 12 | - | don't care |

*FIG._41*

Packer data size register

| Bits | access | Description and default value |
|---|---|---|
| 9 - 0 | R/W | object x size |
| 11 - 10 | R/W | put 0 |
| 18 - 12 | R/W | object y size |
| 23 - 19 | R/W | put 0 |
| 63 - 24 | - | don't care |

FIG._42

Display current address register

| Bits | access | Description and default value |
|---|---|---|
| 11 - 0 | R/W | current Xoffset, X offset location from frame origin |
| 23 - 12 | R/W | current Yoffset, offset location from frame origin |
| 63 - 24 | - | reserved |

FIG._43

Display remain size register

| Bits | access | Description and default value |
|---|---|---|
| 11 - 0 | R/W | remaining Dwidth, X remain of display in this line |
| 23 - 12 | R/W | remaining Dheight, Y remain of display |
| 63 - 24 | - | reserved |

FIG._44

Window current address register

| Bits | access | Description and default value |
|---|---|---|
| 31 - 0 | R | current address for linear access |
| 11 - 0 | R | current xoffset from frame origin for tile access |
| 23 -12 | R | current yoffset from frame origin for tile access |
| 25 -24 | R | Frame id, for tile access<br>0: use frame 0, (default)<br>1: use frame 1<br>2: use frame 2,<br>3: use frame 3 |
| 63 - 27 | - | reserved |

*FIG._45*

Window remain register

| Bits | access | Description and default value |
|---|---|---|
| 10 - 0 | R | remaining byte count for linear access |
| 11 - 0 | R | remainging Pwidth,<br>X remain pixels in the line for tile access |
| 23 - 12 | R | remaining Pheight, Y remain of tile access |
| 63 - 24 | - | reserved |

*FIG._46*

PIO Read Respond Timing

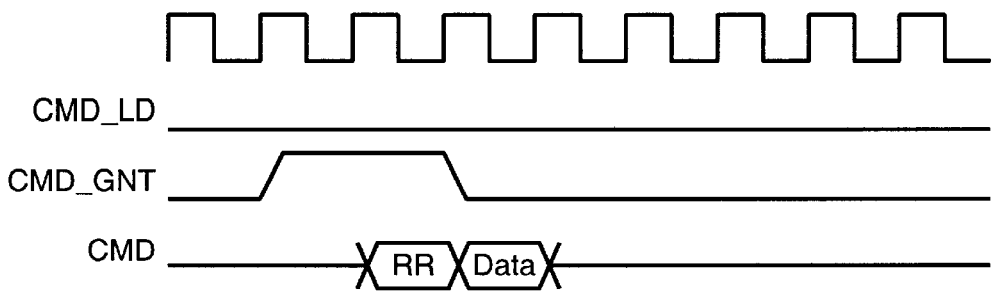

*FIG._47*

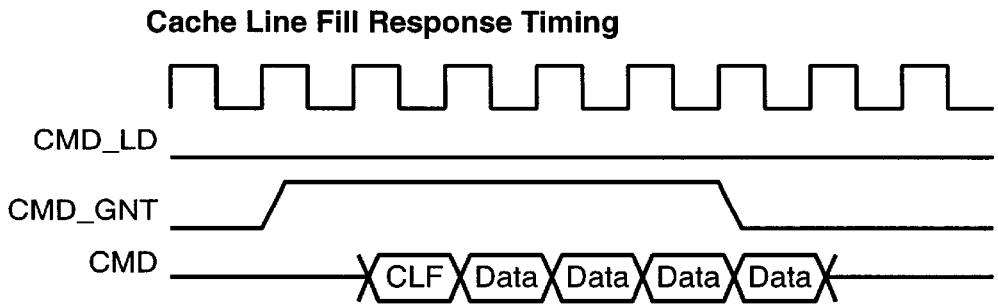
FIG._48
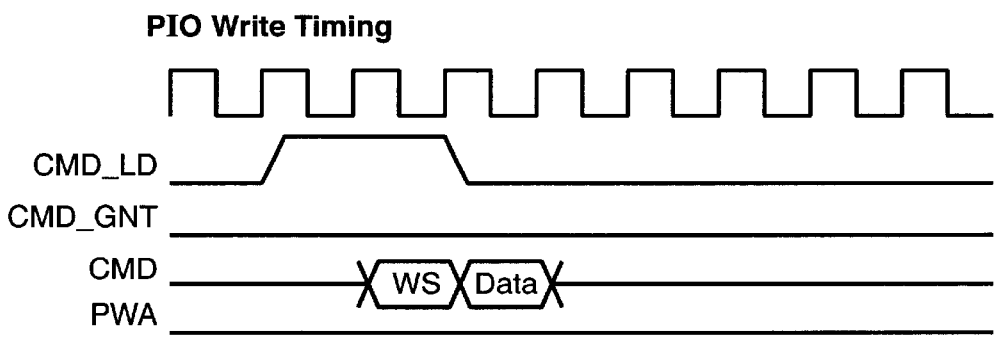
FIG._49
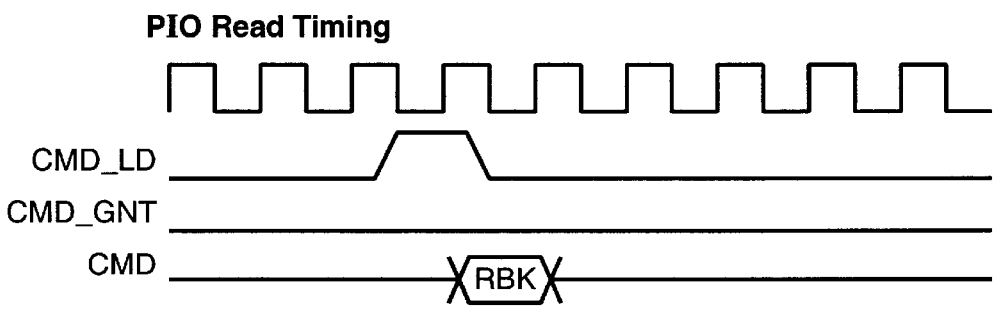
FIG._50
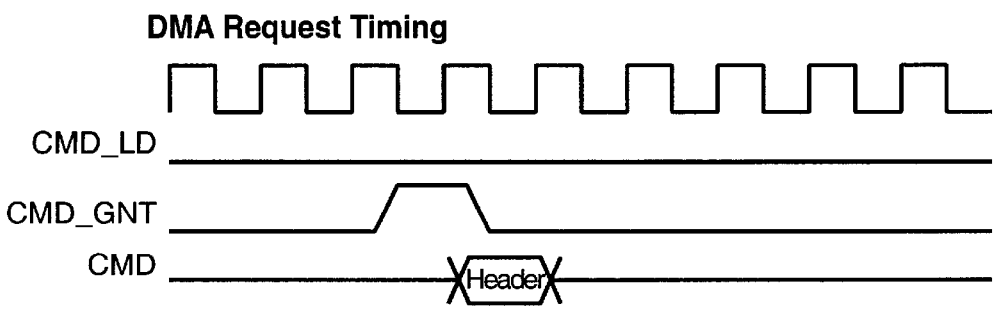
FIG._51

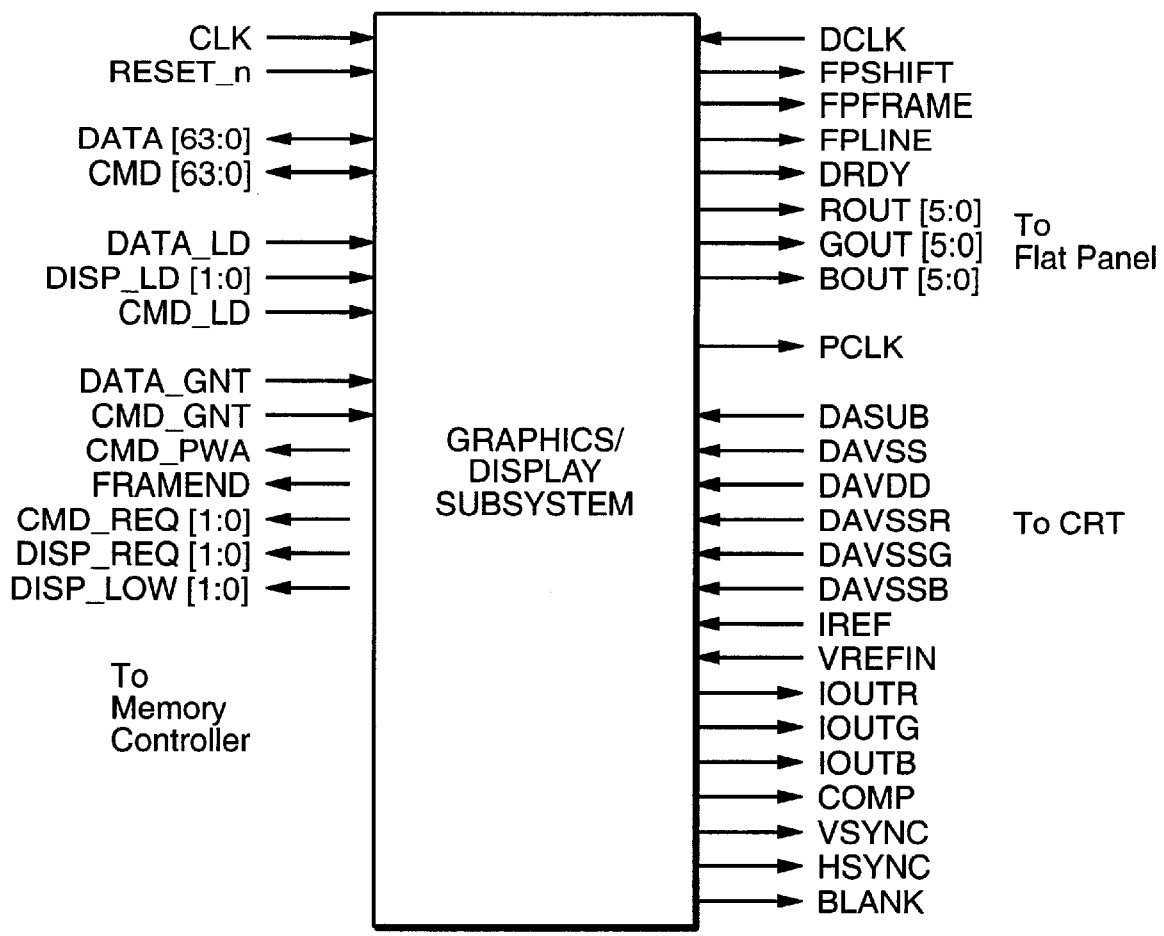
FIG._52
DISP_LD [1:0] Signal Format
| 00 | DMA data when DATA_LD asserts |
| --- | --- |
| 01 | primary display data stream |
| 10 | secondary display data stream |
| 11 | Invalid |
FIG._53

Special Screen Block Command Header Format
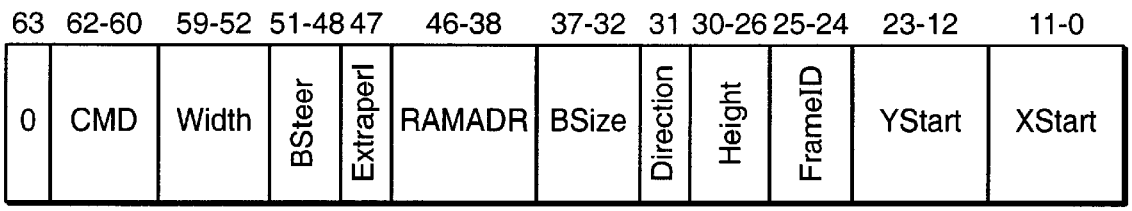
FIG._54
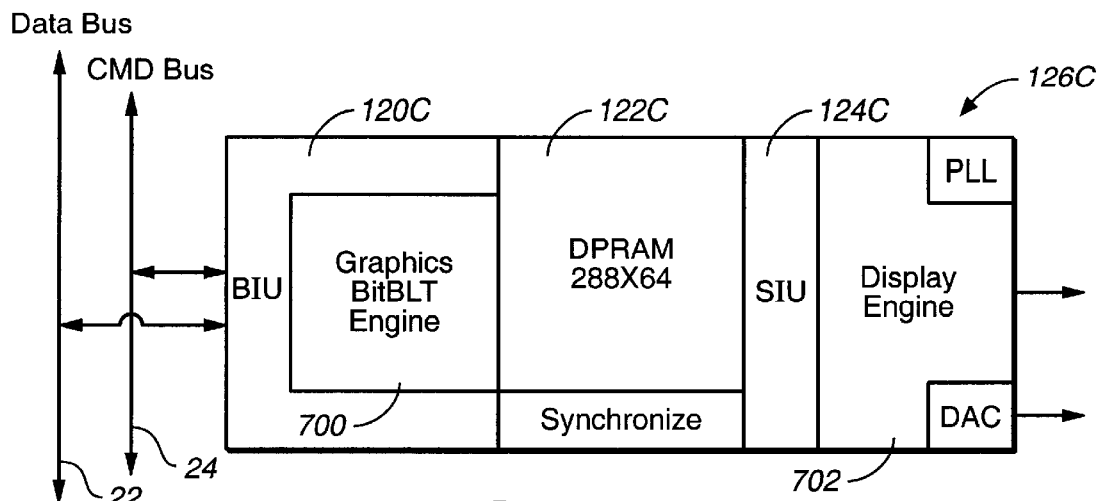
FIG._55
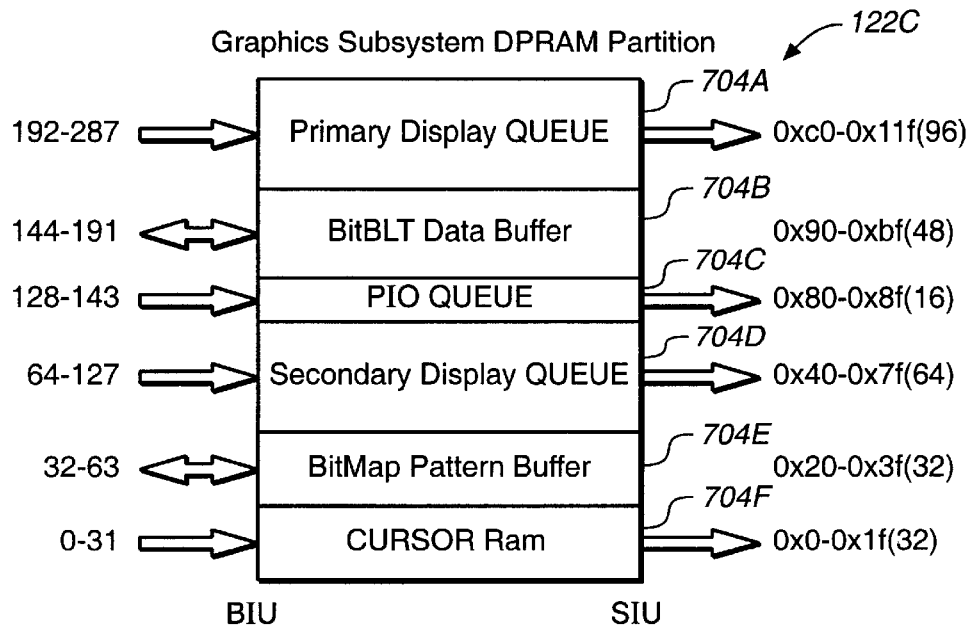
FIG._56

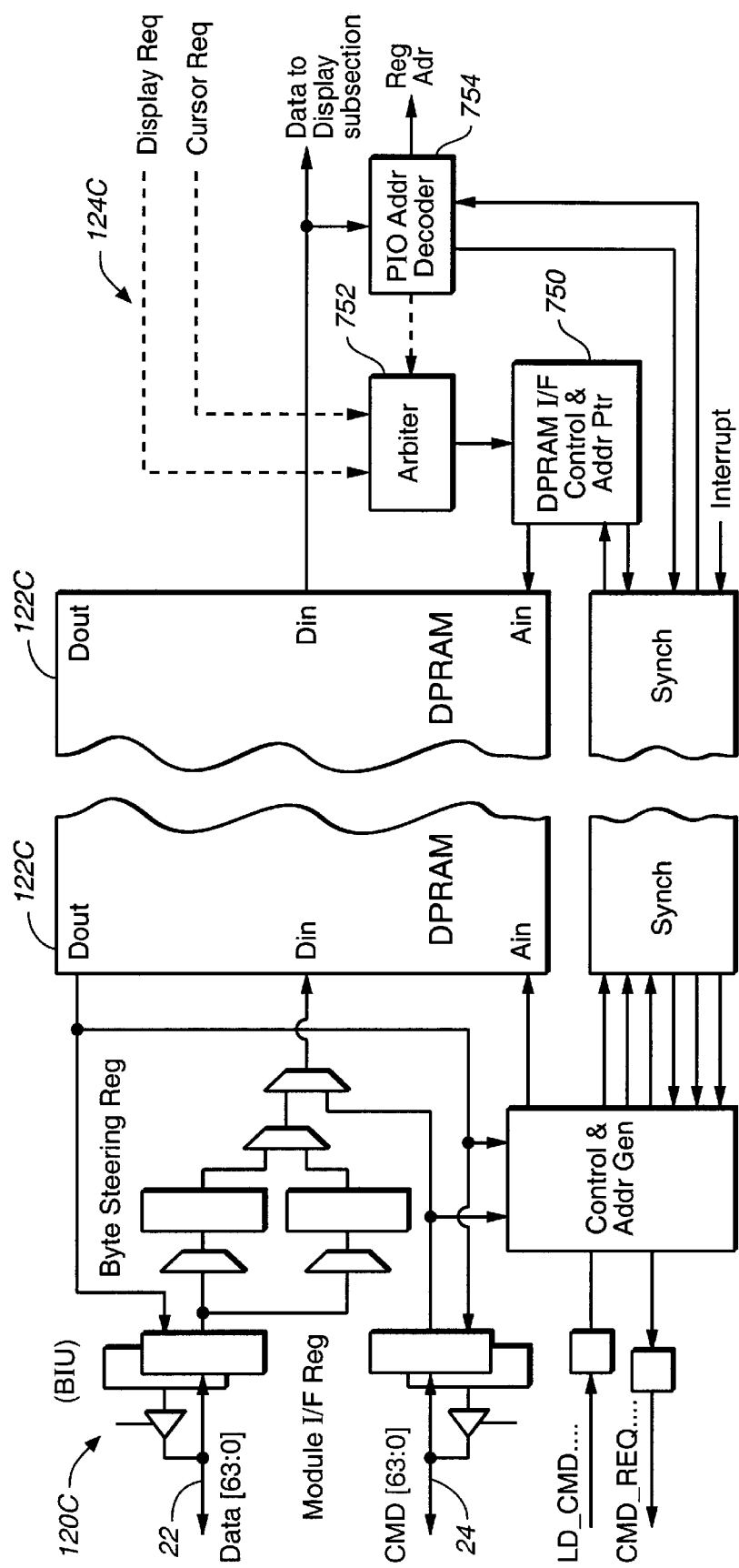

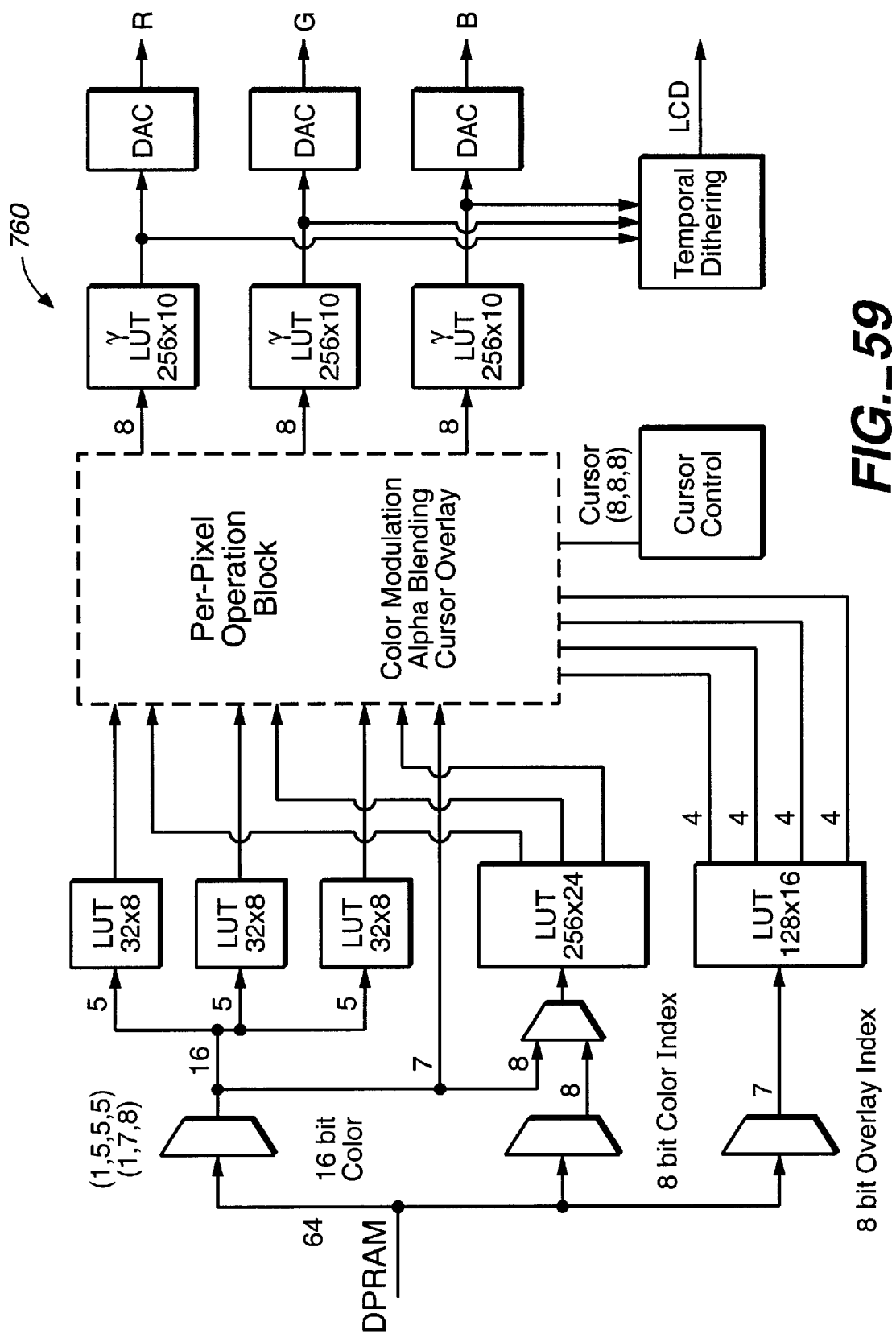
FIG._59

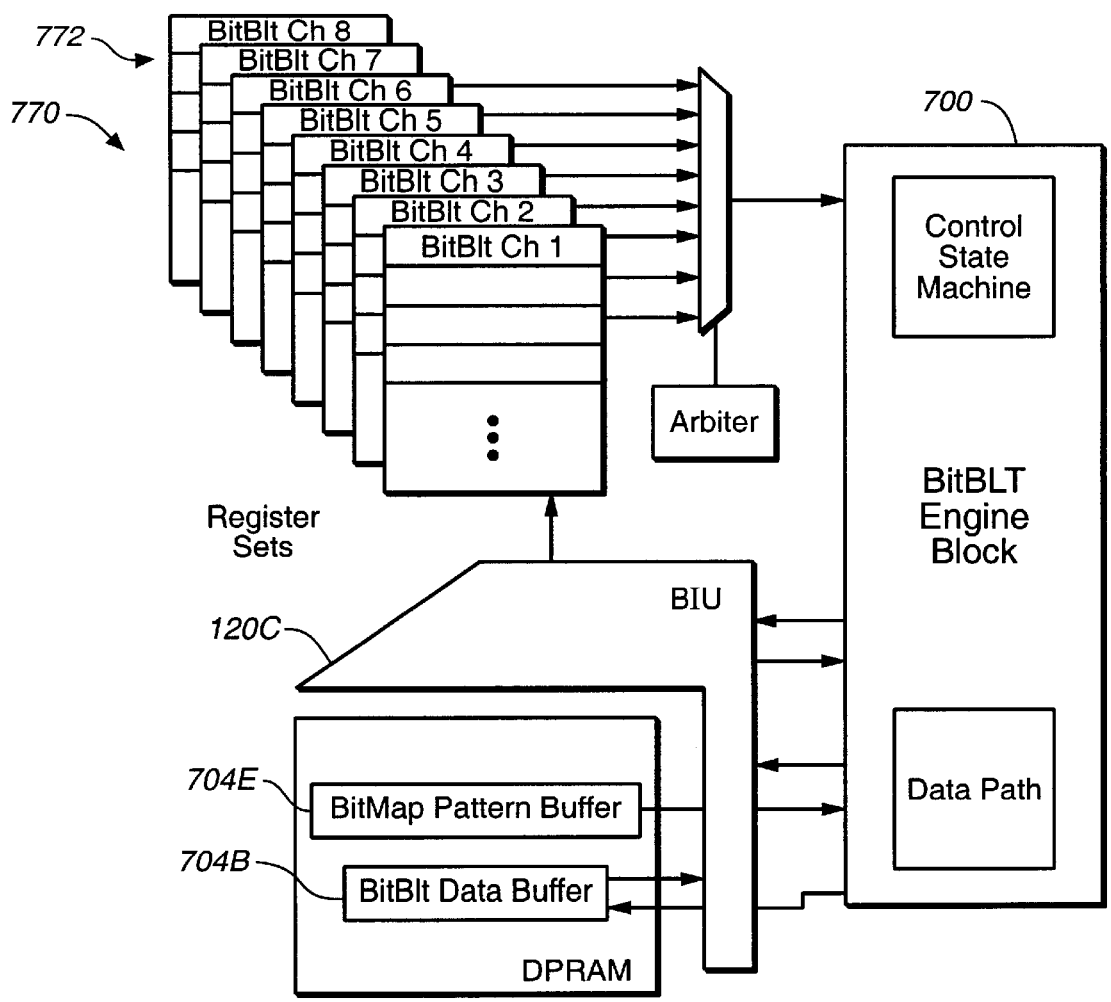
FIG._60

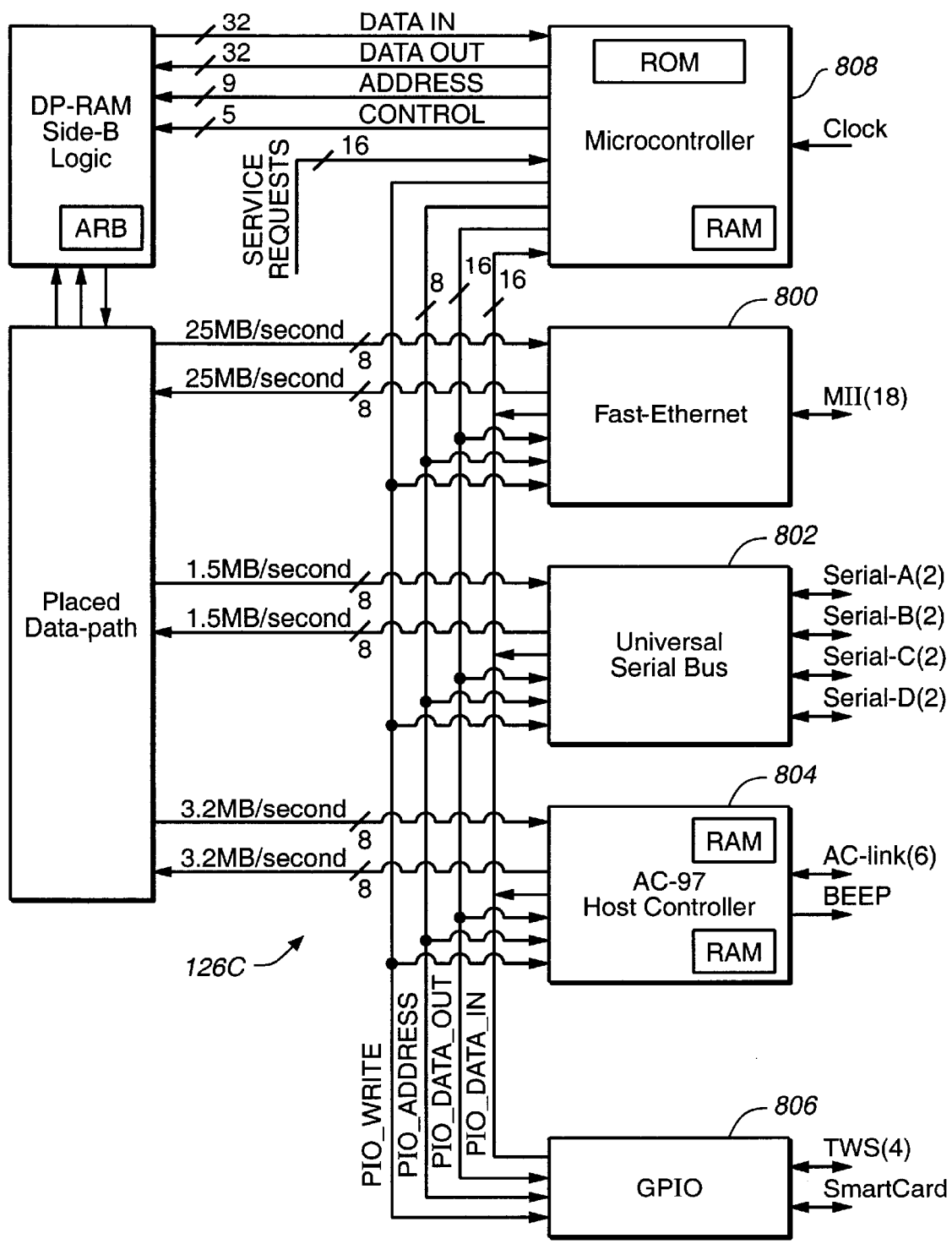
FIG._61

INTEGRATED CIRCUIT WITH UNIFIED MEMORY SYSTEM AND DUAL BUS ARCHITECTURE

CROSS-REFERENCE TO RELATED APPLICATION

This application claims the benefit of U.S. Provisional Application Serial No. 60/061,489, filed Oct. 8, 1997, which is hereby incorporated by reference.

BACKGROUND OF THE INVENTION

The present invention relates to integrated circuits and, in particular, to an integrated circuit having a unified memory architecture.

Unified memory architectures have been used for various computer applications, such as network computers, Internet appliances and mission specific terminal applications. In a typical unified memory architecture, all devices requiring access to memory are coupled to a common system bus. These devices can include a processor, an input-output device or a graphics device, for example. A memory controller arbitrates access to memory between the various devices.

Memory latency is a common difficulty in unified memory architectures since each device must arbitrate for access to memory over the system bus. Latency can be reduced by requesting bursts of data from memory. For example, graphics devices may request bursts of display data from a frame buffer. Since graphics devices continually supply data to a screen display, these devices have a high bandwidth requirement and cannot easily accommodate long memory latencies. On the other hand, processors typically request specific data from memory or another device and then wait for the data without giving up access to the system bus. Also, processors require a relatively high priority. This often results in contention for the system bus between the processor and devices having high bandwidth requirements.

A conventional system with multiple bus masters uses an address bus and a data bus to control the memory system. Typically, both of these busses are arbitrated for and granted to one master at a time. Many cycles of bus time are lost due to dead time between masters, and time required for each master to communicate its data request to the memory controller. In addition, the processor uses the same bus for doing "program Input/Output" functions, which are very inefficient in terms of bus utilization.

A typical system that includes a raster scan display output for graphics uses a second memory system for this time critical function. Not only does this extra memory system increases cost, but the overall performance of the system is impacted due to the need for the data to be copied from processor memory space into the display memory space.

SUMMARY OF THE INVENTION

The unified memory system of the present invention provides a high enough bandwidth to enable a graphics and display subsystem to use the same memory as a processor and other bus transactor circuits. The unified memory system includes a processor, a memory controller, a plurality of bus transactor circuits and a shared memory port. A processor bus is coupled between the processor and the memory controller. A first multiple-bit, bidirectional system bus is coupled between the shared memory port, the memory controller and the plurality of bus transactor circuits. A second multiple-bit, bidirectional system bus is coupled between the memory controller and the plurality of bus transactor circuits.

Another aspect of the present invention relates to a method of passing data between a shared memory port, a memory controller and a plurality of bus transactor circuits, the method includes: passing memory data between the shared memory port, the memory controller and the plurality of bus transactor circuits over a multiple-bit, bidirectional data bus; passing non-memory data between the memory controller and the plurality of bus transactor circuits over a multiple-bit, bidirectional command bus; controlling access by the plurality of bus transactor circuits to the data bus with the memory controller; and controlling access by the plurality of bus transactor circuits to the command bus with the memory controller independently of access to the data bus.

BRIEF DESCRIPTION OF THE DRAWINGS

FIG. 1 is a block diagram of an integrated circuit according to one embodiment of the present invention.

FIG. 2 is a block diagram showing the integrated circuit coupled to a variety external devices.

FIG. 3 is a memory map of the integrated circuit.

FIG. 4 is a more detailed block diagram of the integrated circuit, according to one embodiment of the present invention.

FIG. 5 is a diagram illustrating inputs and outputs of a system bus interface unit in a bus transactor circuit within the integrated circuit.

FIG. 6 is a diagram illustrating an acknowledge message format.

FIG. 7 is a diagram illustrating logical separation of a dual port RAM in the system bus interface unit shown in FIG. 5.

FIG. 8 is a diagram illustrating a command bus message header format.

FIG. 9 is a diagram illustrating a command bus message header format for a screen block transfer.

FIG. 10 is a table illustrating available transaction types of a command field in the header formats of FIGS. 8 and 9.

FIG. 11 is a waveform diagram illustrating data bus timing within the integrated circuit.

FIG. 12 is a waveform diagram illustrating command bus within the integrated circuit.

FIG. 13 is a block diagram illustrating an example of a subsystem interface to the DPRAM shown in FIG. 5.

FIG. 14 is a waveform diagram illustrating waveforms in the subsystem interface shown in FIG. 13 during a PIO read.

FIG. 15 is a waveform diagram illustrating waveforms in the subsystem interface shown in FIG. 13 during a PIO write.

FIG. 16 is a waveform diagram illustrating waveforms during outbound data transfers.

FIG. 17 is a block diagram of a processor in the integrated circuit according to one embodiment of the present invention.

FIG. 18 is a simplified block diagram illustrating connection of a memory controller to the system blocks of integrated circuit 10.

FIG. 19 is a diagram illustrating inputs and outputs of the memory controller shown in FIG. 18.

FIG. 20 is a block diagram of an interface between the memory controller and external memory.

FIGS. 21A–21C together form a table of memory controller registers.

FIG. 22 is a table which defines each bit of a reset and status register.

FIG. 23 is a table which defines each bit of a system configuration register.

FIG. 24 is a table which defines each bit of a memory configuration register.

FIG. 25 is a table which defines each bit of a memory initialization and refresh register.

FIG. 26 is a table which defines each bit of a frame configuration register.

FIG. 27 is a table which defines each bit of frame starting tile address and tile configuration registers.

FIG. 28 is a table which lists common frame resolution numbers.

FIG. 29 is a table which defines each bit of a display DMA control register.

FIG. 30 is a table which defines each bit of a display DMA ID register.

FIG. 31 is a table which defines each bit of a display starting offset register.

FIG. 32 is a table which defines each bit of a display screen size register.

FIG. 33 is a table which defines each bit of a dither LUT register.

FIG. 34 is a diagram illustrating how pixel data is cached in a window cache.

FIG. 35 is a table which defines each bit of a window starting address register.

FIG. 36 is a table which defines each bit of a window size register.

FIG. 37 is a table which defines each bit of a load window cache register.

FIG. 38 is a table which defines each bit of a flush window cache register.

FIG. 39 is a table which defines each bit of a window cache status register.

FIG. 40 is a table which defines a packer data register.

FIG. 41 is a table which defines each bit of a packer starting address register.

FIG. 42 is a table which defines each bit of a packer data size register.

FIG. 43 is a table which defines each bit of display current address registers.

FIG. 44 is a table which defines each bit of display remain size registers.

FIG. 45 is a table which defines each bit of a window current address register.

FIG. 46 is a table which defines each bit of window remain registers.

FIG. 47 is a waveform diagram illustrating PIO read response timing.

FIG. 48 is a waveform diagram illustrating cache line fill response timing.

FIG. 49 is a waveform diagram illustrating PIO write timing.

FIG. 50 is a waveform diagram illustrating PIO read timing.

FIG. 51 is a waveform diagram illustrating DMA request timing.

FIG. 52 is a diagram illustrating interface signals to and from a graphics and display subsystem within the integrated circuit.

FIG. 53 is a table indicating a DISP_LD[1:0] signal format.

FIG. 54 is a diagram of a DMA command header for Screen relative addressing direct memory accesses (DMAs).

FIG. 55 is a block diagram of the graphics and display subsystem.

FIG. 56 is a diagram illustrating partitioning of a DPRAM in the graphics and display subsystem.

FIG. 57 is a simplified block diagram of a data path a bus interface unit of the graphics and display subsystem.

FIG. 58 is a simplified block diagram of a subsystem interface unit of the graphics and display subsystem.

FIG. 59 is a block diagram of a pixel pipe section of the graphics and display subsystem.

FIG. 60 is a block diagram of a graphics BitBLT data flow through the graphics and display subsystem.

FIG. 61 is a block diagram of a serial subsystem in the integrated circuit.

DETAILED DESCRIPTION OF THE PREFERRED EMBODIMENTS

The integrated circuit of the present invention has a unified memory and dual bus architecture which maximizes bandwidth to and from an external memory device while minimizing latency for individual subsystems that compete for access to the memory device.

FIG. 1 is a block diagram of the integrated circuit of the present invention. Integrated circuit 10 includes processor 12, memory controller 14, plurality of bus transactor circuits 15A–15C, shared memory port 20 and dual system buses 22 and 24. Processor 12 is coupled to memory controller 14 over a bidirectional processor bus 26 which includes processor address lines 28, processor control lines 30 and processor data lines 32 which allow processor 12 to communicate with memory controller 14.

Memory controller 14 is coupled to shared memory port 20 and system buses 22 and 24. Shared memory port 20 includes a memory address interface 40, a memory control interface 42 and a memory data interface 44. Memory data interface 44 is coupled to system bus 22. Shared memory port 20 is coupled to an external memory device 46, which can include a synchronous dynamic random access memory (SDRAM), for example.

Bus transactor circuits 15A–15C are coupled to memory controller 14, shared memory port 20 and to one another through multiple-bit, bidirectional system bus 22. Bus transactor circuits 15A–15C are also coupled to one another and to memory controller 14 through multiple-bit, bidirectional system bus 24. System bus 22 is a data bus which carries memory data being transmitted to and from external memory 46 by bus transactor circuits 15A–15C and processor 12 (through memory controller 14). System bus 24 is a command bus which carries command data and programmed input-output (PIO) data being transmitted between bus transactor circuits 15A–15C and processor 12 (through memory controller 14).

Data bus 22 is used exclusively for transferring memory data between memory 46 and one of the bus masters. Command bus 24 is used for transferring "requests" for memory data transfers by bus transactor circuits 15A–15C and for PIO operations. Memory controller 14 includes a command queue for storing the requests so that the next memory access can be started at the earliest possible time without relying on performance or latency of command bus 24. Access to data bus 22 results from memory controller 14 executing one of the commands that is stored in the command queue. If the next command in the queue is for access to memory 46, data bus 22 is automatically granted to the requesting device. A bus transactor circuit requesting read access to memory 46 is always ready to receive the corresponding data, and a bus transactor circuit requesting write access is always ready to send the data.

Each bus transactor circuit 15A–15C can include a variety of devices requiring access to external memory 46 such as another processor, a serial input-output (I/O) subsystem, a parallel I/O subsystem and a graphics and display subsystem.

With two system buses, including data bus 22 and command bus 24, bus transactor circuits 15A–15C can request access to external memory 46 and pass memory controller 14 the address of the next block of data over command bus 24 while data is being transferred simultaneously to another one of the bus transactor circuits or the processor over data bus 22. Bus transactor circuits 15A–15C do not have to wait until the end of the data transfer to pass the address of the next block of data to be transferred. This reduces memory latency. Also, PIO data transfers are passed over command bus 24, which leaves data bus 22 free for higher bandwidth data transfers and therefore reduces contention on data bus 22.

The dual bus architecture of the present invention allows the system to utilize a much greater amount of the theoretical memory performance. This enables a graphics and display subsystem to use the same memory as the processor and other bus transactor circuits in unified memory system. A second memory system for display data is not required as in conventional computer systems. This results in a significant cost savings and performance improvement.

In one embodiment of the present invention, integrated circuit 10 is implemented as an Application-Specific Standard Product (ASSP) for use in Network Computer, Internet Appliance and mission specific terminal applications. In this embodiment, integrated circuit 10 integrates many of the common functions associated with attaching to the Internet such that all of the functions needed for an Internet browser box can be implemented with only the addition of memory, such as external memory 46.

For example, FIG. 2 is a block diagram showing integrated circuit 10 coupled to a variety external devices, including a peripheral component interface (PCI) 60, an Ethernet local area network (LAN) 62, an Interactive Services Digital Network (ISDN) network 64, a keyboard 66, a mouse 68, a monitor or LCD panel 70, an audio digital-to-analog (D/A) converter 72, an audio analog-to-digital converter 74, SDRAM 46, a read-only memory 76, a serial electrically-erasable read-only memory (EEPROM) 78, an ISO7816 compliant SmartCard interface 80, a printer 82 and a scanner 84.

1. Physical Address Map for Integrated Circuit 10

Integrated circuit 10 has a 32--bit physical address, which allows integrated circuit 10 to address four gigabytes of contiguous physical memory. All internal resources, as well as system resources, are mapped within this address space.

FIG. 3 is a memory map illustrating the division of system resources. The starting address of each block of memory is indicated at 90, where "0x" represents a hexadecimal number. The system resource associated with each block of memory is indicated at 92. The quantity of memory contained in each block of memory is indicated at 94, where "M" represents megabytes and "G" represents gigabytes.

2. Overall System Architecture

FIG. 4 is a block diagram of integrated circuit 10 according to the above-example. The same reference numerals are used in FIG. 4 as were used in FIG. 1 for the same or similar elements. Integrated circuit 10 includes a plurality of external pins, including serial I/O pins 100, PCI and parallel I/O pins 102, display pins 104, and SDRAM pins which include memory data pins 106 and memory address and control pins 108. Pins 106 and 108 form shared memory port 20.

Integrated circuit 10 further includes processor 12, memory controller 14, bus transactor circuits 15A–15C, data bus 22 and command bus 24. In one embodiment, processor 12 includes a CW4011 Microprocessor Core available from LSI Logic Corporation, a Multiply/Shift Unit, a MMU/TLB, 16K instruction cache, 8K data cache, and a Cache Controller/Bus Interface Unit. The CW4011 core is a MIPS® architecture processor that implements the R4000, MIPS® II compliant 32--bit instruction set. Other types of processors can also be used.

Processor 12 is coupled to memory controller 14 and interrupt controller 110 through processor bus interface unit 112. As memory and interrupt functions are closely tied to processor 12, interrupt controller 110 is coupled to processor 12 to take advantage of an arbitration scheme geared towards maintaining processor performance. System interrupts are funneled through interrupt controller 110 to the processor 12. Interrupt controller 110 supports programmable priority assignments which provide flexibility to the system design of integrated circuit 10. Processor 12 can read from or write to any one of the bus transactor circuits 15A–15C directly over command bus 24 via programmed I/O cycles. In most cases, data to and from external memory 46 is transferred over data bus 22 via one of many on-chip direct memory access (DMA) engines located in bus transactor circuits 15A–15C and memory controller 14, as described in more detail below. The DMA capabilities serve to off-load data transfer duties from processor 12 as well as to ensure that data bus 22 is used most effectively by using burst transfers whenever possible.

Memory controller 14 passes memory data between shared memory port 20, processor 12 and bus transactor circuits 15A–15C over data bus 22. Memory controller 14 passes non-memory data between processor 12 and bus transactor circuits 15A–15C over command bus 22. For example, memory controller 14 passes header data (data transfer requests) between memory controller 14 and bus transactor circuits 15A–15C and passes programmed input-output (PIO) data between processor 12 and bus transactor circuits 15A–15C over command bus 24.

Bus transactor circuits 15A–15C include bus interface units (BIUs) 120A–120C, dual port RAMs (DPRAMs) 122A–122C, subsystem interface units (SIUs) 124A–124C and subsystems 126A–126C, respectively. Subsystems 126A–126C are also referred to as "peripheral blocks".

Subsystem 126A is a serial I/O subsystem which implements a fast Ethernet 10 Mbit/100 Mbit per second peripheral device, a four port universal serial bus host controller, an audio-97 AC-link audio peripheral and a set of generic programmed I/O pins. Subsystem 126B is a PCI and parallel I/O subsystem which includes a high performance PCI interface, an IEEE 1284 compliant parallel port, and IDE/ATA-PI disk interface, provisions for flash ROM and PCMCIA adapters, PS2 compatible keyboard and mouse inputs, I²C interfaces and a SmartCard interface.

Subsystem 126C is a graphics and display subsystem which supports direct attachment to a CRT monitor or an LCD panel, such as monitor 70, shown in FIG. 2, through red-green-blue (RGB) and digital outputs formed by display pins 104. External memory 46, shown in FIG. 1, is coupled to SDRAM pins 106 and 106 and is used to hold a video frame buffer for display and graphics subsystem 126C.

Each subsystem 126A–126C uses a message passing, split transaction protocol to transfer data and control information over data bus 22 and command bus 24. Buses 22 and 24 are 64-bit, bidirectional, tri-state, buses. Each bus transactor circuit 15A–15C has an input and output queue within DPRAMs 122A–122C for storing messages being passed to and from its subsystem and the other bus transactor circuits 15A–15C and processor 12. Since processor 12 requires a low latency, high speed access to memory, it has a private port to memory controller 14 through processor bus 26 (shown in FIG. 1).

2.1 Data and Command Bus Interfaces

Bus interface units (BIUS) 120A–120C direct traffic over buses 22 and 24 to and from respective subsystems 126A–126C. Messages are passed between buses 22 and 24 and subsystem interface units (SIUs) 124A–124C through bus interface units 120A–120C and DPRAMs 122A–122C, respectively.

Typically, the operating frequency of each subsystem differs from that of system buses 22 and 24. DPRAMs 122A–122C are the logical boundaries for the different clock domains. In one embodiment, BIUs 120A–120C and DPRAMs 122A–122C are logically and physically identical. Although some portions of SIUs 124A–124C are similar, subsystem specific logic is typically required in each implementation. Thus, each SIU 124A–124C is logically and physically unique to the corresponding subsystem.

2.1.1 Bus Interface Unit Signals

FIG. 5 is a diagram illustrating the inputs and outputs of one of the system bus interfaces for subsystems 126A–126C. The system bus interface includes BIU 120, DPRAM 122 and SIU 124. DPRAM 122 is divided into a plurality of queues and forms a clock boundary 130 between BIU 120 and SIU 124. BIU 120 has the following input and output signals:

BCLK (input) is a System Bus Clock to which all bus signals are referenced.

RESET_N (input) is a System Reset signal.

DATA[63:0] (tri-state, bidirectional) is the 64-bit bi-directional data bus 22 (shown in FIGS. 1 and 4) for transferring data to and from external memory 46.

DATA_ERR (input) is asserted by memory controller 14 when the subsystem attempts a transaction to an invalid memory address.

DATA_LD (input) is a signal which loads the contents of data bus 22 into DPRAM 122. This signal will be asserted by memory controller 14 when data is to be transferred from external memory 46 to DPRAM 122. Data will be valid on Data Bus 22 on the following clock. This signal is used for direct memory access (DMA) data transfers from external memory to the corresponding subsystem.

DATA_GNT (input) is a DATA_GRANT signal which is asserted by memory controller 14 to the subsystem, indicating that BIU 120 should drive data onto data bus 22 on the following clock. This signal is used for DMA data transfers to external memory.

DATA_EOT (input) is a Data bus End Of Transfer signal which is asserted by memory controller 14 on the clock cycle that precedes the last cycle of a data transfer.

CMD[63:0] (tri-state, bidirectional) is the 64-bit bi-directional Command Bus 24 for communicating command headers and CPU data transfers (PIO) between memory controller 14 and each subsystem.

CMD_LD (input) is a Command Load signal which is asserted by memory controller 14 when the CPU (processor 12) is requesting a PIO transfer to the corresponding subsystem indicating that a valid command header will be present on command bus 24 on the following clock.

CMD_GNT (input) is a COMMAND GRANT signal which is asserted by memory controller 14 to indicate that BIU 120 is granted command bus 24.

CMD_PWA (output) is a PIO Write Acknowledge signal which is asserted by BIU 120 to indicate to memory controller 14 that a PIO write has been completed.

CMD_REQ[1:0] (output) is a Command Request signal which is asserted by BIU 120 to memory controller 14 to request that Command Bus data be transferred. The Command Request signal is coded per the following Table:

TABLE 1

| 00 | IDLE |
|---|---|
| 01 | Memory Request |
| 10 | CPU Read Reply |
| 11 | Interrupt Request |

2.1.2 Subsystem Interface Unit (SIU) Signals

Subsystem Interface Unit (SIU) 124 provides a synchronous interface between DPRAM 122 and the subsystem hardware logic. SIU 124 has the following input and output signals:

SCLK (input) is a Sub-system clock signal to which all SIU signals are referenced.

SRESET_N (output) is an SIU Reset signal which provides a synchronized system reset to the subsystem.

Dout[63:0] (output) is a 64-bit Data Out signal from SIU 124 to the subsystem.

Din[63:0] (input) is a 64-bit Data In signal from the subsystem to SIU 124.

ADDin (input) is an Address in signal from the subsystem to SIU 124.

WCE (input) is a Write Clock Enable which is asserted by the subsystem during the clock period when valid address and data are presented to SIU 124. Data will be written in DPRAM 122 on the rising edge of the clock when WCE is asserted.

VALID_PIO (output) is a Valid Program I/O in queue signal which, when asserted, indicates that PIO information is still being held in an Input Command Queue in DPRAM 122. The assertion of VP_ACK will pop an entry off the VALID_Input Command Queue. The signal VALID_PIO may remain asserted if additional PIO requests have been loaded into the queue.

VP_ACK is a Valid PIO Acknowledge input which is asserted by the subsystem to indicate that the top entry in the Input Command Queue has been used and can be discarded. This signal will be used by Input Command Queue pointers to advance to the next entry as well as to decrement the VALID_PIO counter.

WRITE is an SIU write input which is asserted by the subsystem to indicate that the PIO data has been decoded to be a write.

ACK_VLD is an ACK bus Valid output which is asserted by SIU 124 to indicate that ACK_BUS[7:0] contains a valid acknowledge message. This signal will be asserted when a data transfer begins.

AB_ACK is an ACK bus Acknowledge input which is asserted by the subsystem to indicate that the current acknowledge message has been read and is no longer needed.

PNTR_VLD is a Pointer Valid output which is asserted by SIU 124 to indicate that ACK_BUS[7:0] contains an updated queue pointer. This signal will be asserted when a data transfer completes.

ACK[7:0] is the Acknowledge Bus output which includes an Acknowledge message sent from BIU 120 to SIU 124 to inform the subsystem when memory requests have been completed and to provide the updated DPRAM address for buffer queue management (may be used by the subsystems for FIFO control). The Acknowledge message format is illustrated in FIG. 6, where "CMD" is a command field which indicates a memory write, a memory read or an error condition, "SSID" is a subsystem identification field, and "NEWRAMADR" is a new address for DPRAM 122.

HEADER_ADD is a Header Queue Addition input which is asserted for one clock when the subsystem has placed a header into a Request queue in DPRAM 122.

HQ_FULL is a Header Queue Full output which is asserted by SIU 124 when the Request queue is full.

2.1.3 Global Signals

The following signals are global signals within integrated circuit 10, which are not specifically shown in FIG. 5.

BIG is a Big Endian Mode signal. When asserted, BIG indicates that system buses 22 and 24 are operating in Big endian mode (i.e. byte address 0 is bits 63:56).

CONFIG_ENABLE is a Configuration Mode Enable. When asserted, this signal indicates that integrated circuit 10 is in a configuration mode and that the power-on defaults are being shifted in through a CONFIG_DIN port.

CONFIG_CLK is a signal on which configuration data is based.

CONFIG_DINx is a serial Configuration Data signal stream which is used to establish reset defaults. Each hierarchical block will take Din, direct it to all necessary register elements, then provide Dout.

CONFIG_Doutx is a serial Configuration Data output.

2.2 System Bus Transactions

To facilitate communications with system buses 22 and 24, DPRAM 122 is logically separated as illustrated in FIG. 7. DPRAM 122 has a Data Queue 150A, a reserved section 150B, a Read Response Queue 150C, an Input Command Queue 150D and a Request Queue 150E. The individual locations in DPRAM 122 are shown at 152, and their corresponding hexadecimal addresses are shown at 154.

The first 256 locations in DPRAM 122 define Data Queue 150A and are used to store DMA data for the subsystem. Read Response Buffer 150C is used to store PIO and Cache Line Fill data from the subsystem when processor 12 is reading data from the subsystem (a CPU read cycle). Input Command Queue 150D stores incoming PIO requests from processor 12 to the subsystem. Request Queue 150E is used for storing subsystem messages being sent to system command bus 24.

2.2.1 Header Format

All command bus messages which are passed through Input Command Queue 150D or Request Queue 150E commence with a header 160 which is formatted as shown in FIG. 8. Each field of header 160 is defined below:

ERROR (Transaction Error) is a read reply error flag. In the event that a PIO read request cannot be completed, the subsystem will return a header with this bit set.

CMD (Command) contains the three bit Transaction type (see FIG. 10).

BCNT(7:0)/Mask (Byte Count/Write Mask). For all read operations and burst write transfers, this field contains the number of bytes to be transferred. For write single commands, this field indicates the byte lanes to be written. Bit 7 corresponds to bits 63–56 of the 64-bit word, and bit 0 corresponds to bits 7–0 of the 64-bit word.

SSID (Subsystem ID) is used for message tracking to identify the particular subsystem associated with the message. These bits are set by the subsystem when a memory data transfer is requested. They are undefined for PIO headers.

RAMADR[7:0] (Ram Address) is the address offset into Data Queue 150A which contains the data to be used for the data transfer. The most significant bit (MSB) of the DPRAM 122 is implied by the type of transfer (i.e. DMA data versus command data).

WRAP (Address Wrap Select) is the bit on which to wrap the RAM pointer. A value of zero wraps on bit 0, resulting in a two word buffer. A value of 1 wraps on bit 1, providing a two bit address, resulting in a four word buffer. A value of 7 wraps the address on bit 7, which yields a 256 word buffer in Data Queue 150A.

DEC (decrementing burst direction), when set, instructs memory controller 14 that the memory addresses for a burst transfer should decrement.

ADDRESS [31-0] (System Address) is the physical address in the external memory where the data will be transferred. This is a byte address, and bits 1–0 are significant.

2.2.2 Screen Block Header Format

For graphics accesses, such as for graphics and display subsystem 126C, a special command header is used to allow tile based DMA operations using screen relative addressing. This header is used when memory controller 14 must perform address translation from a screen coordinate to a physical memory location in the external memory. The header format for a special command header 170 is shown in FIG. 9. The fields in header 170 are defined as follows:

offset (bits [7–0]) define an X offset within a tile for a starting pixel.

offset (bits [15–8]) define a Y offset within a tile for the starting pixel.

TileID (bits [23–16]) define a tile number with respect to a particular frame buffer for the starting pixel.

Width (bits [31–24]) define a number of bytes per line.

Height (bits [36–32]) define the number of lines (5 bits).

Direction (bit [37]) 1=read; 0=write.

FrameID (bits [39–38]) is a frame buffer ID (e.g. front/back buffer or overlay plane).

RAMADR (bits [47–40]) define the starting DPRAM address (8 bits) for subsystem use.

Bits [49–48] are reserved.

BSize (bits [55–50]) define the burst size.

BSteer (bits [59–56]) are used by the subsystem on a read for byte steering.

CMD bits ([62–60]) are set to "000" for this special header type.

ERROR (bit [63]) is always '0' for compatibility with other command headers.

2.2.3 Transaction Types

FIG. 10 is a table which shows the transaction types supported by command bus 22. The transaction types defined by the command CMD field in headers 160 and 170.

The dual system bus architecture of integrated circuit 10 allows for concurrent transfers on data bus 22 and command bus 24. There are some limitations and rules that should be adhered to, however. Concurrent transfers on data bus 22 and command bus 24 to the same bus transactor circuit are not supported. Memory controller 14 has the responsibility to ensure this does not occur. One clock of bus free time is required between data transfers into DPRAM 122 (Data_LD or CMD_LD asserted) and data transfers out of DPRAM 122 (assertion of DATA_GNT or CMD_GNT).

BIU 120 guarantees part of this requirement by not asserting CMD_REQ[1:0] during an ongoing data phase, assuring that CMD_GNT will not be issued. Memory controller 14 assures that a data phase (DATA_GNT) is not started until one clock after a CMD_LD has been issued.

2.3 Bus Interface Unit (BIU)

BIU 120 controls transfers on system buses 22 and 24 by managing the input and output message queues in DPRAM 122. BIU 120 is the transport mechanism by which the subsystem communicates to memory controller 14 and processor 12. BIU 120 contains no subsystem specific data. All DMA and PIO functions, such as buffer allocation, address generation, and register processing, are maintained by the corresponding subsystem.

BIU 120 reacts to messages sent by the subsystem or memory controller 14/processor 12 and manages flow control on buses 22 and 24.

2.3.1 Data Bus Timing

Data bus 22 is used exclusively for passing data between external memory 46, through shared memory port 20, and a bus master (either processor 12 or one of the bus transactor circuits 15A–15C). FIG. 11 is a waveform diagram illustrating the timing for a four cycle data burst on data bus 22. The two primary signals that control data bus 22 are DATA_LD and DATA_GNT. These two signals are replicated for each bus transactor circuit 15A–15C so each BIU 120A–120C does not need any form of address decoding. These signals also precede the data transfer by one clock which provides ample time for BIU's 15A–15C to respond to the assertion.

DATA_LD or DATA_GNT is asserted by memory controller 14 to load the contents of data bus 22 into DPRAM 122 of the bus transactor circuit or to grant access to the bus transactor circuit for driving data onto data bus 22 on the following clock. These signals are used for DMA data transfers to and from external memory. DATA[63:0] is the 64-bit bi-directional data bus 22. DATA_EOT is asserted by memory controller 14 on the clock cycle that precedes the last cycle of the data transfer. DATA_EOT is common to all bus transactor circuits 15A–15C and indicates that the transfer is ending when asserted along with either DATA_LD or DATA_GNT.

2.3.2 Command Bus Timing

Command bus 24 serves a dual purpose in that it provides a conduit for passing headers (data transfer requests) between bus transactor circuits 15A–15C and a memory controller 14 as well as passing PIO data between processor 12 and bus transactor circuits 15A–15C. FIG. 12 is a waveform diagram illustrating the timing for command bus 24.

The signals that control command bus 24 are CMD_LD and CMD_GNT. CMD_LD is asserted by memory controller 14 when processor 12 needs to write a PIO request to a BIU. CMD_GNT is asserted by memory controller 14 to allow a BIU to send its header to memory controller 14. The timing of the data control signals and the tri-state enables is identical to that of data bus 22.

2.3.3 Memory Write

To perform a memory write operation, one of the subsystems 126A–126C first places a write message header into its Request queue 150E (shown in FIG. 7). The message contains the information shown in FIG. 8, including 1) a write command (single or block; write single contains a mask to determine which bytes of the 64-bit word are valid, write block contains the number of consecutive bytes in the block); 2) a subsystem ID to track the message; 3) the DPRAM address of the first data element to be written to memory; 4) a wrap field which is used by BIU 120 to determine the address on which to wrap the RAMADR; 5) a DEC field informing memory controller 14 whether to increment or decrement addresses during burst cycles; 6) the physical address into which the data will be written.

If DPRAM locations 0 through 7 are used as a circular queue, the wrap field would contain a 2 (i.e. 010 binary). With this value, if an 8 word burst write started at RAMADR 4, the data transferred would come from locations 4,5,6,7, 0,1,2,3. In this manner, any queue whose size is a multiple of 2 can be sectioned in DPRAM 122.

Once the message is written into Request queue 150E, HEADER_ADD (shown in FIG. 5) is asserted by the subsystem to SIU 124 for one clock cycle. BIU 120 detects that Request queue 150E is not empty and asserts the CMD_REQ bits according to the command bits for the header at the top of the queue. Once memory controller 14 asserts CMD_GNT for to BIU120, BIU 120 transfers the header from Request Queue 150E to command bus 24. At the same time, BIU 120 latches the RAMADR used for transferring data from DPRAM 122. When memory controller 14 is ready for the write data, it asserts DATA_GNT to BIU 120, and the data is transmitted from data queue 150A to data bus 22 on the following clock cycle.

When the first word of data is to be transferred to external memory (as indicated by the assertion of DATA_GNT), BIU 120 writes the acknowledge message (subsystem ID) into the ACKBUS queue. The data is driven onto ACK_BUS[0:7], and the ACK_VLD signal asserted by SIU 124 to indicate that the transfer has started for the indicated subsystem. The subsystem will acknowledge this by asserting AB_ACK.

When the last piece of data is transferred (as indicated by the assertion of DATA_EOT along with DATA_GNT), the updated RAMADR will be placed into the ACK_BUS queue. Assuming that the previously placed acknowledge message has been read out (by the subsystem asserting AB_ACK), the RAMADR value will be placed on the ACK_BUS and PNTR_VLD is asserted. The address sent during the acknowledge cycle reflects the state of the DPRAM address after the data has been transferred out of the RAM. In the above example, the NEWRAMADR sent back would be a 4. This NEWRAMADR may be used by the subsystem logic to determine how much room is left in the logical "FIFO".

Once this value has been read by the subsystem, it is cleared from the queue by the assertion of AB_ACK. The signals ACK_VLD and PNTR_VLD represent the beginning and end of a data burst.

2.3.4 Memory Read

To perform a memory read operation, the subsystem 126A, 126B or 126C first places a read message header into its Request queue 150E. The message contains the following information as shown in FIG. 8: 1) read command; 2) number of bytes to read (the external memory will always return data aligned on an 8-byte boundary); 3) subsystem ID to track the message; 4) DPRAM address into which the read data will be placed; 5) the wrap field used by the BIU to determine the address on which to wrap the RAMADR; 6) the DEC field which informs memory controller 14 whether to increment or decrement addresses during burst cycles; and 7) the physical address from which the data will be read.

Once the message is written into Request queue 150E, HEADER_ADD is asserted by the subsystem to SIU 124 for one clock. BIU 120 detects that Request queue 150E is not empty and asserts the CMD_REQ bits according to the command bits for the header at the top of the queue. When CMD_GNT is asserted, the BIU transfers the header to command bus 24. At the same time, the BIU latches the RAMADR. When memory controller 14 is ready to return the requested data, it activates DATA_LD to BIU 120 and the data is transferred from data bus 22 to DPRAM 122.

When the first word of data arrives in DPRAM 122 from memory system (as indicated by the assertion of DATA_LD), BIU 120 writes the acknowledge message (subsystem ID) into the ACKBUS queue. The acknowledge message is driven onto the ACK_BUS, and the ACK_VLD signal asserted by the SIU to indicate that the first piece of data has arrived for the indicated subsystem. The subsystem will acknowledge this by asserting AB_ACK.

When the last piece of data has been transferred to DPRAM 122 (as indicated by the assertion of both DATA_LD and DATA_EOT), the updated RAMADR will be placed into the ACKBUS queue. Assuming that the previously placed acknowledge message has been read out (by the subsystem asserting AB_ACK), the RAMADR value will be placed on the ACKBUS and PNTR_VLD asserted. The address sent during the acknowledge cycle reflects the state of the DPRAM address after the read data has been placed in the DPRAM. In the above example, the NEWRAMADR sent back would be a 4. This NEWRAMADR is used by the subsystem logic to determine how much room is left in the logical "FIFO".

Once this value has been read by the subsystem, it is cleared from the queue by the assertion of AB_ACK. The signals ACK_VLD and PNTR_VLD represent the beginning and end of a data burst. Thus, subsystems that will use the data in the order in which it is transferred may begin operating on the data as soon as ACK_VLD is asserted. On the other hand, subsystems that need random access into a data buffer will wait until PNTR_VLD is asserted to assure that the entire buffer is valid.

2.3.5 Programmed I/O Cycles

Programmed I/O (PIO) cycles initiated by processor 12 are transferred to the desired BIU via command bus 24. PIO read requests use the READ SINGLE command in header 160, while PIO write requests use the WRITE SINGLE command. At any time, memory controller 14 may assert CMD_LD. This informs the BIU that a PIO is being sent. The BIU places the PIO header message into Input Command Queue 150D in DPRAM 122 and notifies SIU 124 by placing a flag into the VALID_Input Command Queue. If the request is a write, the data is also written into Input Command Queue 150D and a second flag placed in the VALID_Input Command Queue.

The subsystem detects the assertion of VALID_PIO and starts a cycle to fetch the header from Input Command Queue 150D. Once the header has been read, VP_ACK is asserted by the subsystem to SIU 124, which in turn deletes the entry from the Input Command Queue and the VALID_Input Command Queue.

When the header information is read from DPRAM 122, the command bits are examined to determine if the PIO is a read or a write. If the request is a read, the subsystem acquires the requested data (this may take a number of cycles) and places it in Read Response Buffer 150C in DPRAM 122. Afterwards, it formulates a reply header, places it into the outbound Request queue 150E, and HEADER_ADD is asserted by the subsystem to SIU 124 for one clock.

BIU 120 detects that Request queue 150E is not empty and asserts the CMD_REQ bits according to the command bits for the header at the top of the queue (the READ REPLY command from the subsystem indicates a PIO read response). When CMD_GNT is asserted, the BIU transfers the header and data (pointed to by the RAMADR field in the header) onto the command bus which completes the cycle.

If the PIO is a write operation, the subsystem performs the write to the appropriate address. Once the write is complete, it asserts the VP_ACK signal a second time with WRITE asserted which deletes the queue entry for the write data and causes CMD_PWA (PIO Write Acknowledge) to be asserted back to memory controller 14. A PIO write does not require any header to be generated back to memory controller 14.

2.3.6 DPRAM Addressing

For BIU address generation, the address can come from one of four sources:

1) When Memory Controller 14 asserts CMD_LD, the address of Input Command Queue 150D is driven into DPRAM 122. Memory Controller 14 assures that a command and a data transfer do not overlap each other;
2) When a subsystem wants to transfer data, it puts a header into the queue. When the queue has valid data in it, and the DPRAM is otherwise idle, the Queue Head address (from internal counters) will be driven into the DPRAM. The header information is held in output registers. The RAMADDR field from the header data will be stored in a DPRAM address counter, thus pre-addressing the DPRAM for the upcoming data transfer;
3) With the Header command bits available, the BIU asserts the CMD_REQ bits to memory controller 14, signaling a memory transaction. When memory controller 14 is ready to transfer the data for a subsystem, it will assert either DATA_LD or DATA_GNT. This keys the BIU to drive the stored RAMADDR value into the counters, and increment it on each clock;
4) When the subsystem needs to send back the data for a PIO read, the BIU will drive a predetermined address. The RAMADDR field of the header is not used.

2.3.7 Bus Drive

Command bus 24 and data bus 22 are both tri-state and bidirectional. In order to avoid dead cycles when switching bus masters, the tri-state controls adhere to strict guidelines.

All bus control signals precede their respective data transfers by one clock. This provides a full clock cycle of setup time for the BIUs to prepare to drive the bus. All devices drive their tri-state controls in a similar manner so that bus contention will be kept to a minimum.

Due to the large number of lines that will need to be driven (e.g. 64 bits), the tri-state control lines are buffered through a D-type buffer gate. The input of this gate comes directly from the Q output of a flip flop with no other combinatorial logic between the Q output and the tri-state control inputs.

2.4 Subsystem Interface Unit

Subsystem Interface Unit (SIU) 124 provides a synchronous "wrapper" to DPRAM 122. The data in and data out lines of DPRAM 122 are separate, which allows for overlapped read and write cycles to occur.

FIG. 13 is a block diagram illustrating an example of how an example of a subsystem interfaces to DPRAM 122. DPRAM 122 has a data input DPdin, a data output DPdout and an address input DPadd. In this subsystem, DPRAM 122 is configured to include a data queue 190A (i.e. data queue 150A shown in FIG. 7), a PIO queue 190B (i.e. input command queue 150D), a header queue 190C (i.e. request queue 150E), and a BMD queue 190D (i.e. reserved queue 150B). The interface includes signal synchronizer 200, DPRAM arbitor 202, header queue handler 204, direct memory access controller (DMAC) 206 for outgoing channels, DMAC 208 for incoming channels and PIO responder 210.

The SIU side of DPRAM 122 is addressed via DPadd bus. This bus is registered and applied to DPRAM 122. Header queue handler 204 provides the addressing over DPadd bus. The ownership of the SIU side of DPRAM 122 is established by the arbitration of the address bus by DP arbitor 202.

For the purpose of explaining the operation of the DPRAM interface, a hypothetical peripheral block has been created. This example block contains two eight-channel DMA controllers 206 and 208 (eight channels of outgoing data, and eight channels of incoming data) and PIO responder 210. Each DMA channel 206 and 208 can be considered to be a "subsystem". However, each eight-channel block is grouped together as a single resource that arbitrates for DPRAM 122.

DMA controllers 206 and 208 are fed by Buffer Memory Descriptors (BMDs). A FIFO, not shown, is coupled between each DMA controller and its physical data port 209 and 211.

PIO responder 210 is responsible for coordinating the PIO accesses to subsystem control registers. Some of the registers will be from DMA controllers 206 and 208, while others could be from various hardware specific functions.

2.4.1 PIO Read

Once the data has been made available, DMA controller 206 places the data in Read Response Buffer 150C and a PIO Read Response Header is passed back to the BIU. The BIU then signals memory controller 14 which will then assert CMD_GNT in order to pass the data. A detailed description of these events is outlined above.

FIG. 14 is a waveform diagram illustrating the waveforms of various signals in the subsystem interface shown in FIG. 13 during a PIO read. First, memory controller 14 places a PIO read request into the Input Command Queue 150D by placing a header on command bus 24 and asserting LD_CMD of the desired BIU 122. The header contains the address of the desired transaction. One word is loaded into the queue. Next, synchronizer 200 asserts VALID_PIO to PIO Responder 210 indicating that at least one PIO is outstanding. PIO Responder 210 requests the use of the DP address bus, DPadd. When DP arbitor 202 provides the bus, PIO responder 210 drives the Input Command Queue address for one clock, and then the next address for one clock. The next address cycle is completed because the read cannot be distinguished from a write at this point. VP_ACK is asserted during the clock period that the header information is valid to indicate that the header has been read. Subsystems may use the VP_ACK signal to qualify the latching of header information. Next, the PIO queue handler in PIO responder 210 examines read/write bit and negates the WRITE line to indicate that the current transaction is a PIO read. The subsystem address is decoded, and the PIO_REQ to the appropriate subsystem (e.g. DMA controllers 206 and 208) is asserted. The subsystem has the opportunity to latch the address, if needed, during the clock cycle where the header is presented (VP_ACK asserted). After the second clock, PIO Responder 210 releases the DPadd bus, and DPRAM 122 is available for other transactions. The selected subsystem fetches the desired data, then asserts PIO_ACK when it is ready to transfer the data. The subsystem must be able to immediately drive data. PIO Responder 210 then asserts PIO_HEAD_REQ. The header queue handler 204 arbitrates for the DP bus, and when arbitration has been won, asserts PIO_HEAD_GNT. On the clock edge where PIO_HEAD_GNT is sampled asserted, the Header Generator in handler 204 drives the Request Queue address onto the DPadd bus. PIO Responder 210 drives the header data onto the DPdin bus, negates the PIO_REQ to the subsystem, and negates the DPadd bus request. The subsystem drives data onto the DPdin bus on the clock where PIO_REQ is first sampled negated. The Header Responder drives the DPadd bus with the location for PIO read response data.

2.4.2 PIO Write

A PIO write is considerably different than a PIO read in the sense that processor 12 is not necessarily stalled waiting for the write to complete. Due to the pipelined nature of the system, the physical write could occur many clocks after the CPU in processor 12 executed the respective instruction.

The nature of the system architecture assures that reads and writes to a particular subsystem will occur in the order in which they were executed. However, there will be no guarantee that writes to two different subsystems will complete in order.

During a PIO write cycle, memory controller 14 passes two pieces of information to BIU 120. The first piece of information is the header, as in the read cycle. The second piece of information is the actual data to be written. The PIO write data is passed on command bus 24, not on data bus 22.

FIG. 15 is a waveform diagram illustrating the waveforms of various signals in the subsystem interface shown in FIG. 13 during a PIO write. First, memory controller 14 places a PIO write header followed by the data into Input Command Queue 150D via command bus 24 (two words are loaded into the queue). Next, PIO Responder 210 gets "VALID_PIO" from synchronizer 200 indicating that at least one PIO is outstanding. PIO Responder 210 requests the use of the DPadd bus. When it gets the bus, it drives Input Command Queue address for one clock, and then the next address (which will be the location of the PIO data) for one clock. It also assert VP_ACK for one clock to acknowledge the VALID_PIO header. Since this is a write cycle, VALID_PIO will remain asserted due to the word of data which is still in the queue.

PIO Responder 210 examines the read/write bit of the header and asserts the WRITE line to indicate that the current transaction is a PIO write. The subsystem address is decoded, and the PIO_REQ to the appropriate subsystem is asserted. The subsystem has the opportunity to latch the address, if needed, during the header transfer (VP_ACK may be used as a qualifier for valid header data). All required header information needs to be latched at this time. On the second clock, PIO Responder 210 releases the DPadd bus, and DPRAM 122 is available for other transactions. All subsystems preferably latch the write data on the third clock after PIO_BG was asserted. The selected subsystem completes the write operation, then asserts PIO_ACK. PIO Responder 210 then asserts VP_ACK (for one clock) to synchronizer 200, indicating that the data portion of the PIO can be retired. VALID_PIO may remain asserted if another PIO has been queued. Synchronizer 200 uses the VP_ACK and WRITE asserted to generate CMD_PWA (PIO Write Acknowledge) back to memory controller 14.

2.4.3 DMA Transfers

In one embodiment, DMA controllers 206 and 208 implement "generic" DMA controller functions. Each DMA controller fetches a DMA instruction from main memory (e.g. external memory 46 shown in FIG. 1) in a format referred to as a Buffer Memory Descriptor (BMD). The BMD contains the relevant information as to where the data is, how much data will be transferred, and an optional link to another BMD. The following table shows the format for a BMD:

TABLE 2

| | |
|---|---|
| Local Memory Address Pointer | 0 |
| BYTE COUNT/FLAGS | 4 h |
| NEXT BMD POINTER | 8 h |

The starting address of each field within the BMD is given on the right hand side of Table 2, where "h" indicates a hexidecimal number.

The Local Memory Address Pointer is a 32-bit byte address where the data buffer resides in local memory. The data need not be aligned to a word boundary.

The byte count/flags register is used to control interrupt functions of the DMAC (done, error, etc.). One of the flags in this register is a BLAST flag which, when set to one, indicates that no additional BMDs are linked to the current DMA transfer. The Byte Count field identifies the number of bytes that the BMD will transfer. The Next BMD Pointer points to the address of the next BMD in the list.

The BMDs are arranged in memory and aligned to 16 byte boundaries. The four least significant bits, 3:0, which are not needed to specify the BMD address, are used to qualify and enable the DMA channel. Bits 3:1 are set to zero in order for the BMD address to be accepted as valid. Should these bits be inadvertently set to one, the address will be considered improper and the attempted operation will be flagged as an error. Bit 0 is the enable, and is set to one to start the DMA operation.

The register defined by bits 3:0 is updated with the address of the last BMD fetched from memory. Bit 0 will remain set until either a BMD with the STOP bit set is completed, or an attempt to link to an invalid BMD is attempted. While this register can be read at any time to establish current DMAC status, it is not necessary to do so under normal operation. Interrupts are used to signal the CPU when the DMAC needs attention.

2.4.4 DMAC Operation

In each DMAC 206 and 208, the DMAC state machine works off the contents of a DMAC register array (shown in FIG. 13). The DMAC register array holds the current contents of the BMDs for each channel. At power-on RESET, the DMAC state machine clears the contents of the DMAC register array so that all locations are zeros. The state machine then enters an idle state and waits until a PIO write operation occurs.

After a PIO write, the DMA controller will sequentially read the DMAC register array, looking for an enabled channel. If it checks all available channels and finds none enabled, it will return to the idle state until the next PIO write occurs. If an enabled channel is found, however, it will initiate a DMA sequence, as described below.

2.4.5 BMD Transfers

Detecting an enabled DMA channel brings up a current BMD address. This address is passed to the header generator in handler 204 (shown in FIG. 13). The byte count is fixed at the BMD size (12 or 16 bytes). The software requires BMDs to be aligned to 16 byte (line) boundaries, and thus, the BMD transfer logic does not need to worry about crossing cache (or page) boundaries. With the header data ready, the enabled DMA controller requests to transfer a header to the Request queue 150E of DPRAM 122 by asserting its HEADER_REQ signal. Header Queue Handler 204 arbitrates the use of the DPadd bus and asserts HEADER_ACK back to the requesting DMA controller.

On the next clock edge, Header Queue Handler 204 drives the address of the Request queue 150E onto the DPadd bus while the DMA controller drives the header data onto the DPdin bus. The Header_Ack signal is negated at this time. The BIU 120 takes the header information and passes it on to memory controller 14 which starts a memory read operation.

When the data transfer from external memory 46 to DPRAM 122 begins, the ACK_VLD signal will be asserted, and the ACKBUS is driven with the ID for the subsystem for which that the data is intended. Since it is assured that the data will flow in as fast (if not faster) than the subsystem can read it out, the data transfer from DPRAM 122 to the DMAC 208 can begin immediately if it is to be read out in sequential order. However, if random access to the buffer is required, then the subsystem must wait until the end of the transfer.

When the ACK_VLD signal is asserted, all subsystems that are awaiting data will examine the ACKBUS to see if the data is theirs. The subsystem ID will remain valid on the bus until AB_ACK is asserted by the subsystem. Thus, the subsystem may take several clocks to respond.

When AB_ACK is asserted by the selected subsystem, the ACKBUS will become unknown until the end of the data transfer at which time the ACKBUS will be driven with the input queue pointer and PNTR_VLD will be asserted. The subsystem may use this information to update its address pointer. The subsystem must assert AB_ACK in response to PNTR_VLD. With data valid in DPRAM 122, the DMA controller requests the DPadd bus (asserts its BR) so that the BMD can be transferred into working registers.

The DMA controller will drive the DPadd bus on the clock following the assertion of Bus Grant (BG). BR is asserted for as many clocks as data words required, and the DPadd bus incremented on each clock.

Data out of DPRAM 122 will flow, offset from the address by two clocks. The DMA controller must route the data to the appropriate place and store it.

2.4.6 Outbound Data Transfer

Outbound data transfers transfer data from external memory 46 (shown in FIG. 1) to DMA controller 206. FIG. 16 is a waveform diagram illustrating the waveforms of various signals during outbound data transfers. With the BMD resident in the DMAC registers for DMA controller 206, the data transfer phase may begin. DMA controller 206 keeps the pointer to the exact spot in DPRAM 122 that it will use for data storage. DMA controller 206 may divide the available space into "buffers" and then only keep track of the starting point for each buffer, or it may treat it as a FIFO in which case it will need to keep track of both the "input" and "output" pointers.

When the DMAC is ready to transfer data, it will generate a header that will request the data from memory 46 (for efficient bus utilization, the transfer should be of some nominal size, a transfer of eight 64 bit words is being used for this example). With the header data ready, the DMAC will request to send the header by asserting HEADER_REQ.

Note that this operation is identical to the BMD transfer. Header Queue Handler 204 arbitrates for the DPRAM bus and responds with HEADER_ACK. DMA controller 206 drives header data onto the DPdin bus while Header Queue Handler 204 drives the address. The header is sent to memory controller 14 over command bus 24, and a DRAM access to memory data bus 22 is started. The data is routed from external memory 46 to DPRAM 122 and ACK_VLD is asserted.

DMA controller 206 will respond to ACK_VLD by asserting AB_ACK. Since the data will be taken out of DPRAM 122 in sequential order, the DMA controller 206 may start the data transfer immediately and asserts its DP_BUSREQ.

When DMA controller 206 is granted the bus, it immediately negates DP_BUSREQ (combinatorially) as it only needs to transfer one piece of data. On the following clock edge, it drives the DP address for the first piece of data. The requested data will be driven out of DPRAM 122 on DPdout two clocks later, and the DMA controller 206 will latch the data on the following clock.

Meanwhile, the remainder of the data transfer from external memory 46 will be completing. The completion will be signaled by the assertion of PNTR_VLD. If DMA controller 206 is operating DPRAM 122 storage as a FIFO, it will store the value on the ACKBUS as the input pointer. The PNTR_VLD must be acknowledged by the assertion of AB_ACK.

2.4.7 Inbound Data Transfers

Inbound data transfers from DMA controller 208 to external memory 46 accumulate in the FIFO coupled to DMA controller 208 a byte at a time until a word (or end of transfer) has been reached. Then, DMA controller 208 transfers the data to the data queue 150A of DPRAM 122. When a buffer is full (or end of transfer), DMA controller 208 generates a header to transfer it from DPRAM 122 to main memory.

To write the data from DMA controller 208 to DPRAM 122, DMA controller 208 requests the DP bus by asserting BR. When BG is asserted, BR is negated (combinatorially), as only a single word of transfer is required. On the next clock edge, the address is driven out on DPadd while the data is driven on DPdin.

Once a buffer full of data is ready, the header is generated in the same manner as for a BMD transfer or outbound data transfer. DMA controller 208 knows that the write buffer is available for additional transfers by getting an ACK_VLD with its subsystem ID bits set. The ACK_VLD and PNTR_VLD signals must be acknowledged as in the case of a BMD or data read transfer.

2.5 Interrupts & Exceptions

Interrupt headers are written into the outbound queues by the subsystem and sent to the interrupt controller 110 via command bus 24.

2.6 Error Handling

In the event of a failed PIO transfer, the subsystem reports the error back to memory controller 14. For a PIO read cycle, this is accomplished by the subsystem returning a header with the ERROR bit set (See FIG. 8). If the PIO was a write cycle, then the subsystem generates an interrupt cycle back to the CPU.

In the event that a subsystem attempts a read data transfer from an illegal address, memory controller 14 responds with a single data word with the global signal DATA_ERR asserted. For a write to an illegal address, the subsystem is responsible for discarding the data. In either case, memory controller 14 saves the offending header and interrupts the processor 12.

When one of the BIUs 120 detects the DATA_ERR signal asserted along with either DATA_GNT or DATA_LD, it sets the CMD bits in the ACK message to "11", indicating that the requested transfer had an error. The corresponding subsystem examines the CMD bits when the ACK_VLD signal is asserted, and takes appropriate action (terminate DMA, PCI ABORT, etc.).

3. Processor 12

FIG. 17 is a block diagram of processor 12 according to one embodiment of the present invention. Processor 12 includes a CW4011 Microprocessor Core 250, which is available from LSI Logic Corporation, a multiply/accumulate Unit 252, a memory management unit (MMU) 254 with a translation lookaside buffer (TLB), a 16K two-way set associative instruction cache 256, an 8K two-way set associative data cache 258, a write-back buffer 260 for write cache mode and an SCbus interface 262. The CW4011 core is a MIPS® architecture processor that implements the R4000, MIPS® II compliant 32-bit instruction set. Other types of processors can also be used.

The Bus Interface unit (BIU) in core 250 manages the flow of instructions and data between the CW4011 core and memory controller 14 over processor bus 26 by means of SCbus interface 262. This interface provides the main channel for communication between core 250 and the other function blocks of integrated circuit 10.

Processor 12 and its interface with memory controller 14 are described in more detail in U.S. Provisional Application Serial No. 60/061,489, which has been incorporated by reference.

4. Memory Controller 14

Since integrated circuit 10 has a unified memory architecture, memory controller 14 ensures that all devices efficiently access external memory 46. Data flow is managed and maintained in this centrally located block so as to allow the most efficient utilization of the system's internal resources.

FIG. 18 is a simplified block diagram which illustrates the major functional units of memory controller 14 and the system blocks of integrated circuit 10 to which the controller is connected. The memory controller 14 includes external memory interface 270, internal command and data bus arbiter 272, frame buffer tiling control unit 274, bus interface unit (BIU) 276, and display DMA controller 278.

4.1 Memory Controller Signal Descriptions

FIG. 19 is a diagram illustrating the inputs and outputs for each interface of memory controller 14. External memory interface 270 has a plurality of signals 280 which are coupled to external memory 46, through shared memory port 20 (shown in FIG. 1). Internal command and data bus arbiter 272 has a plurality of signals 282 which are coupled to internal data and command buses 22 and 24 and the bus interface units 120A–120C of serial I/O subsystem 126A, PCI & parallel I/O subsystem 126B and graphics and display subsystem 126C. Processor bus interface unit 276 has a plurality of signals 286 (processor bus 26 shown in FIGS. 1 and 17) which are coupled to processor 12. Display DMA controller 278 has a plurality of signals 288 which are coupled to graphics and display subsystem 126C. These signals are described below.

4.1.1 External Memory Interface Signals

Due to the timing requirements of the interface to external memory 46, interface signals 280 are all registered at the output pads of integrated circuit 10. The memory data read from and written to external memory 46 is also registered at internal data bus 22 in both directions. FIG. 20 is a block diagram of external memory interface 270 which shows how the memory controller and data signals are related to internal data bus 22. Memory controller 14 includes a memory controller state machine 300 having a data output 302 and a data input 304. Data output 302 is coupled to memory data bus 22 through register 306 and tri-state buffer 308. Data input 304 is coupled to memory data bus 22 through register 310. Shared memory port 20 has data pins DATA[63:0], control pins CKE[1:0], RAS_n, CAS_N, WE_N, DQM[7:0], address pins A[13:0] and clock pins CLK[1:0]. Memory data is passed from memory data bus 22 to data pins DATA[64:0] through register 312 and tri-state buffer 314. Memory data is passed from data pins DATA[64:0] to memory data bus 22 through register 316 and tri-state buffer 318.

Control signals CSO_n[1:0], RASO_n, casO_N, WEO_n, CKEO[1:0], and DQMO[7:0] and address signals AO[13:0] are coupled to the respective pins of integrated circuit 10 through register 320 and tri-state buffer 322. CSO_n[1:0] are chip select signals, one for each of two banks of external memory 46, according to one embodiment of the present invention. RASO_n is a row address strobe. CASO_n is a column address strobe. WEO_n is a write enable. CKEO[1:0] are clock enables, one for each bank of external memory 46. DQMO[7:0] is a DQ mask enable. AO[13] is a bank select. For a 16 Mbit external memory device, AO[13] connects to pin A[11]. For a 64 Mbit external memory device, AO[13] connects to pin A[13]. AO[12] is a lower bank select which is only valid for a 64 Mbit device and is the higher "arrow address" after pin A[11]. Clock signals CLKO[1:0] are coupled to clock pins CLK[1:0] and are used to clock registers 306, 310, 312, 316 and 320. State machine 300 also generates tri-state buffer control signals DATA2MEM and MEM2DATA, which control buffers 308, 314, 318 and 322. DATA2MEM enables a write from internal data bus 22 to memory 46. MEM2DATA enables a read from memory 46 to internal data bus 22.

4.1.2 Bus Arbiter Signals

Internal bus arbiter 272 controls three subsystems. These are the serial, parallel and graphics/display subsystems 126A–126C. Each subsystem has a set of handshake control signals in interface 282 to access the command and data buses: data_ld, data_gnt, data_err, data_eot, cmd_req, cmd_gnt, cmd_ld, cmd_pwa,. etc, which are defined below.

Data[63:0] is a 64-bit bi-directional data bus for transferring data to and from external memory 46 through internal memory data bus 22.

Data_gnt[2:0] is a 3-bit data grant output, each bit of which is coupled to a bus interface unit 120A–120C of a respective subsystem 126A–126C. Memory controller 14 asserts one of these bits to indicate that the respective bus interface unit should drive data on to data bus 22 on the following clock for DMA data transfers to external memory 46.

Data_ld[2:0] is a 3-bit data load output. Memory controller 14 asserts one of these bits when the contents of data bus 22 is to be loaded into a respective DPRAM 112A–122C. The data will be valid on data bus 112 on the following clock. These signals are used for DMA data transfers from memory 46 to subsystems 126A–126C.

Data err is a data bus error output which is asserted by memory controller 14 when one of the subsystems 126A–126C attempts a transaction to an invalid memory address.

Data_eot is a data bus end of transfer output which is asserted by memory controller 14 on the clock cycle that precedes the last cycle of a data transfer.

CMD[63:0] is coupled to the 64-bit bi-directional command bus 24 for communicating command headers and CPU data transfer (PIO transfers) between memory controller 14 and subsystem 126A–126C.

CMD_req1[2:0] and CMD_req0[2:0] are command request inputs from bus interface units 120A–120C. Bus interface units 120A–120C assert these bits to memory controller 14 to request that data on command bus 24 be transferred. The commands are coded as {cmd_req1, cmd_req0}:

"00"=idle;
"01"=memory request;
"10"=cpu read reply; and
"11"=interrupt request.

CMD_ld[2:0] is a command load output to each BIU 120A–120C. Memory controller 14 asserts one of these bits when processor 12 is requesting a BIU transfer to a respective subsystem 126A–126C indicating that a valid command header will be present on command bus 24 on the following clock.

CMD_gnt[2:0] is a command grant output. Memory controller 14 asserts on of these bits to indicate that the respective bus interface unit 120A–120C is granted the command bus 24.

CMD_pwa[2:0] is a PIO write acknowledge input. Bus interface units 120A–120C assert respective bits of the PIO write acknowledge to indicate to memory controller 14 that a PIO write has been completed.

4.1.3 Processor Interface Signals

The interface between processor 12 and memory controller 14 is a simplified SCBus. In this example, only the CW4011 core 250 (shown in FIG. 17) and memory controller 14 are coupled to the SCBus. Therefore, the signals related to SCBus arbitration and address and data tri-state controls are not needed. These output signals from CW4011 core are ignored: SCAoEn, SCHGTn, SCiFETn and SCLoCKn. These input signals are hard-wired inactive (i.e. stay high): SCB32n, SCBERRn, SCBRTYn, SCHRQn.

The remainder of the SCBus are described as follows:

SCAop[31:0] is an address output bus.

SCBPWAn is a bus in-page write accept output.

SCBRDYn is a bus ready output.

SCDip[63:0] is a data input bus.

SCDoEn is a data output enable.

SCDop[63:0] is a data output bus.

SCiFETn is an instruction fetch input.

SCTBEn[7:0] are bit enable inputs.

SCTBln is a burst last double word input.

SCTBST is a burst transaction input.

SCTPWn is a next transaction in-page write input.

SETSSn is a transaction start strobe input.

SCTSEn is a transaction start enable output.

4.1.4 Graphics and Display Interface Signals

Graphics and display interface 288 includes several handshaking signals which are exchanged between memory controller 14 and graphics and display subsystem 126C. Display DMA 278 includes two display DMA logic blocks, one for each display buffer. Therefore, each logic block has its own load display, display request and watermark hand shake signals.

FRAMEEND is an end of frame input which is used to reload display DMA counters.

LD_DISP[1:0] is a load display data output to graphics and display subsystem 126C which is asserted when memory data is being retrieved for display. This signal has the same timing as DATA_LD and has one bit for each DMA logic block.

DISP_REQ[1:0] is a display request input provided by subsystem 126C to indicate that the display DMA buffer has room for display data. Again, there is one bit for each DMA logic block.

DISP_LOW[1:0] is a low watermark input for each display DMA buffer. When DISP LOW is asserted with DISP_REQ, this indicates that display data is running low and subsystem 126C needs higher priority in accesses to external memory 46.

The two DMA logic blocks share a video sync reset signal VSYNC_RST since they have the same video timing.

4.2 Register Definitions

The registers in memory controller 14 can be grouped into various functional groups:

System registers include system reset and status and general configuration information.

Memory registers specify SDRAM type and SDRAM characteristics, such as latency, refresh period, etc. for external memory 46.

Frame buffer and tile structure registers define the resolution, size and location of the frame buffer. Also defined is the tile structure of the frame buffer.

Display DMA registers define the region of the frame to display.

Window cache registers provide processor 12 a local window cache for pixel operation. The contents of the window cache can be transferred to and from the frame buffer by direct memory access (DMA). The window cache can also be used as linear cache.

Diagnosis registers contain read only intermediate observed states for several DMA operations.

FIGS. 21A–21C provide a list of the registers for memory controller 14, the address range of each register where "0x" indicates a hexadecimal number, and whether each register has read or write access.

4.2.1 Reset and Status Register (Addr +0x000)

FIG. 22 defines each bit of the reset and status register. This register defines software reset to the integrated circuit 10 and memory controller 14.

4.2.2 System Configuration Register (Addr +0x008)

FIG. 23 defines each bit of the system configuration register. This register defines system configuration parameters for memory controller 14, including boot device, memory type and memory related parameters. This register also contains information that is referenced at all times and cannot be put into register files.

The color depths of each of the four frame buffers are also defined here. Two pixel color depths are supported: 8 bits per pixel and 16 bits per pixel.

4.2.3 Memory Configuration Register (Addr +0x010)

FIG. 24 defines each bit of the memory configuration register. This register defines memory parameters for memory control and should reference from the asynchronous characteristics table in the SDRAM data book. The system defaults to a CAS latency of 3.

4.2.4 Memory Initialization and Refresh Register (Addr +0x018)

FIG. 25 defines each bit of the memory initialization and refresh register. This register defines the memory initialization routine and memory refresh frequency.

4.2.6 Frame Configuration Register (Addr +0x020)

FIG. 26 defines each bit of the frame configuration register. This register defines the size of the frame memory resolution. Up to four frame buffers can be specified for the system. All frame buffers have the same resolution, though each can have different color depths (defined in the "System Configuration Register (Addr +0x008)," FIG. 23). Supported resolutions include: 1024 pixels×768 lines; 800 pixels×600 lines; and 640 pixels×480 lines.

4.2.6 Frame starting tile Addresses and Tile configuration Register (Addr +0x100, +0x108, +0x110, +0x118)

FIG. 27 defines each bit of the frame starting tile address and tile configuration registers. These registers define the memory location of the four frame buffers in memory 46 and define their tile configuration. The frame memory is divided into tiles made up of 256 bytes by 256 lines (64K bytes). The frames preferably always start and end at a tile boundary and frames not ended in a tile boundary are padded to a tile boundary in both x and y directions. For the frame starting address, only the upper 16 bits of the address are needed since the lower 16 bits are always zeros. The physical frame starting address are the defined by the bit 31 to 16 field, which is concatenated with 16 bits of zeros.

These four frame starting addresses are reference by the two bits frame ID in graphics and display DMA, as well as the window cache DMA. Frame ID 0x0 references to frame 0, while frame ID 0x1 references to frame 1, etc.

Based on the frame resolution and color depth of the frame buffer, there are different numbers of tiles in the horizontal and vertical direction. Xtile is number of tiles in x direction and Ytile is number of tiles in y direction. Since there are 256 pixels per line for 8 bits per pixel in a tile and there are 128 pixels per line for 16 bits per pixel in a tile, the value of x tile should be programmed according to the color depth of the frame buffer. The algorithm to calculate the tile parameters are:

Xtile (8 bits/pixel)=Xwidth/256+(mod(Xwidth/256)!=0);

Xtile (16 bits/pixel)=Xwidth/128+(mod(Xwidth/128)!= 0);

Ytile =Yheight/256+(mod (Yheight/256)!=0).

The most common frame resolution number are shown in FIG. 28.

4.2.7 Display DMA Control Register (Addr +0x280).

FIG. 29 defines each bit of the display DMA control register. This register provides software control over display DMA 278 in memory controller 14.

Bit 0 should be set 1 when processor 12 completes drawing one frame and it is ready to be displayed. Display DMA 278 checks this bit before swapping the pointer to this frame for display. If this bit is not set, the previous frame will be displayed again.

Bit 1 specifies which frame buffer will be displayed next.

4.2.8 Display DMA ID Register (Addr +0x288)

FIG. 30 defines each bit of the display DMA ID register. This register defines which frame buffers are accessed for display. There are up to four frame buffers from which to choose. The starting addresses of the frame buffer are specified in the Frame starting Tile Addresses and Tile configuration Register (Addr +0x100, +0x108, +0x110, +0x118). Therefore, only a two-bit frame ID is needed to choose a frame buffer. In other words, this register defines ID pointers to point to the frame starting addresses.

The system supports up to two display pipelines, primary and secondary. Therefore, there are two display buffers and two DMA controllers. Each display buffer can specify two frame buffers as the source for display. The display DMA switches between the two frames (0 and 1) at vertical sync for a ping-pong buffer. If the two frames contain same ID, it is in effect a single buffer mode instead of ping-pong buffer.

4.2.9 Display Starting Offset Register (Addr +0x380, +0x3a0)

FIG. 31 defines each bit of the display starting offset register. This register defines the display starting offset at any screen location, and display screen size register in the next section defines the size of the display. Together, any region of the frame buffer can be displayed.

4.2.10 Display screen Size Register (Addr +0x390, +0x3b0)

FIG. 32 defines each bit of the display screen size register. This register and the display starting offset register specify any screen location and area of the frame buffer to display. This register can be programmed different from the frame buffer size which is defined in the Frame Configuration Register (Addr +0x020).

4.2.11 Dither LUT Register (Addr +0x140–+0x178)

FIG. 33 defines each bit of the dither LUT register which stores look up tables for dither logic.

y[1:0]=00, x[1]=0 Addr +0x040;
y[1:0]=00, x[1]=1 Addr +0x048;
y[1:0]=01, x[1]=0 Addr +0x050;
y[1:0]=01, x[1]=1 Addr +0x058;
y[1:0]=10, x[1]=0 Addr +0x01060;
y[1:0]=10, x[1]=1 Addr +0x068;
y[1:0]=11, x[1]=0 Addr +0x070;
y[1:0]=11, x[1]=1 Addr +0x1078;

4.2.12 Window cache address space (Addr +0x400–+0x7ff)

This address space defines a 128×64 local window cache in memory controller 14 that can cache pixel data from frame buffers or data from linear memory. Processor 12 can access every byte in the window cache through this address space. To calculate the address in the window cache, processor 12 should be aware of the doubleword nature of the window cache and calculate the address accordingly.

FIG. 34 is a diagram illustrating how pixel data from the frame buffer, which is maintained in external memory 46, is cached in the window cache, which is maintained in the register space of memory controller 14. An area of the frame buffer is shown at 350. The area shown includes three columns 352, 353 and 354 and twelve rows of pixel data. Frame buffer 350 has a base address 355 in the upper left corner of the frame buffer. Each column 352, 353 and 354 is four bytes (i.e. a doubleword) wide. In this example, display DMA 278 specifies a window 356 within frame buffer 350. The size of window 356 is seven pixels wide in an "x direction" shown by arrow 357 by seven lines high in a y direction shown by arrow 358. There are eight bits per pixel. The starting address "SA" of window 356 is the fourth byte of the doubleword in the third row of column 352.

A portion of the window cache 360 is shown to the right of frame buffer 350. Window cache 360 has a plurality of doubleword entries, such as 362A, 362B, 362C and 362D. Block 364 shows the area of frame buffer 350 that is cached in window cache 360. The first doubleword of the upper left corner of block 364 is cached in the first doubleword entry 362A of window cache 360. The next doubleword in x direction 357 of block 364 is cached in the second doubleword entry 362B. The third doubleword in x direction 357 is cached in entry 362C. When the last doubleword in x direction 357 is cached, the first doubleword of the next line of block 364 in y direction 358 is cached. For example, the first doubleword of the second line of block 364 is cached in entry 362D. This pattern repeats for the entire block 364.

The following algorithm is used to locate a pixel in window cache 360. The starting address SA of window 356 is specified as an xoffset value and yoffset value from frame base address 355. Xwidth is the number of pixels of window 356. Yheight is number of lines of window 356. Xwidth dw is the number of doublewords in each line in window cache 360.

Xwidth_DW=(SA[2:0]+xwidth)/8
(+1 if mod (SA[2:0]+xwidth)/8>0)

For a pixel in the window, which has xpixel and y pixel offset from frame base address 355, the offset of this pixel from the upper left corner of the window is xdelta an ydelta, where xdelta and y delta can be calculated as follows:

xdelta=xpixel−(xoffset/8)*8
ydelta=ypixel−yoffset

The address of the pixel in the window cache is:
cache base address +(ydelta*xwidth_dw+xdelta)

If the window cache is uses four individual segments, the pixel address in the window is:
cache base address+segment offset+(ydelta*xwidth_dw+xdelta)

4.2.13 Window starting address register (Addr +0x300, +0x320, +0x340, +0x360)

FIG. 35 defines each bit of the window starting address register. This register, and the corresponding window size register (discussed below) provide "window dma engines" that can transfer a region of the frame buffer in external memory 46 to and from the local window cache 360. In one embodiment, there are four frame buffers maintained in external memory 46 and four DMA engines which can be specified to load or flush window cache 360. The DMA control can be dynamically tied to any segment of window cache 360 during a load and flush command (see the control bit in the load window cache and flush window cache registers for more details).

The region of memory can be either in the tiled frame buffer or can be in linear memory. Processor 12 can load window cache 360 from external memory 46 by writing to the load window cache register (discussed below). Processor 12 can flush the contents of window cache 360 to external memory 46 by writing to the flush window cache register (discussed below).

The addresses defined in these registers are either interpreted as a physical memory location or as a frame ID and the starting pixel offset position with respect to the frame origin. The frame ID selects which frame buffer to access and starting pixel's x and y position offset from the frame origin address. The interpretation is controlled by the tile access bit in the load and flush window cache registers.

With this starting address and the window size defined in next section, processor 12 can set up four DMA operations to manage window cache 360.

Window cache 360 is maintained in doubleword boundaries. For loading window cache 360, the bytes to the left and right to the doubleword boundary outside the specified region are also cached. For flushing window cache 360, a byte mask is enabled and only the region specified is overwritten.

When the opaque mode in the flush window cache register is enabled, only the bytes that are touched (or dirty) in window cache 360 are written out to external memory 46 during a flush operation.

4.2.14 Window size register (Addr +0x310, +0x330, +0x350, +0x370)

FIG. 36 defines each bit of the window size register. This register defines number of bytes to load or flush to window cache 360. Depending on the tile mode bit in flush and load window cache register, these size registers are either pixel width and height or the byte count.

When the size specified in this register is larger than the flush size specified in the load and flush window cache registers, the loading and flushing stop at flush size and the remaining size and the next address is "state-saved" in the status registers. Subsequent load and flush commands continue with the state-saved information until the remaining size is smaller than the flush size and the DMA stops at the DMA specified size.

4.2.15 Load window cache register (Addr +0x200)

FIG. 37 defines each bit of the load window cache register. When processor 12 writes to this register, the write initiates a DMA request in memory controller 14 which copies data from external memory 46 to window cache 360. The source of the memory to read from are specified by a window dma pointer formed by bits 7:6, which reference the window starting address and size registers. The destination at which the data will be load in window cache 360 is specified by a starting segment field (bits 3:0) and a segment count field (bits 5:4).

Bit 8 is a start new dma bit which enables the loading to start as a new dma which uses the starting address and size registers. If bit 8 is not enabled, the dma continues with the remaining of the previous load. Bit 9 specifies whether the starting address and size are interpreted as a tiled frame buffer load or a linear address memory load.

Bit 10 enables and disables a processor interrupt. If enabled, processor 12 will be interrupted when the loading of all segments is completed. Bit 15 contains a status bit indicating whether the loading DMA is still in progress. This bit can be polled for status if an interrupt is not desirable.

4.2.16 Flush window cache register (Addr +0x208)

FIG. 38 defines each bit of the flush window cache register. A processor write to this register initiates a dma request in memory controller 14 which flushes data from window cache 360 to memory 46. The destination within memory 46 is specified in a window dma pointer defined by bits 7:6 of this register, which indirectly reference the window starting address and size registers. The starting segment and the number of segments to flush are specified by bits 3:0 and bits 5:5, respectively.

Bit 8 is a start new dma enable bit which enables the flushing to start as a new dma that uses the window starting address and window size registers. If it is not enabled, the dma continues to flush the remaining data from the previous flush. Bit 9 specifies whether the window starting address and window size are interpreted for a tiled frame buffer load or a linear address memory load.

Bit 11 enables an opaque mode in which only bytes that have been touched (or dirty) by processor 12 are overwritten in memory 46. Those bytes that have not been touched will be written from the frame buffer.

Bit 10 enables an interrupt so that when the flushing is completed, processor 12 will be interrupted. Bit 15 contains a status bit indicating whether the flushing DMA is still in progress. This bit can be polled for status if an interrupt is not desirable.

4.2.17 Window cache status registers (Addr +0x3c0, +0x3c8, +0x4c0, +0x4c8)

There are four window cache status registers. FIG. 39 defines each bit of one window cache status register, which includes a processor ID field and a mode field. These registers are extra local registers that processor 12 can use for window cache management. Each register can be associated with a cache area in window cache 360. These registers can also be used for information other than processor ID and mode.

4.2.18 Packer data register (Addr +0x220)

FIG. 40 defines the packer data register. This register combines with a packer starting address register and a packer size register, which are defined in next two sections, to provide processor 12 with a way to access window cache 360 without calculating the addresses for every pixel. The packer can help pack data in a rectangular object region in the window cache.

After the starting packer location and its size is programmed, every write to this register packs a pixel of data into the rectangular object region of the window cache specified by the packer starting address register and the packer data size register.

Every read from this register will read one pixel at a time from the specified rectangular region from the window cache. However, since there is only one packer address calculation logic, both write and read advance the pixel address. The packer can only be used for either writing to or reading from a rectangular region in window cache, but not both.

4.2.19 Packer data starting address resister (Addr +0x210)

FIG. 41 defines each bit of the packer starting address register. This register defines the starting address of the rectangular object region in the window cache that processor 12 wants to access. The starting address specified by bits 9:0 is the offset from the window cache starting address SA as described with reference to FIG. 34 for the "Window cache address space Addr +0x400–+0x7ff)". The subsequent pixel addresses are calculated.

Bits 15:10 specify xwidth_dw, which is the number of doublewords in the x direction. This field should be programmed the same as what is described with reference to FIG. 34. This field is essential to calculation object's y advancement. This field has to match what is cached in this region of the window cache.

Bits 17:16 specify the color depth as either 8 bits or 16 bits per pixel. The color depth should match what was cached.

4.2.20 Packer data size register (Addr +0x218) FIG. 42 defines each bit of the packer data size register. This register define the size of the rectangular object in the window cache that processor 12 want to access. The size of the rectangular object can exceed outside what is cached in the segment of the window cache.

4.2.21 Display current address registers (Addr +0x388, +0x3a8)

FIG. 43 defines each bit of the display current address registers. These registers contain next address for the display dma's and store the intermediate state of the display which can be read for diagnosis.

4.2.22 Display remain size registers (Addr (+0x398, +0x3a8)

FIG. 44 defines each bit of the display remain size registers. These registers keep remaining size for the display dma's. These registers store the intermediate state of display and can be read for diagnosis.

4.2.23 Window current address registers (Addr +0x308, +0x328, +0x348, +0x368)

FIG. 45 defines each bit of the window current address register. These registers contain next address for the pixel dma's. These registers store the intermediate state of the window dma's and can be read for diagnosis.

4.2.24 Window remain registers (Addr +0x318, +0x338, +0x358, +0x378)

FIG. 46 defines each bit of the window remain registers. These registers keep the remaining size for the pixel dma's. These register store the intermediate state of the window dma and can be read for diagnosis.

4.3 Memory Configuration

Integrated circuit 10 supports x8 and x16, 16 Mbit and 64 Mbit SDRAM devices for external memory 46, for example. The external memory data bus 22 is 64-bits wide. All 64 bits are connected regardless of which SDRAM device is used. It takes 8 devices to make one bank using a x8 memory and 4 devices for a x16 memory. For two banks, it takes 16 devices for x8 and 8 devices for a x16 memory. The x4 devices are not supported in the embodiment shown due to excessive capacitive loading on the memory signals.

The configuration of external memory 46 and the tiling and window cache mechanisms supported by memory controller 14 are described in more detail in U.S. Provisional Application Serial No. 60/061,489, which has been incorporated by reference.

4.4 Command Bus Transactions

The internal command bus 24 is used for processor PIO read/write and DMA request header transfers. The priority for accessing command bus 24 is as follows: (1) PIO read or cache line fill response; (2) PIO read/write request; and (3) Round-robin among all DMA requests.

4.4.1 PIO Read Response

FIG. 47 is a waveform diagram illustrating PIO read response timing. The PIO read response consists of a read response header 600 and one data word 602 over command bus 24, labeled "CMD". Transfer over command bus 24 is controlled by cmd_gnt. The read response command has the highest priority on command bus 24 so that processor 12 can resume its process.

4.4.2 Cache Line Fill Response

FIG. 48 is a waveform diagram illustrating PIO cache line fill response timing. The cache line fill response consists of a cache line fill response header and 604 four data words 606 over command bus 24 ("CMD"). Transfer over command bus 24 is controlled by cmd_gnt. Response commands have the highest priority on command bus so that processor 12 can resume its process.

4.4.3 PIO Write

FIG. 49 is a waveform diagram illustrating PIO write timing. A PIO write consists of a single write header 608 and the write data 610. Transfer on command bus 24 ("CMD") is controlled by the cmd_ld signal. Each PIO write is be acknowledged by cmd_pwa to indicate write completion. Up to two outstanding PIO writes are allowed in the system, according to one embodiment. The third PIO write has to wait if there are more than two PIO writes pending.

4.4.4 PIO Read

FIG. 50 is a waveform diagram illustrating PIO read timing. A PIO read consists of only a read header command 612 which is controlled by the cmd_ld signal. The PIO read command 612 sends read requests to subsystems and expects a PIO read response or a cache line fill response some time later. In the interim, the processor stalls waiting for the response. There can only be one PIO read command pending in the system. FIG. 6.15 PIO read timing

4.4.6 DMA Reauests

FIG. 51 is a waveform diagram illustrating DMA request timing. Each DMA request from subsystems 126A–126C (shown in FIG. 4) consists of one header 614 which is controlled by cmd_gnt. The DMA requests are arbitrated round-robin among the three subsystems 126A–126C. There can only be one DMA request pending for each subsystem, for example.

4.5 Memory Arbitration

The arbitration scheme implemented in memory controller 14 is adapted to minimize the effect of bandwidth consumed display subsystem 126C in a unified memory architecture. Large bursts for display data affect memory latency to processor 12. One solution could be to use smaller burst sizes to transfer display data, but this approach limits efficiency of data bus 22 and available transactions.

The integrated circuit 10 implements an "adaptive memory arbitration" scheme to address system latency and bandwidth issues. With this scheme, display data is transferred at the highest rate when necessary or when not impeding memory access by processor 12. During non-critical times, when a display queue in DPRAM 122C (shown in FIGS. 4 and 18) for graphics and display subsystem 126C has sufficient display data (when a low watermark signal DISP_LOW[1:0] is inactive), processor 12 is allowed to preempt a display DMA transfer from external memory 46 to subsystem 126C to minimize processor latency to memory 46. At other times (when low watermark signal DISP_LOW[1:0] is active), display data is transferred to the display queue in DPRAM 122C using the largest possible burst size. This allows a more uniform distribution of processor and display latencies, maximizing throughput and limiting transactions, thereby improving overall system performance.

Request for access to memory 46 are received by memory controller 14 from five sources: processor 12, display DMA engine 278 in memory controller 14, graphics and display subsystem 126C, parallel subsystem 126B and serial subsystem 126A.

The priority for accessing memory 46 is as follows:

1. Display DMA 278 when the display queue watermark is low (DISP_LOW[1:0] is active). This transfer is a burst of 32 memory locations and cannot be preempted by processor 12.

2. CPU memory read/write accesses. The transfer size is either one (non-cached) or four (cached) memory words. The CPU memory accesses can preempt display DMA 278 when the display queue watermark DISP_LOW[1:0] is inactive.

3. Round-robin among all other DMA requests. The order of the round-robin is window cache, graphics subsystem 126C, parallel subsystem 126B, and then serial subsystem 126A. Burst sizes are from 1 to 16 doublewords and cannot be preempted.

4. Display DMA 278 when watermark is high This transfer attempts a burst of 32 memory locations but can be preempted by processor 12. The display DMA 278 will resume only when another burst of 32 is possible.

4.6 Processor BIU 26–SCBus 26

The Processor bus interface unit 276 (shown in FIG. 18) within memory controller 14 provides SCBus control signals to respond to processor accesses. This interface supports single, doubleword access with byte enables, and In-Page write and burst accesses up to four doublewords.

The processor bus (SCBus) 26, shown in FIGS. 1 and 17, has only one master, the processor 12 (e.g. the CW4011), and one slave, the processor interface unit 276 in memory controller 14. The signals in the CW4011 core that are used for SCBus arbitration are not used. These output signals from the CW4011 are ignored and the input signals to CW4011 are tied inactive.

4.7 Display DMA Controller 278

In order to have long bursts for the display as well as low latency for processor accesses, the display DMA controller logic 278 is within the memory controller whereas the display logic and display buffer is in graphics/display subsystem 126C. A display DMA transfer can be preempted by a memory access by processor 12 access when the display watermark is high. When a processor memory access is complete, display DMA 278 attempts another burst of 32 memory location when there is room in its internal buffer.

There are two display DMA controllers, serving two display buffers. Each display buffer, or queue, is equipped with horizontal and vertical counters and hand shake signals. The counters for both display DMA controllers are reset by the framend signal, which is synchronized with vertical sync signal from display engine. Up to two frames can be specified as the source for each display DMA. When the two frames are different, the display DMA ping-pongs between frames and switches at vertical sync.

The ping-pong frame buffers work as follows. Processor 12 "draws" one frame while the display engine retrieves and display the other frame. When processor 12 finishes drawing on a frame, Bit 0 ("read to swap") in the display dma control register should be set. When display dma 278 has transferred out all display data in a frame and is ready to display another frame, the display dma controller checks the "read to swap" bit before swapping to the other frame. If this bit is set, the dma display controller points to the other frame and starts displaying the newly drawn frame. If this bit is not set, the dma display will not point to the other frame and the same frame being displayed is displayed again.

The display screen size differ from the frame size specified in the frame configuration register. The display x and y offset and size registers allow the display region to be configured to start and end at any pixel in the frame buffer.

4.8 Memory Map

The memory map for memory 46 is shown in FIG. 3. Memory controller 14 check the processor address against the memory map to determine whether it is a PIO or memory access. Also for memory with aliases, such as system memory and PCI memory, the address 0x4000,0000 is aliased to 0x0000,0000, system memory, and the address 0x2000,0000 is aliased to 0x0800,0000, PCI memory. EPROM/Flash memory map to either serial or parallel subsystems 126A and 126B based on the boot device bit programmed in the system configuration register described above.

For memory accesses, the address is checked to determine whether it is a frame buffer access. For frame buffer accesses, the address is mapped according to a frame buffer tiling scheme.

5. Graphics and Display Subsystem 126C

In one embodiment of the present invention, subsystem 126C has the following hardware features:

1. 8 logical BitBLT channels facilitating a multi-tasking environment;
2. 5 BitBLT functions are supported for each logical channel such as linear/screen BitBLT, color expansion & linear/screen fills;
3. Support for two display data streams, primary and overlay;
4. Pixel depths of 8 or 15 bits;
5. Look-Up-Tables for 8 bit pseudo color and 15 bit RGB visuals into 24 bit color palette;
6. loading cursor ram through DMA;
7. 3 colors+transparent hardware cursor support for 32×32 cursor;
8. 7 bit overlay plane with alpha blending support;
9. Three 256×10 Gamma Look-Up-Tables;
10. Supports single scan active matrix Flat Panel display device;
11. 18 bit LCD display with temporal dithering support;
12. Color Index intensity pixel format supported for Image processing;
13. Supports all non-interlace VESA DMT Ver1.0,Rev0.7 standard monitors (from 640×480@60 HZ to 1024× 768@85 Hz);
14. DPRAM 122C (288∴64) as an interface to system bus 22 which serves as the synchronization media and temporary buffer for BitBLT operations;
15. On chip triple 10 bit Video DAC; and
16. Programmable frequency generation PLL (N/M) for pixel clock up to 100 Mhz.

5.1 Subsystem Interface

There are a couple of dedicated signals added between the display portion of subsystem 126C and memory controller 14. These signals are used for controlling the flow of the display data path. Also, the graphics portion of subsystem 126C has a custom type of command header to handle screen based tiled addressing DMA, as described later in this section.

5.1.1 Subsystem Interface Signals

FIG. 52 is a diagram illustrating the interface signals to and from subsystem 126C. These signals are defined below.

CLK is a System Bus Clock input. This is the system clock.

DATA[63:0] is the 64-bit bi-directional, tri-state data bus 22 (e.g. shown in FIG. 1) for transferring data to and from memory 46.

CMD[63:0] is the 64-bit bi-directional command bus 24 (e.g. shown in FIG. 1) for communicating command headers and PIOs to and from processor 12.

DATA_LD is a Data Load input, which loads the data bus contents into DPRAM 122C. Whenever this signal is asserted, data will be valid on data bus 22 on the following clock. This signal is used for DMA data transfer to and from memory 46.

DISP_LD1 is a Load secondary Display data input. Thus signal is asserted to indicate the data on the data bus 22 is for video display and hence will be put into a Secondary Display data Queue in DPRAM 122C. DATA_LD will be "don't care" when this signal asserted.

DISP_LD0 is a Load primary Display Data input. This signal is asserted to indicate the data on data bus 22 is for video display and hence will be put into a Primary Display data Queue in DPRAM 122C. DATA_LD will be don't care when this signal asserted. FIG. 53 is a table indicating the DISP_LD[1:0] signal format.

CMD_LD is a Load Command Bus Data input. This signal is asserted by memory controller 14 when processor 12 is requesting a command transfer to the peripheral block indicating that a valid command header will be present on command bus 24 on the following clock.

DATA_GNT is a Data Grant input which is asserted by memory controller 14 to a peripheral block indicating that its BIU should drive data onto data bus 22 on the following clock.

CMD_GNT is a Command Grant input which is asserted by memory controller 14 to indicate that BIU 120C is granted command bus 24 for header message transfer.

CMD_PWA is a PIO Write Acknowledge output which is asserted by BIU 120C to indicate to memory controller 14 that a PIO write has been completed.

CMD_REQ [1:0] is a Command Request output which is asserted by BIU 120C to memory controller 14 when a command header needs to be sent.

DATA_EOT is a Data End of transfer input which is asserted by memory controller 14 on the last DMA data.

DATA_ERR is a Data Error input which is asserted by memory controller 14 together with DATA_LD or DATA_GNT indicating an error has occurs for that transfer and the transfer has therefore terminated.

DISP_REQ [1:0] is a Display stream data Request output which is asserted by BIU 120C to memory controller 14 to indicate that the corresponding display queue in DPRAM 122C has room for 32 or more entries of data (bit 0 for the primary display queue primary and bit 1 for the secondary display queue).

DISP_LOW[1:0] is a Display Stream Low Watermark output which indicates to memory controller 14 that the primary or secondary display queue is under its low watermark and needs data as soon as possible.

FRAMEND is an End of Frame output which is an active high pulse that is one system clock wide. This pulse is generated for memory controller 14 to indicate that a display end of frame is happening. It is used to load any double buffered register or reset/reload counters for display related parameters that can only be done during a vertical retrace time.

RESET_n is an active low reset input used for a global chip reset.

DCLK is a Display Reference clock input. This is the reference clock to the internal PLL which will generate the pixel clock for the video timing.

FPSHIFT is a Flat Panel data shift output which is provided to a Flat Panel display Pixel clock.

FPFRAME is a Flat Panel frame pulse output provided to a Flat panel link chip.

FPLINE is a Flat Panel line pulse output provided to a Flat panel link chip.

DRDY is a Flat Panel Data Ready output provided to a Flat panel link chip.

VSYNC is a Vertical Sync output which is provided to a CRT.

HSYNC is a Horizontal Sync output which is provided to the CRT.

BLANK is a Video Blank output which is provided to the CRT.

ROUT[5:0] is a Red display color output for a flat panel LCD.

GOUT[5:0] is a Green display color output for the flat panel LCD.

BOUT[5:0] is a Blue display color output for the flat panel LCD.

PCLK is a Pixel clock output. This is the core operating clock for the display and graphic subsystem 126C.

5.1.2 Command Header for DMA request

To maintain a simple interface between graphics and display subsystem 126C and memory controller 14, each DMA operation has either one of the following properties:
1. The DMA involves a one dimensional context, such as a horizontal or vertical line in the screen (tile) address space. All linear memory based DMAs are a subset of this; and
2. The DMA involves a two dimensional screen context using a tile based address. The context is a rectangle block with more than one lines of the same width.

Since subsystem 126C performs tile based DMA operations, it uses a special Command Header.

5.1.2.1 Special Screen Block Command Header

FIG. 54 is a diagram of a specialized DMA command header which is be used for Screen relative addressing direct memory accesses (DMAs). It has CMD type "000". This header is issued whenever address translation for screen coordinate to physical memory locations must be performed by memory controller 14. The Special Screen Block Command has the following bit definitions:

Xstart, bits [11–0], define the X offset within a tile for the starting pixel (in pixels).

Ystart, bits [23–12], define the Y offset within a tile for the starting pixel (in pixels/scan lines).

FrameID, bits [25–24], define the frame buffer ID, e.g. the front or back overlay plane.

Height, bits [30–26], define the number of lines (5 bits). All zeros represents 32 lines.

BSize, bits [37–32], define the burst cycles per line. All zeros represents zero burst cycles per line.

RAMADR, bits [46–38], define the starting DPRAM address, and is used by the subsystem.

Extraperin, bit [47], requests an extra bus cycle per line to allow time to flush the pipe into the buffer.

BSteer, bits [51–48], is used for byte steering by the subsystem on reads.

Width, bits [59–52], defines the number of pixels per line. All zeros represents 256.

CMD, bits [62–60], is "000" for this special header type.

ERROR, bit [63] is always "0" for compatibility with other command headers.

5.2 Software Interface

The Graphics and Display subsystem 126C registers begin at address is 10300000/h in memory 46, as shown in FIG. 3. These registers are defined in more detail in U.S. Provisional Application Serial No. 60/061,489, which has been incorporated by reference.

5.4 Functional Description

FIG. 55 is a block diagram of Graphics/Display subsystem 126C. Subsystem 126C is connected to data bus 22 and command bus 24 bus through a common interface, Bus Interface Unit (BIU) 120C which runs the CPU clock. BIU 120C is responsible for generating all the handshake signals between the subsystem and memory controller 14. It also controls and arbitrates for the system side of the DPRAM 122C. DPRAM 120C serves multiple purposes. It is a FIFO, a queue, and a synchronization buffer which bridges the data between the two asynchronous clock domains. Subsystem Interface Unit (SIU) 124C is the DPRAM interface on the subsystem side and runs at the pixel clock rate.

A graphics BitBLT engine 700 is coupled to BIU 120C and runs synchronously with the system clock so graphic performance will not be affected by the display clock frequency. Subsystem 126C includes a display engine 702 on the SIU side of the subsystem. Display engine 702 has its own PLL and runs asynchronously with the rest of the system.

5.4.1 DPRAM 122C

FIG. 56 is a diagram illustrating the logical partition of DPRAM 122C in graphics/display subsystem 126C. DPRAM 122C is a 288 entry 64-bit wide RAM partitioned into 6 sections, 704A–704F.

Primary Display Queue 704A is made up of 96 entries of the DPRAM and is used for displaying the primary color plane. This queue will request filling as long as it has at least 32 empty entries.

Secondary Display Queue 704D is 64 entries deep and is used for displaying an 8-bit secondary (overlay) plane data. Memory controller 14 will push display data into the primary and secondary display queues based on two sets of thresholds (watermarks) which indicate the need for data in the display pipeline.

Bitmap Pattern Buffer 704E has 32 entries to store a bitmap pattern to be blitted into the frame buffer. The total size of the buffer will be able to hold a pattern block of up to 2K pixels without skipping bytes and padding bits in all of the entries.

BitBLT Data Buffer 704B is used as a scratch data area for all copy operations. All copying BLT will be done in two passes. The first pass is to read the source context from memory 46 and put it in this BitBLT data buffer area. Byte steering will be performed on the way in to this buffer. The second pass will put the buffered context into the designated memory location.

PIO Queue 704C stores incoming PIO requests from processor 12 to display subsystem 126C.

CURSOR Ram 704F has 32 entries. Putting the cursor ram into DPRAM 122C allows the cursor pattern to be direct-memory accessed by the subsystem without increasing the data path and while reducing the total number of RAM counts.

5.4.2 Bus Interface Unit (BIU)

FIG. 57 is a simplified block diagram which illustrates the data path through BIU 120C. BIU 120C in graphics/display subsystem 126C, unlike other subsystems, has some specific requirements and therefore, does use the generic BIU common to all other subsystems. This customized version of the BIU includes the following functions:

1. Initiates and sets up DMA for BitBLTs;
2. Communicates with DPRAM 122C and Graphic Bitblt Engine 700 in a tightly coupled way;
3. Dispatches in-coming command/data to the proper partitions of DPRAM 122C or the graphic subsection.
4. Performs byte Steering of data for BitBLT operations on the way into the BitBLT Data Buffer 704B.
5. Has individual address pointers and flow control logic for each logical partition (total 6 of logical partitions) on the BIU side of DPRAM 122C.
6. Monitors display queues and requests display data from memory controller 14 as needed and handles display queue under-run conditions.

5.4.2.1 Display Oueue Under-run

When BIU 120C detects a display queue under-run, it will force the corresponding DISP_REQ signal, shown in FIG. 52, to an inactive state until a vertical sync happens. It will then reset the queue and resume requesting data for the next frame. Meanwhile, memory controller 14 will not send any more data for that frame as DISP_REQ will not be asserted. The FRAMEND signal will reset all the related counters in the memory controller. When memory controller 14 detects that DISP_REQ is active again, memory controller 14 will start sending display data over data bus 22 for the new frame. This display data is routed to data input Din of DPRAM 122C.

5.4.3 Subsystem Interface Unit (SIU)

FIG. 58 is a simplified block diagram of subsystem interface unit (SIU) 124C. The SIU in the graphics/display subsystem 126C is small because it only communicates with the display subsystem, and most of most of the traffic is unidirectional. DPRAM interface logic block 750 is responsible for controlling read/write accesses to the display subsystem. SIU also includes a DPRAM arbiter 752 and a PIO responder (not shown in FIG. 58).

5.4.3.1 DPRAM Arbiter 752

Arbiter 752 arbitrates DPRAM access requests from three different sources within the subsystem.

The display subsection requests display data from the Display Data queue(s) 704A and 704D in a regularly fashion and has to have the highest priority. PIO decoder 754 reads PIO commands from PIO Queue 704C and generates a read/write strobe for all registers in the display subsystem. A cursor control unit in the subsystem will occasionally request a cursor pattern from cursor ram 704F, which is inside DPRAM 122C, one word at a time.

5.4.3.2 PIO Responder

A PIO responder (not shown in FIG. 58) is responsible for clearing the PIO queue 704C. It decodes addresses and dispatches PIO operations to the proper subsection. A read ready signal will be generated and sent back to BIU 120C to acknowledge the read while data will be sent directly back to the BIU.

5.4.4 Display Subsystem

The display subsystem is logically divided into two functional blocks—one is for display timing generation and the other is the pixel pipe. A block diagram of the pixel pipe section 760 is shown in FIG. 59. The Display Timing block is responsible for generating all necessary timing signals to drive a display device and also control the flow of the pixel pipe. The Pixel pipe is responsible for controlling the content of each and every pixel to be seen on the display device.

Integrated circuit 10 is capable of handling two display data streams. The overall memory bandwidth is enhanced by a conditional preemptive bursting scheme to feed display data to pixel pipe 760 of the display subsystem. There are two water level indicators for each display queue 704A and 704B (FIG. 56). When the display queue is below its high watermark, there is room for more display data, and the display subsystem sends a request for more data diretly to memory controller 14. Memory 46 will then start bursting display data to fill the display queue. The transfer, however, may be preempted in the middle of a burst if processor 12 is requesting access to memory 46 during that time. When a display data queue is below its low watermark, it is an urgent situation and memory controller 14 has to respond as soon as possible. The display data burst in this case cannot be preempted to avoid having a display queue under-run. If the display data queue runs dry due to some unusual situation or, if the low watermark level is not set properly, the display engine will use the last display contents throughout the end of the current frame. At the same time an interrupt will be generated if "UNDERUN_INT" is set in a DISPCTRL register. The display will start a fresh new buffer at the beginning of the next frame.

5.4.5 Graphics Subsystem

FIG. 60 is a block diagram of a graphics BitBLT data flow through graphics subsystem 770. The main feature in the graphics subsystem is BitBLT engine 700. BitBLT engine 700 is capable of blitting in either linear address space or in tiled address space due to the tile based frame buffer architecture implemented by memory controller 14. Due to the unified memory architecture of this chip, the frame buffer is connected directly to memory controller 14. All direct rendering and pixel processing by processor 12 is handled in memory controller 14 and not in graphics subsystem 770.

There are 8 logical BitBLT channels 772 in the graphics subsystem available for the software to program. These channels arbitrate for a single hardware BitBLT engine 700 in a round robin fashion. This allows the system to be able to allocate resources for multiple tasks at the same time on a shared device. This is extremely useful in multi-tasking system environments. Each channel has its own register set and can be independently programmed into different functional modes. The BitBlt engine supports the following modes: Screen Block Copy—(BLT_MODE="000"); Linear Memory Copy—(BLT_MODE "001"); Bitmap Blit—(BLT_MODE="010" block based or "011" line based); Block Line Fill—(BLT_MODE="100"); Linear Memory Fill—(BLT_MODE="101"); Load DPRAM—(BLT_MODE="110"); and Dump DPRAM—(BLT_MODE="111").

5.4.6 Video DAC

Graphics and display subsystem 126C has an on-chip triple 10-bit video digital-to-analog converter (VDAC) which is designed for RGB systems with EIA RS-343A compliant video input.

5.4.7 Pixel Clock Frequency Synthesizing PLL

The pixel clock PLL is be used to synthesize the clock to the desired frequency for various resolutions and display medium requirements using an analog PLL core.

Graphics and display subsystem 126C is described in more detail in U.S. Provisional Application Serial No. 60/061,489, which has been incorporated by reference.

6. PCI and Parallel Interface Subsection 126B

Subsystem 126B is connected to the internal system data and command buses 22 and 24 via Dual Port Ram (DPRAM) 122B (Shown in FIG. 4). In conjunction with DPRAM 122B, a DMA controller in subsystem 126B is responsible for transferring I/O data between external devices and system memory 46.

Subsystem 126B preferably has the following features: a Dual Port RAM interface to system buses 22 and 24, a High performance PCI interface; an IEEE 1284 Parallel Port; IDE/ATA-PI Disk interface; Provisions for Flash ROM and PCMCIA adapters; PS2 compatible keyboard and mouse inputs; I2C interfaces; and a Smart Card interface.

The PCI preferably has the following functions and specifications, for example: Host or Peripheral mode; 32 bit; 33 MHz, 5/3.3 volts; 66 MHz, 3.3 volt; PCI 2.1 compliant; as a host, directly supports two additional PCI masters (bus request, bus grant and interrupt input); Configuration registers may be loaded with OEM specific information via the local CPU or by an external serial PROM; Local CPU boot control allows host to download CPU code for execution; Provides both direct and endian swapped address ranges; Mailbox interface for multiprocessor communication; Mailbox registers optimized for fast reads for both PCI masters and the local CPU; DMA controller which will provide local to PCI memory data transfers at high speed; Read Look ahead and line caching for improved target response; Read Line Multiple capability for improved performance as a master; and Address mapping to convert between local address space and PCI address space.

The IEEE 1284 preferably has the following functions: Host and Peripheral Modes; Compatibility Mode; Nibble Mode; and EPP (Enhanced Parallel Port) & ECC (Extended Capabilities Port) modes supported.

ATA-PI/Flash ROM/PCMCIA preferably have the following functions: Direct support of IDE/ATA-PI compatible disk drives; Provisions for addressing Flash ROM (executable); Provisions for interfacing to PCMCIA bridges; ATA-2 standard (ANSI X3.279-1996); PCMCIA PC Card Standard Release 2.1.

The I2C Interface preferably has hardware byte to serial conversion.

Detailed descriptions of the parallel interfaces can be found in the following documents: IEEE Standard Signaling Method for a Bidirectional Parallel Peripheral Interface for Personal Computers (ANSI); PCI Local Bus Specification, revision 2.1; ATA-2 standard (ANSI X3.279-1996); and PCMCIA PC Card Standard Release 2.1.

PCI and parallel subsystem 126B is described in more detail in U.S. Provisional Application Serial No. 60/061,489, which has been incorporated by reference.

7. Serial Interface Subsystem 126A

FIG. 61 is a block diagram of serial subsystem 126A. Serial subsystem 126A includes a fast-ethernet 10/100 peripheral 800, a four port universal serial bus host controller peripheral 802, an audio-97 AC-link audio peripheral 804, and a set of generic programmed i/o pins 806.

To expedite and simplify implementation of the large number and various styles of DMA channels in the subsystem, a simple microcontroller 808 has been used to provide all DMA functions. Microcontroller 808 implements the DMA message passing in firmware that would normally be cast in hardwired logic. Microcontroller 808 does not pump DMA data. It is only responsible for creating the read and write messages used to move the data to and from system main memory 46.

Serial Subsystem 126A is described in more detail in U.S. Provisional Application Serial No. 60/061,489, which has been incorporated by reference.

Conclusion

The integrated circuit of the present invention has a unified memory architecture (UMA) that dictates data flow within the system. All on-chip entities compete for access to memory making it the source for the majority of data traffic in the system. Additionally, a typical issue with a UMA system is processor latency to memory. Given the pseudo-random nature of processor memory accesses, such a design must ensure minimal idle cycles as the processor waits for data.

To alleviate performance bottle-necks, the integrated circuit of the present invention employs a dual internal bus architecture. Each subsystem is connected to both buses via a common bus interface. One bus is used to transfer control information while the other is used for accessing external memory. In this manner, the integrated circuit of the present invention can perform control and data transfers simultaneously to different subsystems. Command queuing and a robust arbitration scheme allow processor and display activity to co-exist in an optimum fashion, thereby improving overall system performance and data throughput.

Although the present invention has been described with reference to preferred embodiments, workers skilled in the art will recognize that changes may be made in form and detail without departing from the spirit and scope of the invention. For example, the present invention can be implemented with various technologies, including CMOS, and can have a variety of circuit configurations on multiple integrated circuits or a single integrated circuit. The term "coupled" can include various types of connections or couplings and can include a direct connection or a connection through one or more intermediate components.

What is claimed is:

1. A unified memory system comprising:

a processor;

a memory controller;

a plurality of bus transactor circuits;

a shared memory port, including a memory address interface, a memory control interface and a memory data interface, which are coupled to the memory controller;

a processor bus which is coupled between the processor and the memory controller;

a first multiple-bit, bidirectional system data bus which is coupled between the memory data interface of the shared memory port, the memory controller and the plurality of bus transactor circuits and which carries memory data between the memory data interface and the plurality of bus transactor circuits; and a second multiple-bit, bidirectional system command bus which is coupled between the memory controller and the plurality of bus transactor circuits and which carries non-memory data, including requests for access to the memory data interface over the data bus and memory addresses related to the memory data, between the memory controller and the plurality of bus transactor circuits.

2. The unified memory system of claim 1 wherein the plurality of bus transactor circuits comprises:

a display controller which comprises a first bus interface unit coupled to the data bus and the command bus;

a parallel input-output controller which comprises a second bus interface unit coupled to the data bus and the command bus; and a serial input-output controller which comprises a third bus interface unit coupled to the data bus and the command bus.

3. The unified memory system of claim 2 wherein the first and second system buses, the processor bus, the shared memory port, the processor, the memory controller, the display controller, the parallel input-output controller and the serial input-output controller are fabricated on a single semiconductor integrated circuit.

4. The unified memory system of claim 1 wherein:
one of the plurality of bus transactor circuits comprises a display controller which has a display queue for queueing an amount display data received from the shared memory port over the data bus and has a watermark output which is coupled to the memory controller, wherein the watermark output indicates whether the amount of display data queued in the display queue is more than or less than a predetermined amount; and
the memory controller preempts memory data transfers over the data bus by the other of the plurality of bus transactor circuits and the processor when the watermark output indicates the amount of display data queued in the display queue is less than the predetermined amount.

5. The unified memory system of claim 1 wherein:
one of the plurality of bus transactor circuits comprises a display controller which has a display queue for queueing an amount display data received from the shared memory port over the data bus and has a watermark output which is coupled to the memory controller, wherein the watermark output indicates whether the amount of display data queued in the display queue is more than or less than a predetermined amount; and
the memory controller controls access to the command bus by the processor, the display controller and the other bus transactor circuits according to the following priority:
the display controller has a first, highest priority when the watermark output indicates the amount of display data queued in the display queue is less than the predetermined amount;
the processor has a second priority which is less than the first priority;
the other bus transactor circuits have a third priority which is less than the second priority; and
the display controller has a fourth, priority which is less than the third priority when the watermark output indicates the amount of display data queued in the display queue is more than the predetermined amount.

6. The unified memory system of claim 1 wherein each bus transactor circuit comprises:
a dual port random access memory (DPRAM) having first and second ports, wherein the first port is operably coupled to the data bus and the command bus; and
a subsystem which is operably coupled to the second port of the DPRAM.

7. The unified memory system of claim 6 wherein each bus transactor circuit further comprises:
a bus interface circuit which is coupled between the first port and the data bus and between the first port and the command bus; and
a subsystem interface circuit which is coupled between the second port and the subsystem.

8. The unified memory system of claim 7 wherein:
the bus interface circuits of at least two of the plurality of bus transactor circuits are logically and physically identical to one another; and
the subsystem interface circuits of the at least two bus transactor circuits are logically and physically unique to the subsystems of the respective bus transactor circuits.

9. The unified memory system of claim 1 wherein the memory controller comprises means for transferring the memory data between the memory data interface of the shared memory port and the plurality of bus transactor circuits over the data bus and for transferring the non-memory data between the plurality of bus transactor circuits over the command bus.

10. The unified memory system of claim 1 wherein the memory controller comprises means for controlling access by the plurality of bus transactor circuits to the data bus independently of access to the command bus.

11. The unified memory system of claim 1 wherein the memory controller comprises a command queue for storing memory access commands transferred over the command bus by the plurality of bus transactor circuits and wherein the memory controller controls access to the data bus based on the memory access commands stored in the command queue.

12. The unified memory system of claim 1 wherein the memory controller comprises means for enabling a data transaction by one of the plurality of bus transactor circuits over the data bus and for simultaneously enabling a command transaction by another of the plurality of bus transactor circuits over the command bus.

13. The unified memory system of claim 1 wherein:
the memory controller further comprises a plurality of load data bus control outputs and a plurality of data bus grant control outputs; and
each bus transactor circuit comprises a load data bus control input which is coupled to a corresponding one of the load data bus control outputs and a data bus grant control input which is coupled to a corresponding one of the data bus grant control outputs.

14. The unified memory system of claim 1 wherein:
the memory controller further comprises a plurality of load command bus control outputs, a plurality of command bus grant control outputs, and a plurality of command bus request inputs; and
each bus transactor circuit comprises a load command bus control input which is coupled to a corresponding one of the load command bus control outputs, a command bus grant control input which is coupled to a corresponding one of the command bus grant control outputs, and a command bus request output which is coupled to a corresponding one of the command bus request inputs.

15. The unified memory system of claim 1 wherein the memory controller comprises means for receiving memory data from the shared memory port over the data bus and passing the memory data received from the shared memory port to the processor over the processor bus and comprises means for receiving memory data from the processor over the processor bus and passing the memory data received from the processor to the shared memory port over the data bus.

16. A method of passing data between a shared memory port, a memory controller and a plurality of bus transactor circuits, the method comprising:
passing memory data between the shared memory port, the memory controller and the plurality of bus transactor circuits over a multiple-bit, bidirectional data bus;
passing non-memory data including requests for access to the shared memory port over the data bus and memory addresses related to the memory data, between the memory controller and the plurality of bus transactor circuits over a multiple-bit, bidirectional command bus;

controlling access by the plurality of bus transactor circuits to the data bus with the memory controller based on the requests for access to the shared memory port; and controlling access by the plurality of bus transactor circuits to the command bus with the memory controller independently of access to the data bus.

17. The method of claim 16 wherein controlling access to the data bus comprises:

passing a data bus request command from a first of the bus transactor circuits to the memory controller over the command bus;

passing a data bus grant signal from the memory controller to the first bus transactor circuit in response to the data bus request command; and performing the step of passing memory data between the shared memory port and the first bus transactor circuit over the data bus in response to the data bus grant signal.

18. The method of claim 17 wherein passing a data bus request command comprises:

passing a command bus request signal from the first bus transactor circuit to the memory controller;

passing a command bus grant signal from the memory controller to the first bus transactor circuit in response to the command bus request signal; and passing the data bus request command from the first bus transactor circuit to the memory controller over the command bus in response to the command bus grant signal.

19. A single integrated circuit comprising:

a processor;

a memory controller;

a plurality of bus transactor circuits;

a shared memory port, including a memory address interface, a memory control interface and a memory data interface, which are coupled to the memory controller;

a processor bus which is coupled between the processor and the memory controller;

a data bus which is coupled to the memory data interface of the shared memory port, the memory controller and the plurality of bus transactor circuits for passing memory data between the memory data interface and the plurality of bus transactor circuits; and a command bus which is coupled to the memory controller and the plurality of bus transactor circuits for passing non-memory data, including requests for access to the memory data interface over the data bus and memory addresses related to the memory data, between the memory controller and the plurality of bus transactor circuits.

* * * * *